(12) United States Patent
Eisen et al.

(10) Patent No.: US 6,928,533 B1
(45) Date of Patent: Aug. 9, 2005

(54) DATA PROCESSING SYSTEM AND METHOD FOR IMPLEMENTING AN EFFICIENT OUT-OF-ORDER ISSUE MECHANISM

(75) Inventors: Susan Elizabeth Eisen, Austin, TX (US); James Edward Phillips, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 09/295,439

(22) Filed: Apr. 20, 1999

Related U.S. Application Data

(62) Division of application No. 08/968,736, filed on Aug. 27, 1997, now Pat. No. 6,289,437.

(51) Int. Cl.[7] ............................. G06F 9/40; G06F 95/00
(52) U.S. Cl. ........................................ 712/218; 712/23
(58) Field of Search ..................... 395/500.43; 712/217, 712/219, 23; 703/22

(56) References Cited

U.S. PATENT DOCUMENTS

| | | | | |
|---|---|---|---|---|
| 5,553,256 A | | 9/1996 | Fetterman et al. ........... 395/375 |
| 5,559,975 A | * | 9/1996 | Christie et al. ............ 712/230 |
| 5,615,350 A | * | 3/1997 | Hesson et al. ............ 712/218 |
| 5,625,789 A | * | 4/1997 | Hesson et al. ............ 712/217 |
| 5,632,023 A | * | 5/1997 | White et al. ............... 712/218 |
| 5,664,136 A | * | 9/1997 | Witt et al. .................. 712/208 |
| 5,666,506 A | * | 9/1997 | Hesson et al. ............ 712/216 |
| 5,761,474 A | * | 6/1998 | Lesartre et al. ............ 712/217 |
| 5,805,470 A | * | 9/1998 | Averyll ........................ 703/27 |
| 5,826,070 A | * | 10/1998 | Olson et al. ................ 712/222 |
| 5,832,292 A | * | 11/1998 | Nguyen et al. ............... 712/23 |
| 5,850,533 A | * | 12/1998 | Panwar et al. ............. 712/216 |
| 5,867,724 A | * | 2/1999 | McMahon .................... 712/22 |
| 5,878,266 A | * | 3/1999 | Goddard et al. ............ 712/23 |
| 5,881,308 A | * | 3/1999 | Dwyer ........................ 712/23 |
| 5,926,642 A | * | 7/1999 | Favor ............................. 712/1 |
| 5,956,747 A | * | 9/1999 | Wilhem et al. ............. 711/140 |
| 5,958,047 A | * | 9/1999 | Panwar et al. ............. 712/237 |
| 5,978,912 A | * | 11/1999 | Rakavy et al. ................. 713/2 |
| 5,987,600 A | * | 11/1999 | Papworth et al. ........... 712/244 |
| 5,996,065 A | * | 11/1999 | Makineni et al. ........... 712/218 |
| 5,999,727 A | * | 12/1999 | Panwar et al. ............. 712/225 |

FOREIGN PATENT DOCUMENTS

| | | |
|---|---|---|
| EP | 0432774 A2 | 12/1990 |
| EP | 0778519 A2 | 11/1996 |

OTHER PUBLICATIONS

Murakami et al.; "SIMP (single instruction stream/multiple instruction pipelining): a novel high–speed single–processor architecture"; IEEE 16th ann. Int. Symp. Comp. Arch.; pp. 78–83, Jun. 1989.*

Jourdan et al.; "A high out–of–order issue symmetric super-pipeline super microprocessor"; IEEE EUROMICRO 94; pp. 338–345, Sep. 1994.*

Wang et al.; "I–Net mechanism for issuing multiple instructions"; IEEE CH2617–9/88/000/0088; pp. 88–95, Sep. 1988.*

Pickett et al.; "Enhanced superscalar hardware: the schedule table"; ACM—Proc. Conf. Supercomputing '93; pp. 636–644, Nov. 1993.*

Endecott; "Superscalar instruction issue in an asynchronous microprocessor"; IEE Proc. Comp. and Digital Techniques; pp. 266–272, Sep. 1996.*

Peleg et al.; "Future trends in microprocessors: out–of–order execution speculative branching and their CISC performance potential"; IEEE 17th Convention of Elect. and electronic Eng. in Israel; pp. 263–266, Mar. 1991.*

Aagaard et al.; "A framework for specifying and designing pipelines"; IEEE ICCD '93; pp. 548–551, Oct. 1993.*

Stone: Chapter 3 of"High–performance computing"; Addison–Wesley Pub. Co., 1987.*

* cited by examiner

*Primary Examiner*—Larry D. Donaghue
(74) *Attorney, Agent, or Firm*—Winstead Sechrest & Minick P.C.; Robert M. Carwell

(57) ABSTRACT

An out-of-order issue mechanism for a data processing system allows two out-of-order instructions to be issued to independent "pipes" from a window of four instructions currently queued for execution. If the two pipes execute floating pipe operations, dependencies between a computationally intensive floating point unit instruction (referred to as an fpu rr instruction) and the two previous computational intensive instructions having a target and a floating point register (the "fpr target") are tracked to provide a mechanism that quickly determines when dependent data is available from one of the floating point unit pipes. The data is then used to preempt the issue of a dependent instruction until data is available. Additionally, this out-of-order issue mechanism recognizes when consecutive instructions are dependent upon a same operand. In this situation, the mechanism prioritizes the first of the two instructions to be issued to the pipe satisfying the dependency, while the second instruction is preempted in favor of issuing an independent instruction or an instruction whose dependent data has already been made available to the other pipe when such an instruction is waiting in a queue.

22 Claims, 54 Drawing Sheets

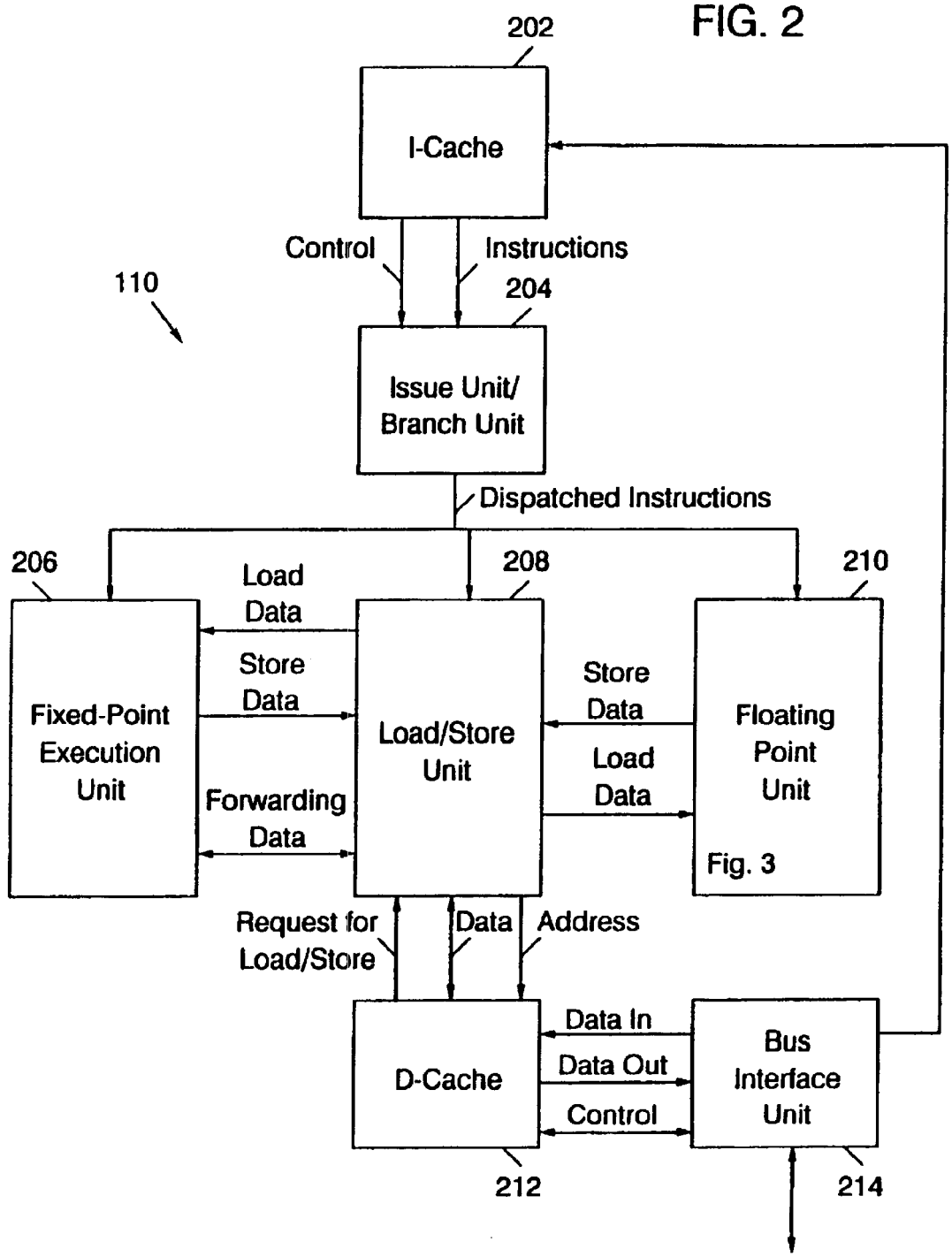

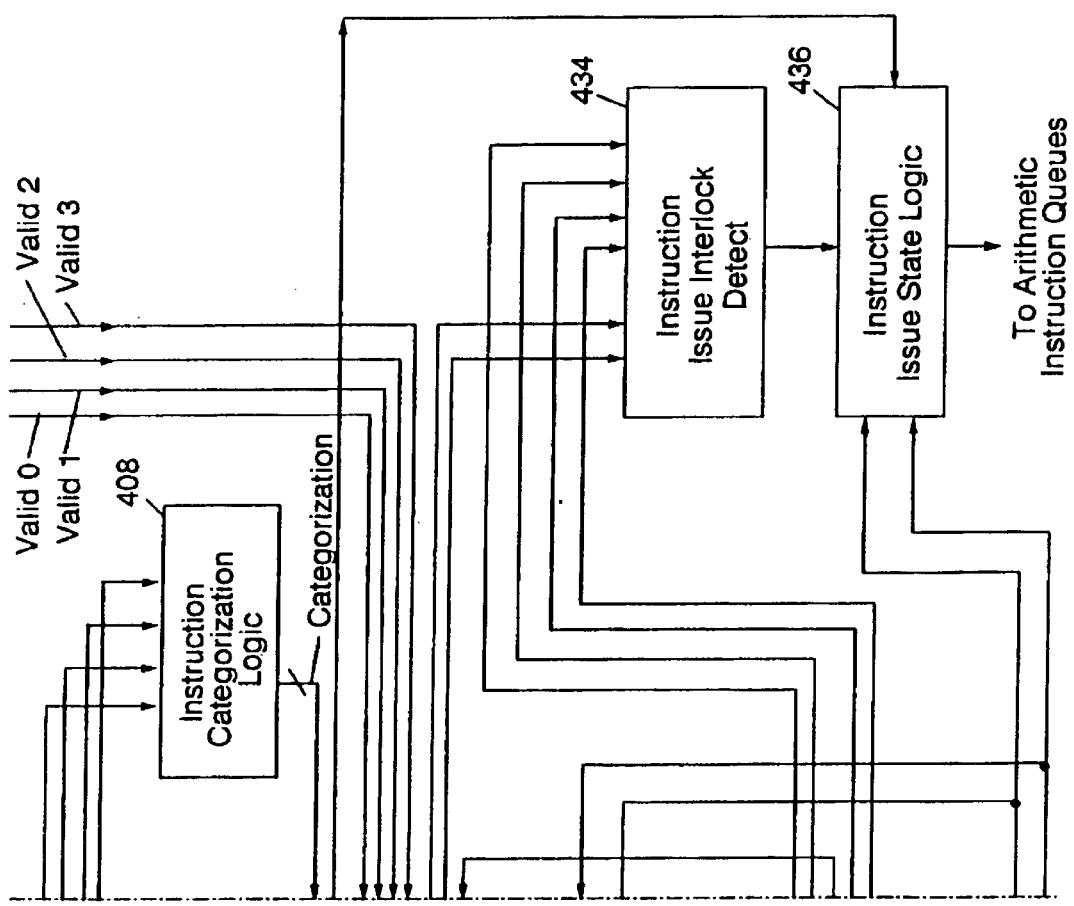

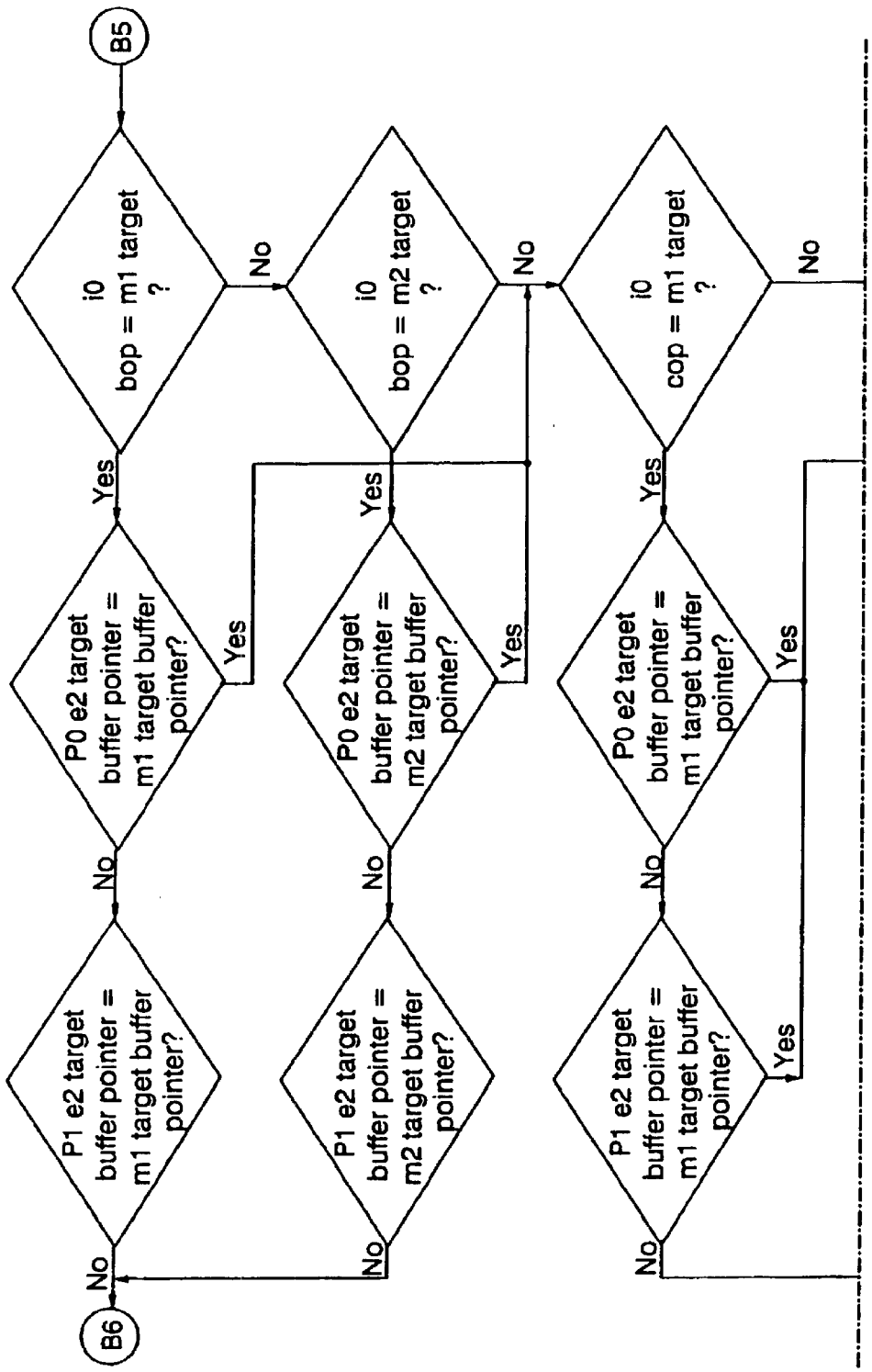

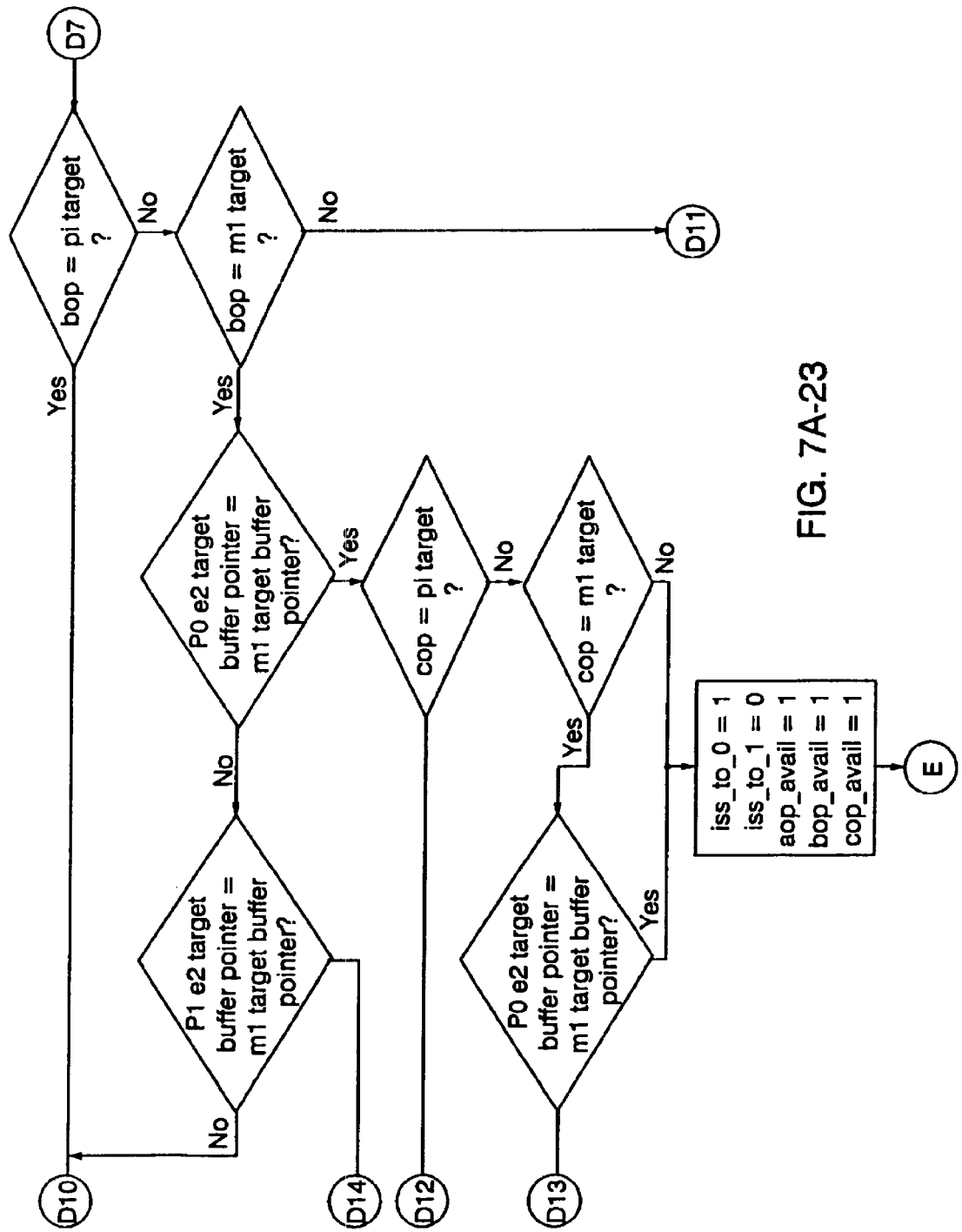

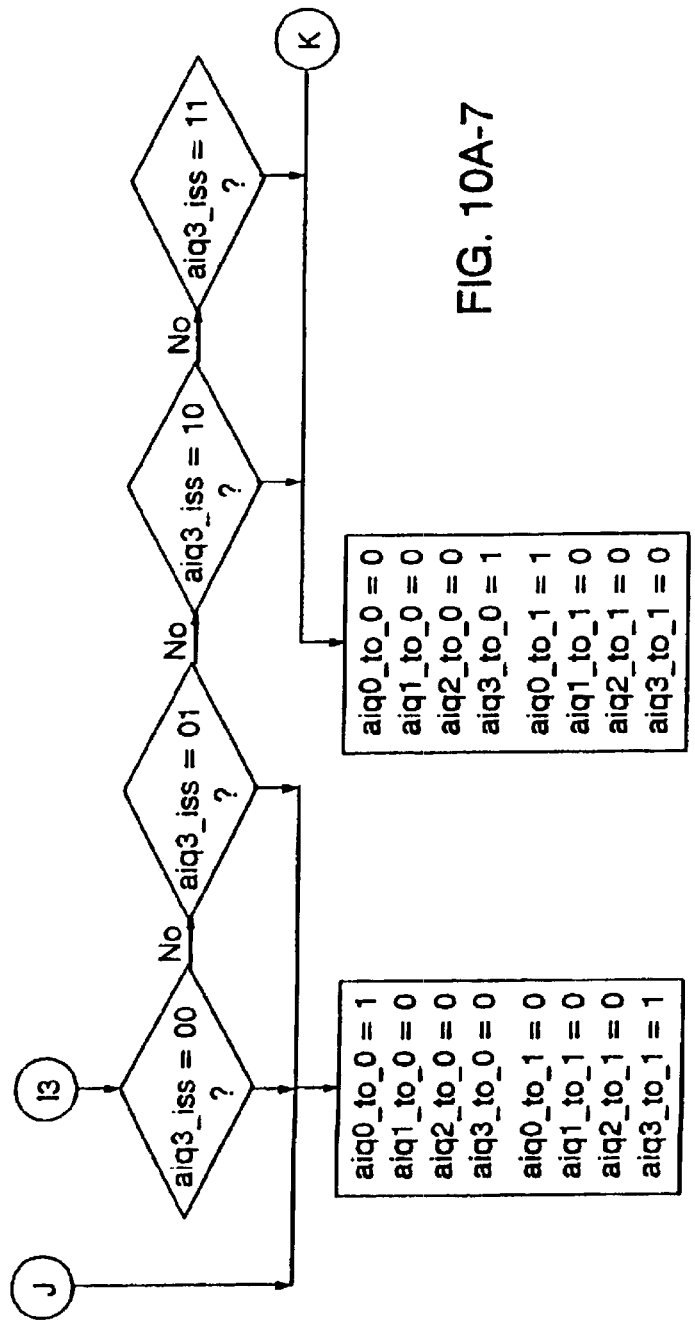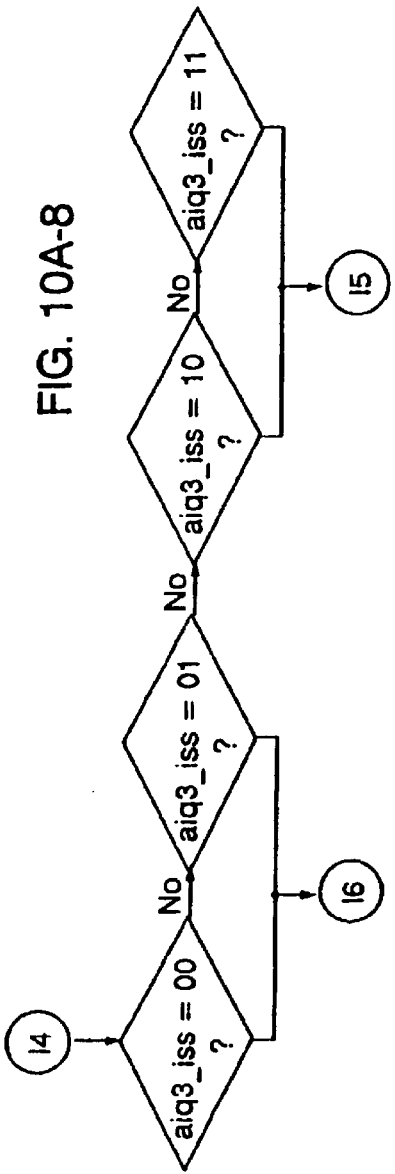
FIG. 10A-7
FIG. 10A-8

DATA PROCESSING SYSTEM AND METHOD FOR IMPLEMENTING AN EFFICIENT OUT-OF-ORDER ISSUE MECHANISM

This is a continuation, division of application Ser. No. 08/968,736 filed Aug. 27, 1997, now U.S. Pat. No. 6,289,437.

TECHNICAL FIELD

The present invention relates in general to a pipelined data processing system, and more particularly, to an out-of-order issue mechanism in a pipelined data processor.

BACKGROUND INFORMATION

As computers have been developed to perform a greater number of instructions at greater speeds, many types of architectures have been developed to optimize this process. For example, a reduced instruction set computer (RISC) device utilizes fewer instructions and greater parallelism in executing those instructions to ensure that computational results will be available more quickly than the results provided by more traditional data processing systems. In addition to providing increasingly parallel execution of instructions, some data processing systems implement out-of-order instruction execution to increase processor performance. Out-of-order instruction execution increases processor performance by dynamically allowing instructions dispatched with no data dependencies to execute before previous instructions in an instruction stream that have unresolved data dependencies. In some data processing systems, instructions are renamed and instruction sequencing tables, also referred to as re-order buffers, facilitate out-of-order execution by reordering instruction execution at instruction completion time.

Re-order buffer devices are also used to allow speculative instruction execution. Therefore, data processing systems which support speculative instruction execution can be adapted for out-of-order execution with the addition of relatively minimal hardware. A portion of this added hardware includes issue logic which is used to determine a time and order that instructions should be issued. Such issue logic can be extremely complex since the dependencies of instructions and a state of a pipeline in which the instructions are being executed must be examined to determine a time at which the instruction should issue. If the issue logic is not properly designed, such issue logic can become a critical path for the data processing system and limit the frequency of instruction execution such that performance gains which could be achieved by out-of-order issue are destroyed.

Therefore, a need exists for an out-of-order issue mechanism that efficiently issues independent instructions in a timely manner and that does not limit a frequency with which the processor executes instructions.

SUMMARY OF THE INVENTION

The previously mentioned needs are fulfilled with the present invention. Accordingly, there is provided, in a first form, a data processing system having a first execution unit. The data processing system includes an input circuit for receiving a plurality of instructions and a register for storing a plurality of validity values. The first one of the plurality of validity values corresponds to a first one of the plurality of instructions. The first one of plurality of validity values selectively indicates the first one of the plurality of instructions may be issued to the first execution unit.

Additionally, there is provided, in a second form, a method for issuing instructions in a data processing system having a first execution unit. The method includes the steps of receiving a plurality of instructions and storing a plurality of validity values in a register. Each of the plurality of validity values corresponds to a first one of the plurality of instructions. The method also includes the step of selectively enabling a first one of the plurality of validity values to indicate the first one of the plurality of instructions may be issued to the first execution unit.

There is also provided a data processing system having a first execution unit and a second execution unit. The data processing system includes an input circuit for receiving a first plurality of instructions. The data processing system also includes a detection circuit for detecting dependencies between a first one of the first plurality of instructions and a second instruction currently executing within the first execution unit and asserting a first dependency indicator in response to a first dependency. The detection circuit is connected to the input circuit for receiving the first plurality of instructions. The data processing system also includes an issue circuit connected to the first execution unit, the second execution unit and the detection circuit. The issue circuit selectively issues the first one of the plurality of instructions to one of the first execution unit and the second execution unit in response to the first dependency indicator.

There is also provided, in one form of the present invention, a method for operating a data processing system having a first execution unit and a second execution unit. The method includes the steps of receiving a first plurality of instructions and detecting dependencies between a first one of the first plurality of instructions and a second instruction currently executing within the first execution unit. The method also includes the steps of asserting a first dependency indicator in response to a first detected dependency, coupling an issue circuit to the first execution unit, the second execution unit and the detection circuit, and selectively issuing the first one of the first plurality of instructions to one of the first execution unit and the second execution unit in response to the first dependency indicator.

Additionally, the present invention includes, in one embodiment, a data processing system including a first execution unit for selectively executing a first plurality of instructions and an instruction issue logic circuit for generating a plurality of issue bits. A first preselected number of issue bits corresponds to one of the first plurality of instructions and wherein the first preselected number of issue bits selectively enables a first instruction to be executed.

Additionally, there is provided, in one form of the present invention, a method for operating a data processing system. The method includes the steps of selectively executing a first plurality of instructions in a first execution unit and generating a plurality of issue bits using an instruction issue logic circuit A first preselected number of issue bits correspond to one of the first plurality of instructions. The method also includes the step of selectively enabling a first instruction to be executed in response to the first preselected number of issue bits.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4B illustrates, in block diagram form, a floating point unit rename and decode logic circuit of FIG. 3;

FIG. 7-1 illustrates, in flow diagram form, operations executed by the data processing system in accordance with one embodiment of the present invention;

FIG. 7-2 illustrates, in flow diagram form, a portion of the instructions executed in accordance with one embodiment of the present invention;

FIG. 7-3 illustrates, in flow diagram form, a portion of the instructions executed in accordance with one embodiment of the present invention;

FIG. 7-4 illustrates, in flow diagram form, a portion of the instructions executed in accordance with one embodiment of the present invention;

FIG. 7-5 illustrates, in flow diagram form, a portion of the instructions executed in accordance with one embodiment of the present invention;

FIG. 7-6 illustrates, in flow diagram form, a portion of the instructions executed in accordance with one embodiment of the present invention;

FIG. 7-7A illustrates, in flow diagram form, a portion of the instructions executed in accordance with one embodiment of the present invention;

FIG. 7-7B illustrates, in flow diagram form, a portion of the instructions executed in accordance with one embodiment of the present invention;

FIG. 7-8 illustrates, in flow diagram form, a portion of the instructions executed in accordance with one embodiment of the present invention; FIG. 7-9 illustrates, in flow diagram form, a portion of the instructions executed in accordance with one embodiment of the present invention;

FIG. 7-10 illustrates, in flow diagram form, a portion of the instructions executed in accordance with one embodiment of the present invention;

FIG. 7-11 illustrates, in flow diagram form, a portion of the instructions executed in accordance with one embodiment of the present invention;

FIG. 7-12 illustrates, in flow diagram form, a portion of the instructions executed in accordance with one embodiment of the present invention;

FIG. 7-13 illustrates, in flow diagram form, a portion of the instructions executed in accordance with one embodiment of the present invention;

FIG. 7-14 illustrates, in flow diagram form, a portion of the instructions executed in accordance with one embodiment of the present invention;

FIG. 7-15 illustrates, in flow diagram form, a portion of the instructions executed in accordance with one embodiment of the present invention;

FIG. 7-16 illustrates, in flow diagram form, a portion of the instructions executed in accordance with one embodiment of the present invention;

FIG. 7-17 illustrates, in flow diagram form, a portion of the instructions executed in accordance with one embodiment of the present invention;

FIG. 7-18 illustrates, in flow diagram form, a portion of the instructions executed in accordance with one embodiment of the present invention;

FIG. 7-19 illustrates, in flow diagram form, a portion of the instructions executed in accordance with one embodiment of the present invention;

FIG. 7-20 illustrates, in flow diagram form, a portion of the instructions executed in accordance with one embodiment of the present invention;

FIG. 7-21 illustrates, in flow diagram form, a portion of the instructions executed in accordance with one embodiment of the present invention;

FIG. 7-22 illustrates, in flow diagram form, a portion of the instructions executed in accordance with one embodiment of the present invention;

FIG. 7-23 illustrates, in flow diagram form, a portion of the instructions executed in accordance with one embodiment of the present invention;

FIG. 7-24 illustrates, in flow diagram form, a portion of the instructions executed in accordance with one embodiment of the present invention;

FIG. 7-25 illustrates, in flow diagram form, a portion of the instructions executed in accordance with one embodiment of the present invention;

FIG. 7-26 illustrates, in flow diagram form, a portion of the instructions executed in accordance with one embodiment of the present invention;

FIG. 7-27 illustrates, in flow diagram form, a portion of the instructions executed in accordance with one embodiment of the present invention;

FIG. 7-28 illustrates, in flow diagram form, a portion of the instructions executed in accordance with one embodiment of the present invention;

FIG. 7-29 illustrates, in flow diagram form, a portion of the instructions executed in accordance with one embodiment of the present invention;

FIG. 7-30 illustrates, in flow diagram form, a portion of the instructions executed in accordance with one embodiment of the present invention;

FIG. 7-31 illustrates, in flow diagram form, a portion of the instructions executed in accordance with one embodiment of the present invention;

FIG. 7-32 illustrates, in flow diagram form, a portion of the instructions executed in accordance with one embodiment of the present invention;

FIG. 7-33 illustrates, in flow diagram form, a portion of the instructions executed in accordance with one embodiment of the present invention;

FIG. 7-34 illustrates, in flow diagram form, a portion of the instructions executed in accordance with one embodiment of the present invention;

FIG. 7-35 illustrates, in flow diagram form, a portion of the instructions executed in accordance with one embodiment of the present invention;

FIG. 7-36 illustrates, in flow diagram form, a portion of the instructions executed in accordance with one embodiment of the present invention;

FIG. 7-37 illustrates, in flow diagram form, a portion of the instructions executed in accordance with one embodiment of the present invention;

FIG. 7-38 illustrates, in flow diagram form, a portion of the instructions executed in accordance with one embodiment of the present invention;

FIG. 7-39 illustrates, in flow diagram form, a portion of the instructions executed in accordance with one embodiment of the present invention;

FIG. 7-40 illustrates, in flow diagram form, a portion of the instructions executed in accordance with one embodiment of the present invention;

FIG. 7-41 illustrates, in flow diagram form, a portion of the instructions executed in accordance with one embodiment of the present invention;

FIG. 8 illustrates, in flow diagram form, an out-of-order issue queue maintenance operation for a first pipe in accordance with one embodiment of the present invention;

FIG. 9 illustrates, in flow diagram form, an out-of-order issue operation of a second pipe in one embodiment of the data processing system of the present invention;

FIG. 10-1 illustrates, in flow diagram form, an issue operation executed in accordance with one embodiment of the present invention;

FIG. 10-2 illustrates, in logic diagram form, a portion of the operations executed in accordance with the flow diagram of FIG. 10-1;

FIG. 10-3 illustrates, in flow diagram form, a portion of the operations executed in accordance with the flow diagram of FIG. 10-1;

FIG. 10-4 illustrates, in flow diagram form, a portion of the operations executed in accordance with the flow diagram of FIG. 10-1;

FIG. 10-5 illustrates, in flow diagram form, a portion of the operations executed in accordance with the flow diagram of FIG. 10-1;

FIG. 10-6 illustrates, in flow diagram form, a portion of the operations executed in accordance with the flow diagram of FIG. 10-1;

FIG. 10-7 illustrates, in flow diagram form, a portion of the operations executed in accordance with the flow diagram of FIG. 10-1;

FIG. 10-8 illustrates, in flow diagram form, a portion of the operations executed in accordance with the flow diagram of FIG. 10-1;

FIG. 10-9 illustrates, in flow diagram form, a portion of the operations executed in accordance with the flow diagram of FIG. 10-1;

FIG. 10-10 illustrates, in flow diagram form, a portion of the operations executed in accordance with the flow diagram of FIG. 10-1; and FIG. 10-11 illustrates, in flow diagram form, a portion of the operations executed in accordance with the flow diagram of FIG. 10-1.

DETAILED DESCRIPTION

Figure 1:
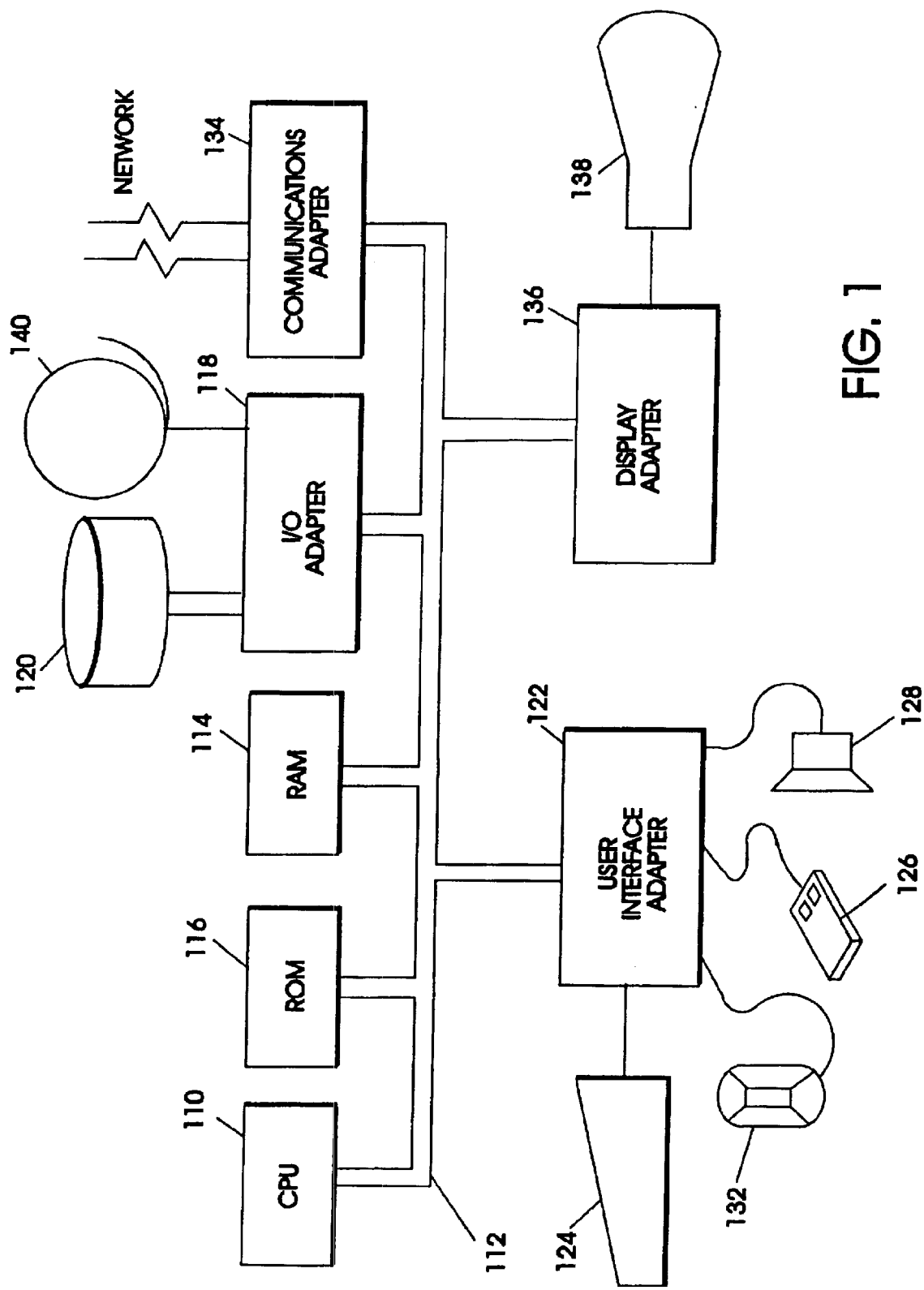
FIG. 1 illustrates, in block diagram form, a data processing system in accordance with one embodiment of the present invention.

The present invention provides an out-of-order issue mechanism for a data processing system which allows two out-of-order instructions to be issued to independent "pipes" from a window of four instructions currently queued for execution. In one embodiment of the present invention which will be discussed herein the two pipes execute floating point operations. In this embodiment, dependencies between a computational intensive floating point unit instruction (referred to as a fpu rr instruction) and the two previous computational intensive instructions having a target in a floating point register (the "fpr target") are tracked to provide a mechanism that quickly determines when dependent data is available from one of the floating point unit pipes. This data is then used to preempt the issue of a dependent instruction until data is available.

Furthermore, the present invention recognizes when consecutive instructions are dependent upon a same operand. In this situation, the present invention prioritizes a first of the two instructions to be issued to the pipe satisfying the dependency, while the second instruction is preempted in favor of issuing an independent instruction or an instruction whose dependent data has already been made available to the other pipe when such an instruction is waiting in a queue. Each of these functions is provided without impacting a cycle time of the data processing system in which the present invention is implemented and without increasing a number of cycles required to issue floating point instructions to the floating point unit pipelines.

In one embodiment of the present invention, several components are used to implement an out-of-order issue mechanism. In a first portion, a "history circuit" maintains the target information and the validity of the previous two fpu rr instructions having an fpr target. In a second portion of the out-of-order issue mechanism of the present invention, an issue state determination circuit combines information obtained from the history circuit with the dispatched instructions to determine an issue state for each instruction to one of two pipes implemented therein. The issue state determination circuit generates two bits of data for each of four dispatched instructions. One of these bits indicates when the instruction is available for issue to a first pipe and the second bit indicates when the instruction is available for issue to a second pipe. Through the use of these two bits, the issue state determination circuit "tags" each instruction in an instruction queue. In a third portion of the out-of-order issue mechanism of the present invention, a state of the two issue state bits of the instruction are maintained in the instruction queue until the instruction is issued. A fourth portion of the out-of-order issue mechanism of the present invention implements a logic circuit which observes the issue state bits of a predetermined number of instructions in a bottom of the instruction queue to determine which of the instructions should be issued. Operation of the present invention will subsequently be described in greater detail. Prior to that discussion, however, a description of connectivity of the elements of the present invention will be provided.

Description of Connectivity

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. Furthermore, during a description of the implementation of the invention, the terms "assert" and "negate" and various grammatical forms thereof, are used to avoid confusion when dealing with the mixture of "active high" and "active low" logic signals. "Assert" is used to refer to the rendering of a logic signal or register bit into its active, or logically true, state. "Negate" is used to refer to the rendering of a logic signal or register bit into its inactive, or logically false, state. Additionally, a binary value may be indicated by a "%" symbol proceeding a value and a hexadecimal value may be indicated by a "$" symbol preceding a value.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The history buffer (not shown) of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Preferred implementations of the invention include implementations as a to computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figures 1, 7A:
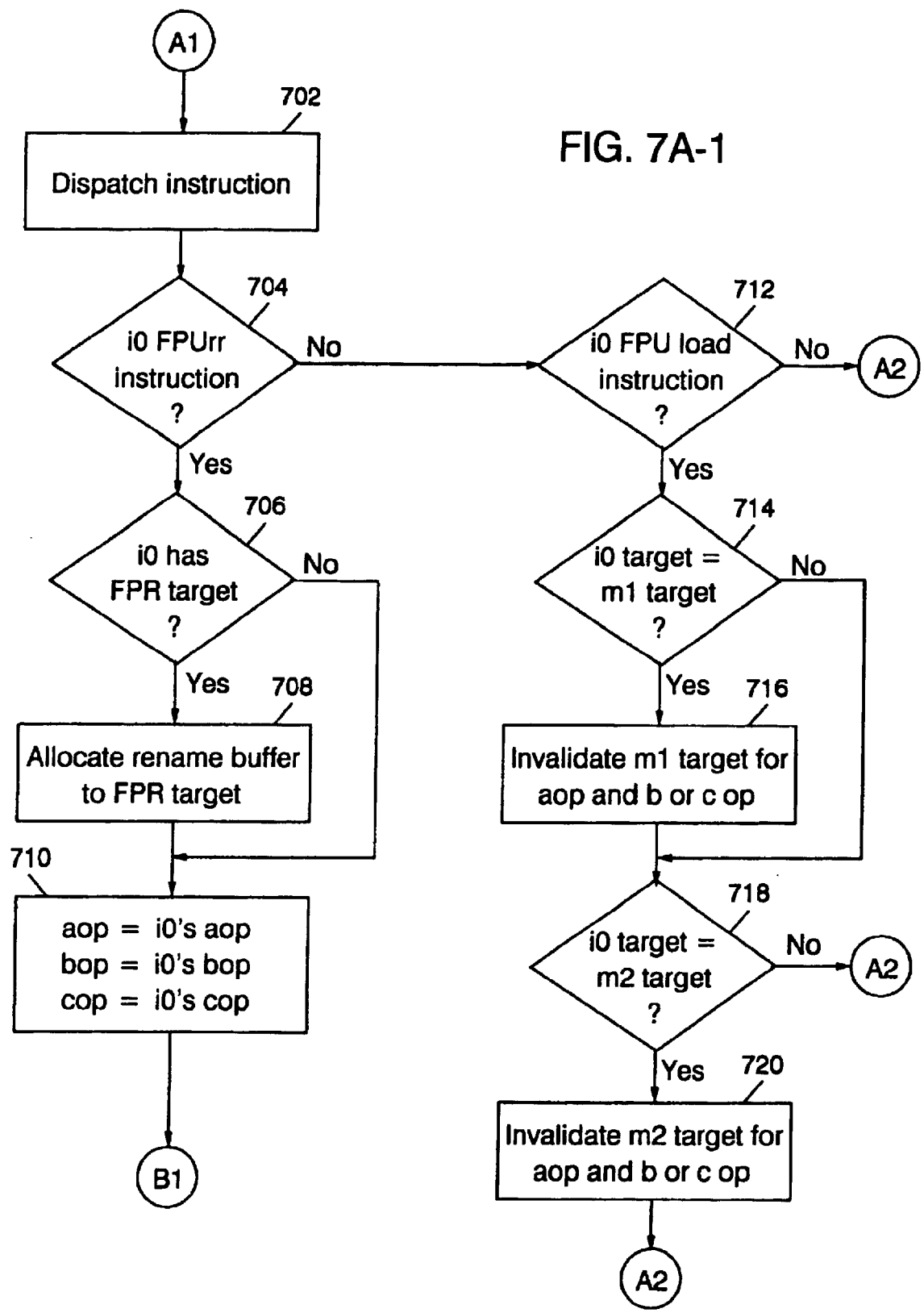
Figures 2, 7A:
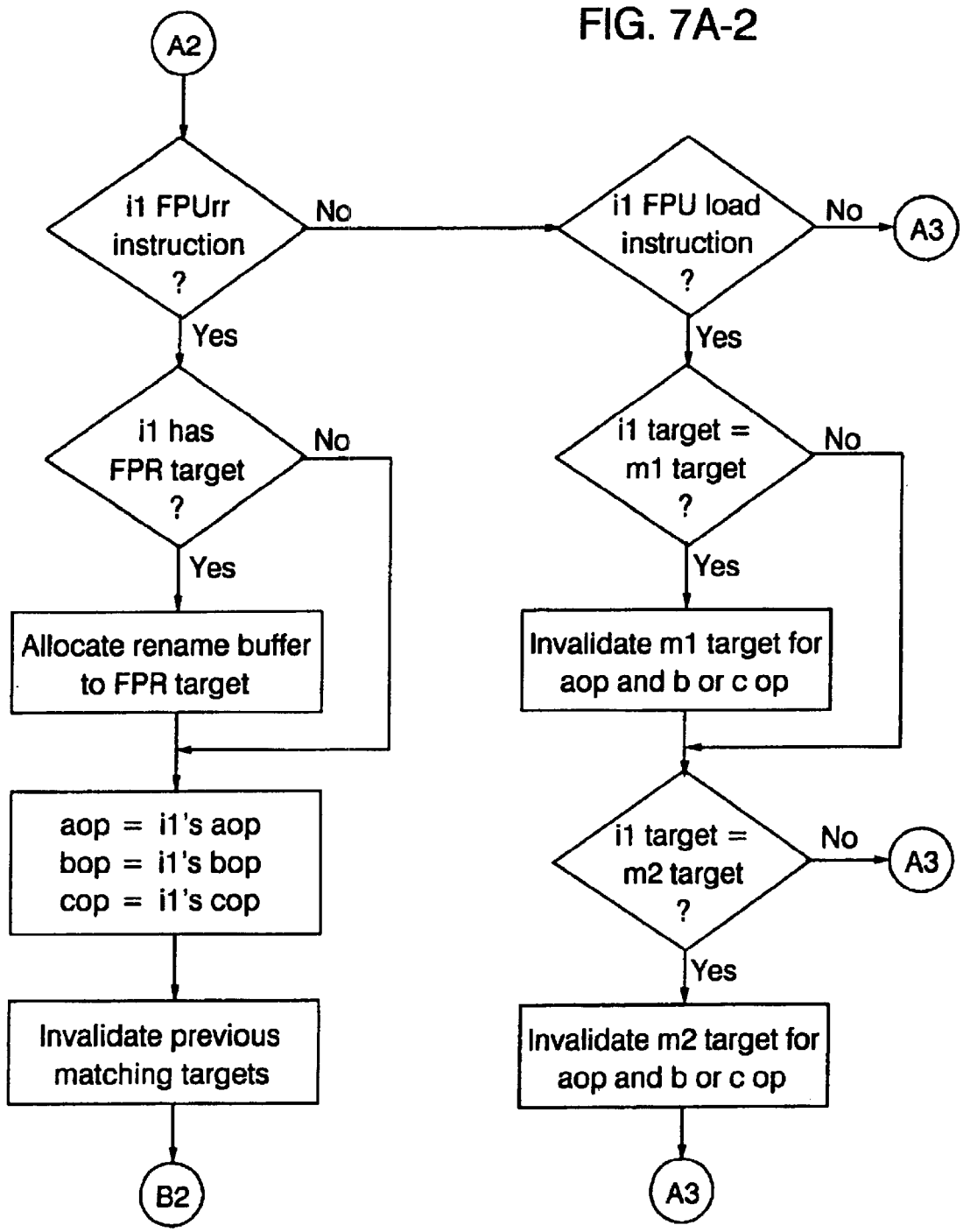
Figures 3, 7A:
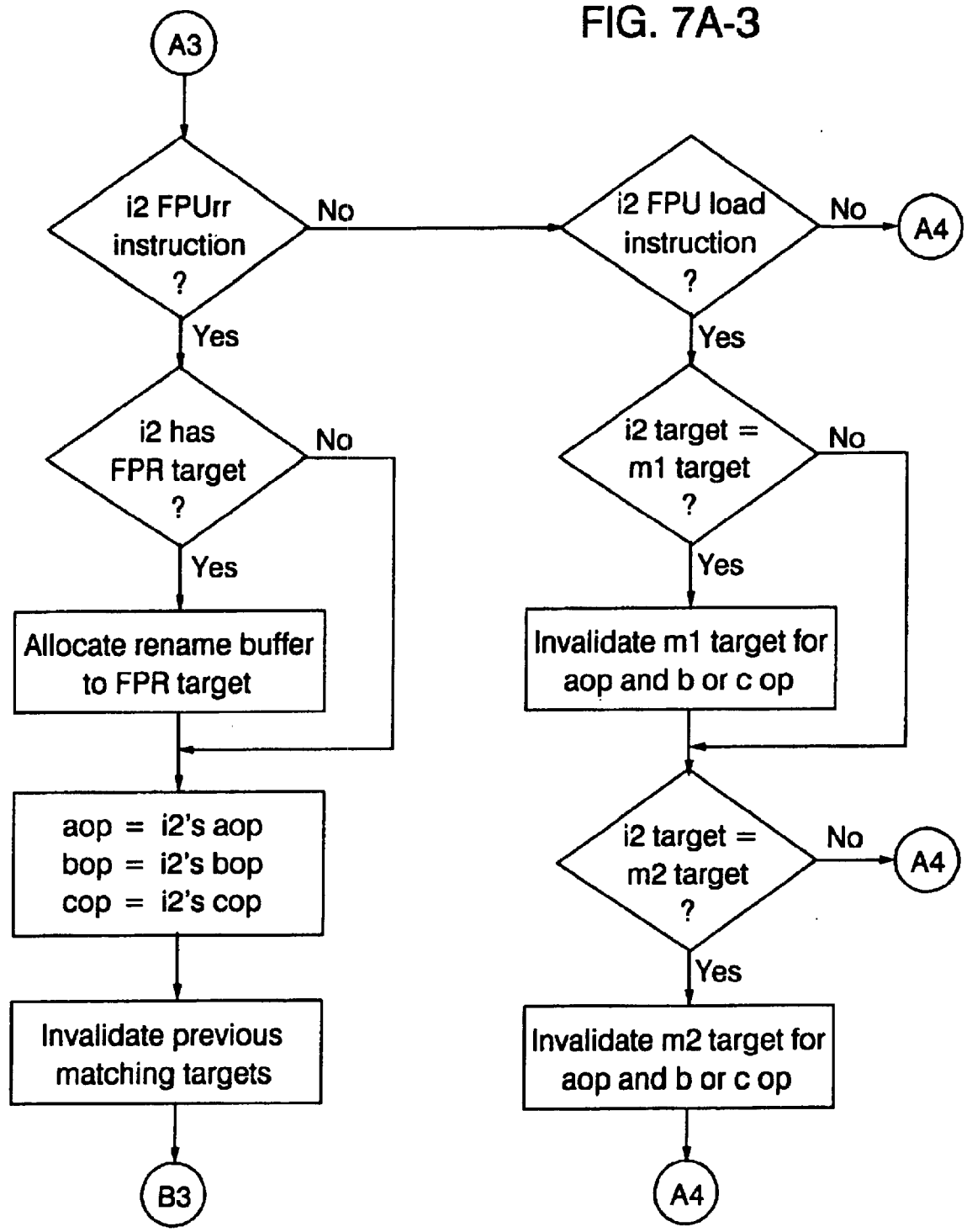

FIG. 2 illustrates a portion of CPU 110 in greater detail. The portion of CPU 110 comprises an instruction cache (I-cache) 202, an instruction unit/branch unit 204, a fixed point execution unit (fxu) 206, a load/store unit 208, a floating point unit (fpu) 210, a data cache (D-cache) 212, and a bus interface unit (BIU) 214.

I-cache 202 is coupled to instruction unit/branch unit 204 to communicate control information and a plurality of instructions. Instruction unit/branch unit 204 is coupled to each of FXU 206, load/store unit 208, and FPU 210 to provide a plurality of dispatched instructions. I-cache 202 is coupled to bus interface unit 214 to communicate Data and Control information. FXU 206 is coupled to load/store unit 208 to communicate a load data value, a store data value, and a forwarding data value. Load/store unit 208 is coupled to FPU 210 to communicate a store data value and load data value. Load/store unit 208 is also coupled to D-cache 212 to communicate a request for a load/store signal, a plurality of data values, and an address value. D-cache 212 is coupled to bus interface unit 214 to communicate a data in signal, a data out signal, and a control signal.

Figure 3:
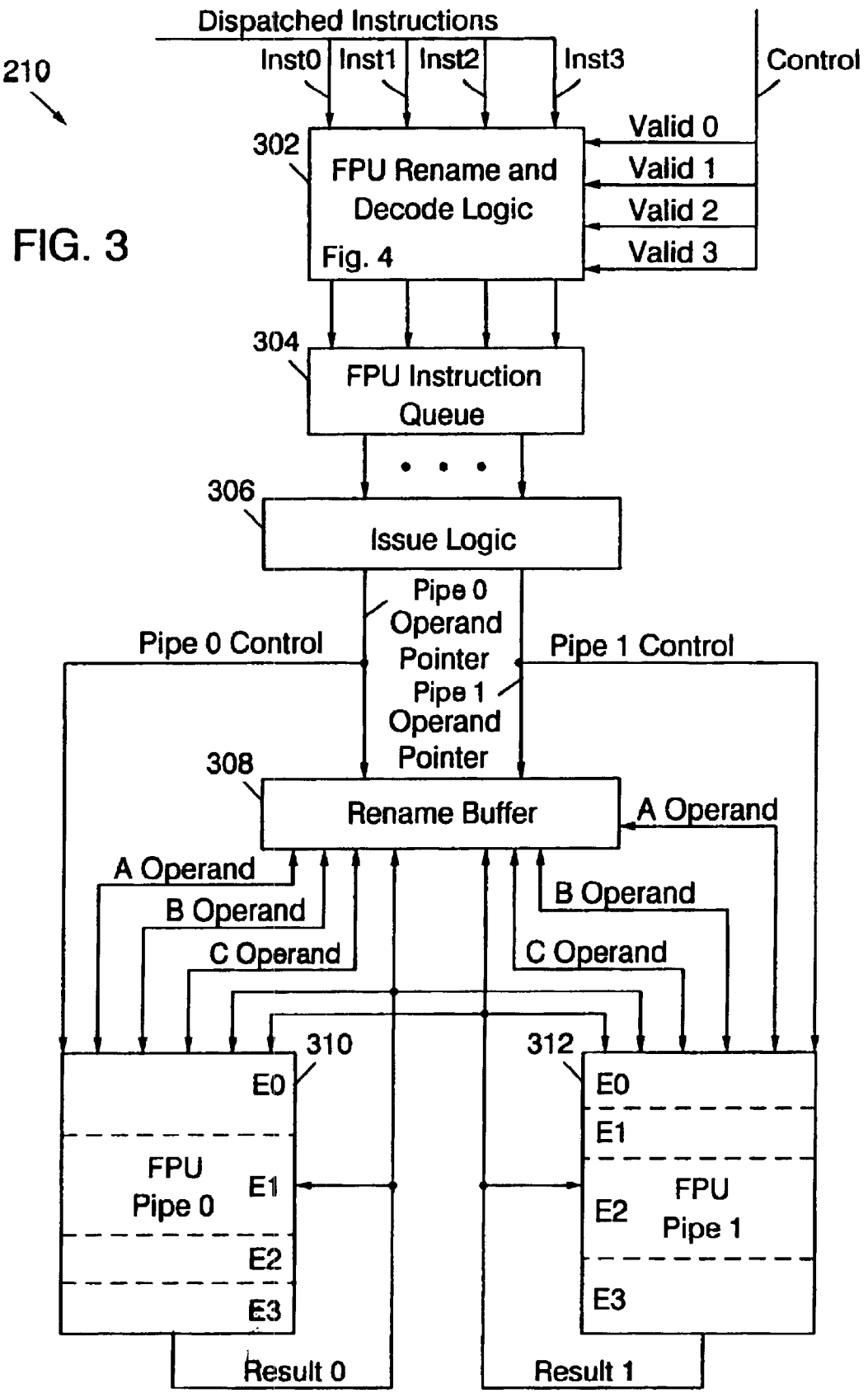
FIG. 3 illustrates, in block diagram form, a floating point unit of the central processing unit of FIG. 2.
Figure 4A:
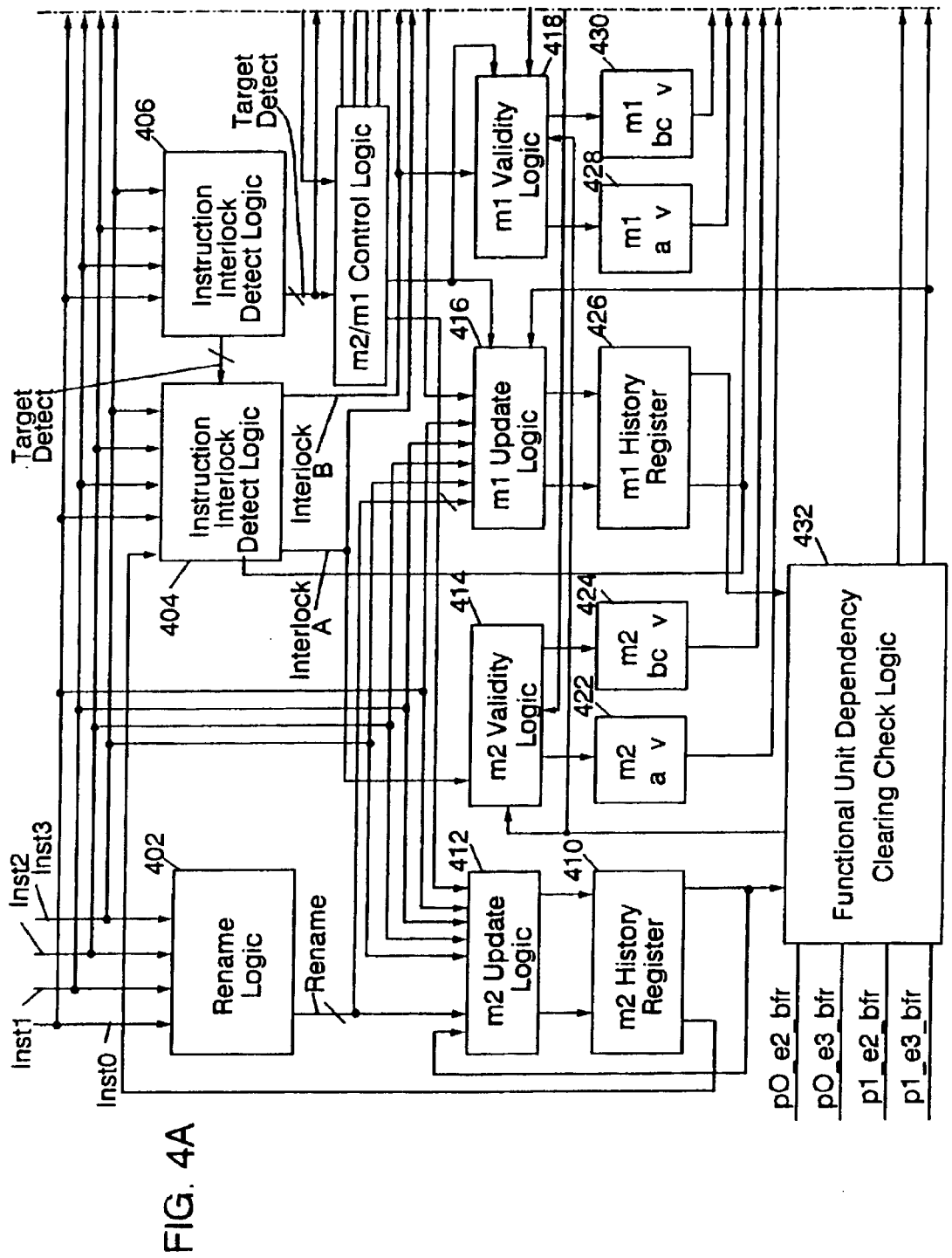
FIG. 4A illustrates, in block diagram form, a floating point unit rename and decode logic circuit of FIG. 3.

FIG. 3 illustrates a portion of floating point unit 210 in greater detail. A portion of FPU 210 comprises a FPU rename and decode logic circuit 302, a FPU instruction queue 304, an issue logic circuit 306, a rename buffer/FPR (floating point register) 308, a FPU pipe 0 310, and a FPU pipe 1 312.

A plurality of dispatched instructions, Inst0, Inst1, Inst2, and Inst3 are coupled to FPU rename and decode logic 302. Additionally, the control signal provides a Valid0 signal, a Valid1 signal, a Valid2 signal, and a Valid3 signal, to FPU rename and decode logic 302. FPU rename and decode logic 302 is coupled to FPU instruction queue 304 to provide a plurality of decoded instructions. FPU instruction queue 304 is coupled to issue logic 306 to provide a plurality of control signals. Issue logic 306 is coupled to rename buffer/FPR 308 to provide a first plurality of operand pointer signals and a second plurality of operand pointer signals. Issue logic 306 is coupled to FPU pipe 0 310 to provide a plurality of Pipe 0 control signals. Issue logic circuit 306 is coupled to FPU 1 312 to provide a plurality of Pipe 1 control signals. Rename buffer/FPR 308 is coupled to FPU pipe 0 310 to communicate A operand (aop) signals, B operand (bop) signals, C (cop) operand signals, and result 0 signals. Similarly, rename buffer/FPR 308 is coupled to FPU pipe 1 312 to communicate A operand signals, B operand signals, C operand signals, and result 1 signals.

Figures 4, 7A:
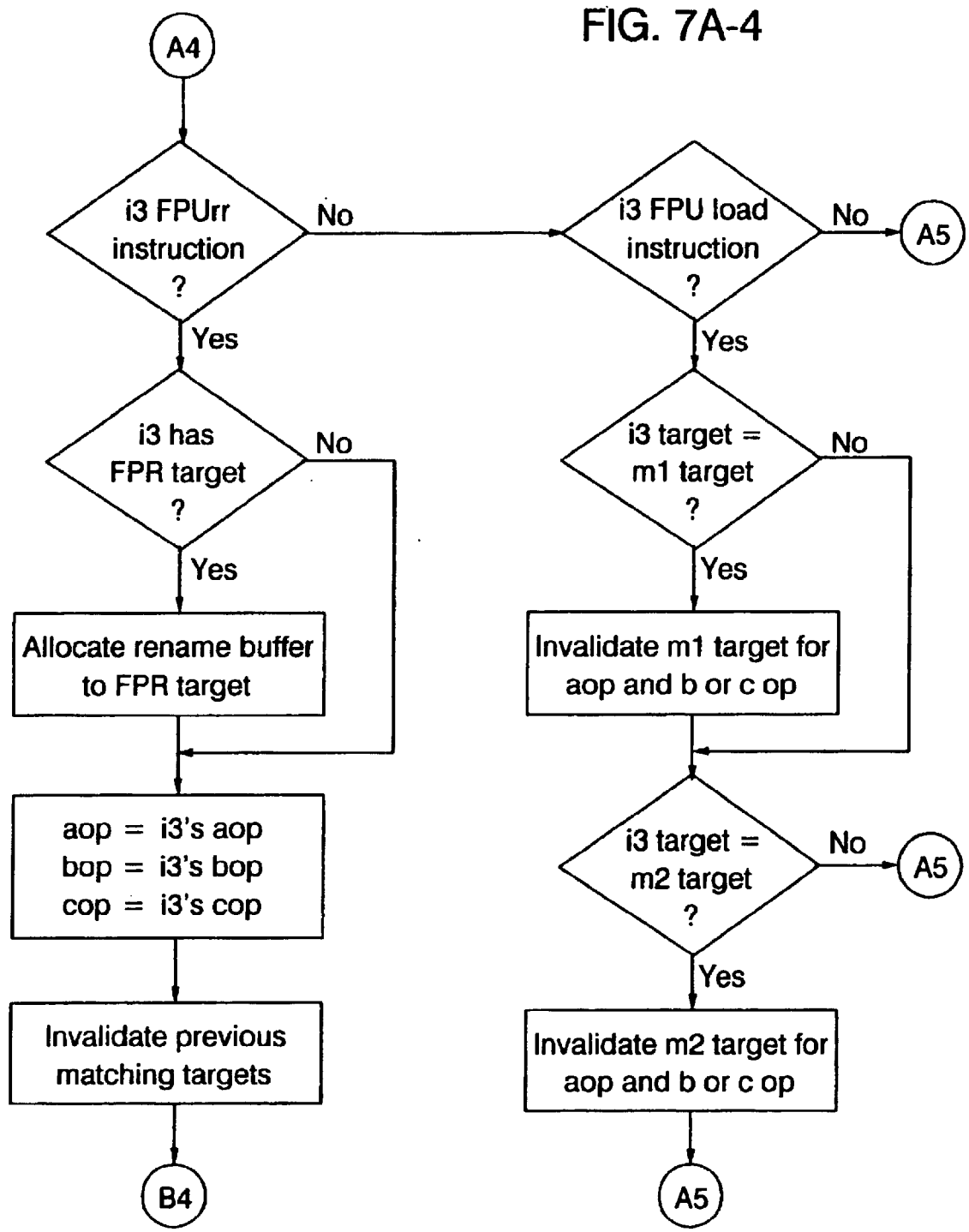
Figures 5, 7A:
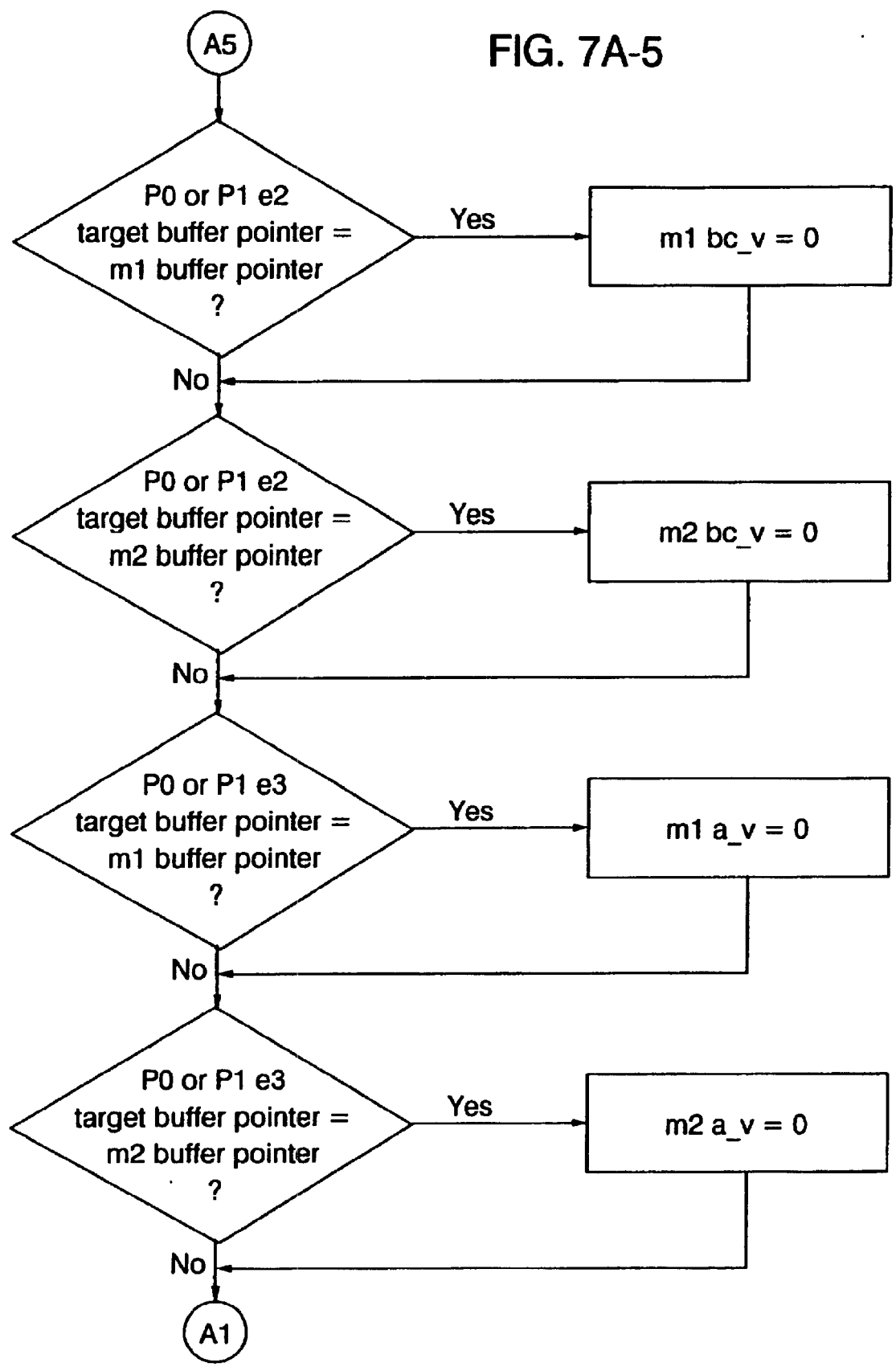
Figures 6, 7A:
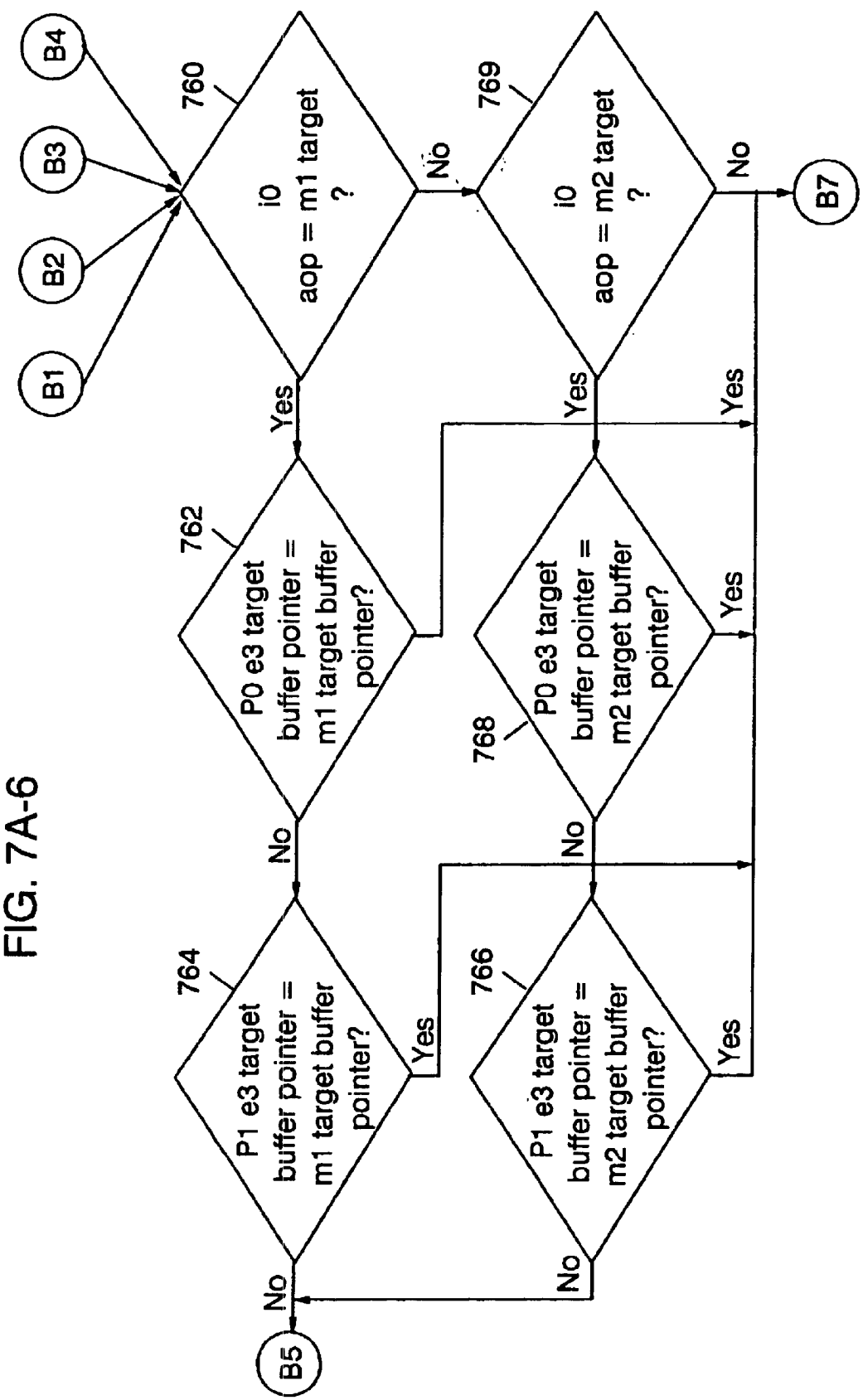
Figures 7A, 7B:
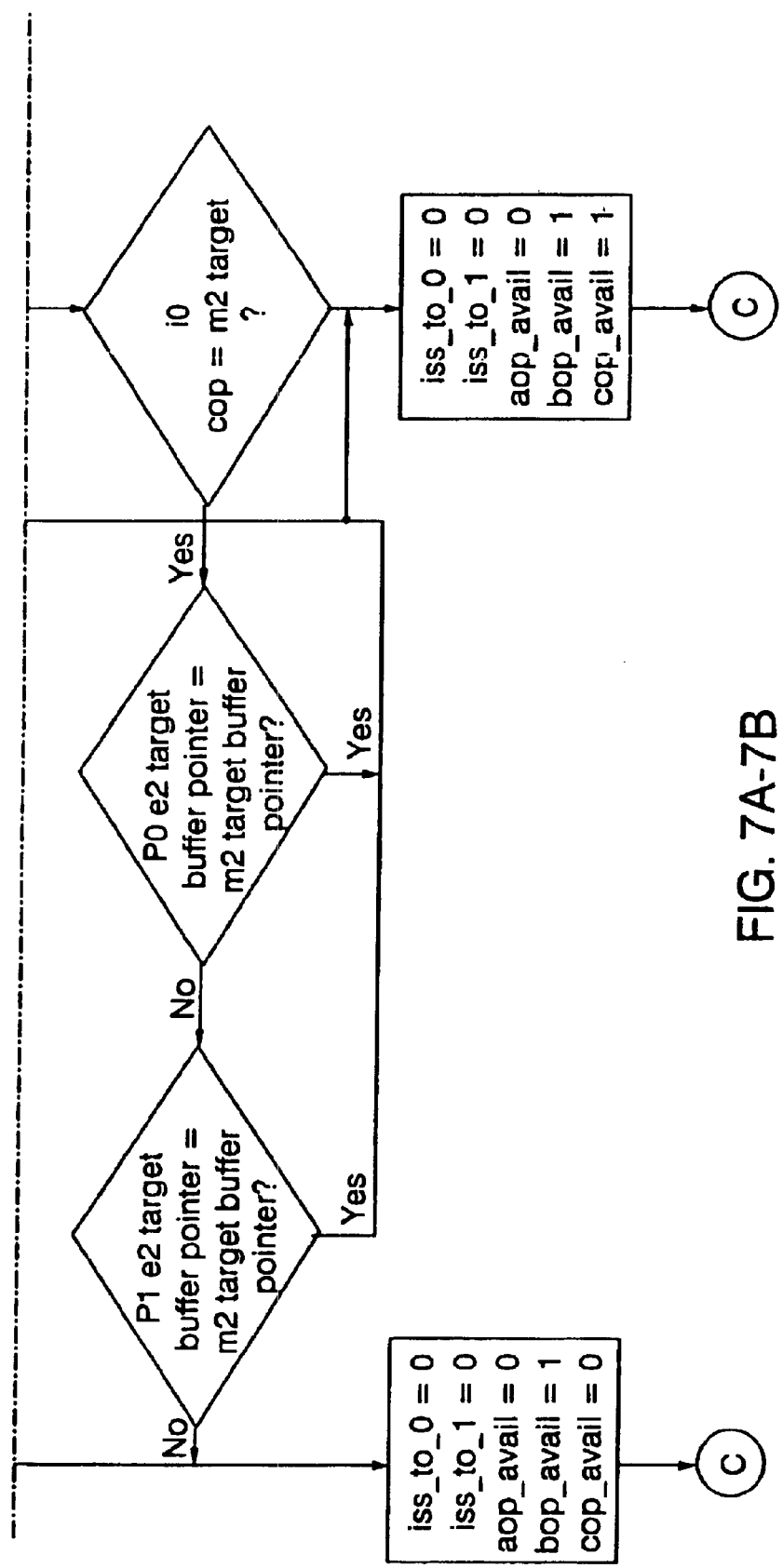

A portion of FPU rename and decode logic 302 is illustrated in greater detail in FIG. 4. FPU rename and decode logic 302 comprises rename logic 402, instruction interlock detect log 404, instruction target detect logic 406, instruction categorization logic 408, M2/M1 control logic 410, M2 update logic 412, M2 validity logic 414, M1 update logic 416, M1 validity logic circuit 418, M2 history register 420, M2 register 422, M2 register 424, M1 history register 426, M1 register 428, M1 register 430, functional unit dependency clearing check logic 432, instruction issue interlock detect circuit 434, and instruction issue state logic circuit 436.

The Inst0, Inst1, Inst2, and Inst3 signals are coupled to rename logic 402, instruction interlock detect logic 404, instruction target detect logic 406, instruction categorization logic 408, M2 update logic 412, and M1 update logic 416. The Valid0, Valid1, Valid2, and Valid3 signals are coupled to M2/M1 control logic 410. Rename logic 402 is coupled to M2 update logic 412 and M1 update logic 416 to provide a plurality of rename signals. Instruction interlock detect logic circuit 404 is coupled to M2 validity logic 414 and instruction issue interlock detect circuit 434 to provide a plurality of interlock A signals. Similarly, instruction interlock detect logic 404 is coupled to M1 validity logic 418 and instruction issue interlock detect circuit 434 to provide a plurality of interlock B signals. It should be noted that three interlock signals are provided for each issued instruction. Each instruction potentially has a target and up to three sources, denoted as aop, bop, cop. Either aop, bop, cop or a combination of some or none may interlock with a previous instruction.

Instruction target detect logic 406 is coupled to instruction interlock detect logic 404 to provide a target detect signal. Similarly, instruction target detect logic 406 is coupled to M2/M1 control logic 410 and instruction issue state logic 436 to provide a target detect signal. Instruction categorization logic 408 is coupled to M2/M1 control logic 410 to provide a categorization signal. M2/M1 control logic circuit 410 is coupled to M2 update logic 412, M2 validity logic 414, M1 update logic 416, and M1 validity logic 418. M2 update logic 412 is coupled to M2 history register 420. M2 history register 420 is coupled to functional unit dependency clearing check logic 432, M2 update logic 412, and instruction interlock detect logic 404. M2 validity logic 414 is coupled to M2 register 422 and to M2 register 424. M2 register 422 and M2 register 424 are each coupled to instruction issue interlock detect circuit 434. M1 update logic 416 is coupled to M1 history register 426. M1 history register 426 is coupled to functional unit dependency clearing check logic 432 and instruction interlock detect circuit 404. M1 history register 426 is also coupled to M1 update logic 416. M1 validity logic 418 is coupled to M1 register 428 and to M1 register 430. M1 register 428 and M1 register 430 are coupled to instruction issue interlock detect 434. M1 register 428 and M1 register 430 are coupled to M1 validity logic 418 and M2 validity logic 414. Instruction interlock detect circuit 436 is coupled to instruction issue state logic 436. Functional unit dependency clearing check logic 432 is coupled to instruction issue state logic 436. Additionally, a plurality of p0_e2_bfr signals, a plurality of p0_e3_bfr signals, a plurality of p1_e2_bfr signals, and a plurality of p1_e3_bfr signals are each provided to functional unit dependency clearing check logic 432. In one embodiment of the present invention, each of the plurality of po_e2 bfr signals, po_e3 bfr signals, p1_e2 bfr signals, and p1_e3 bfr signals is comprised of five signals.

The text provided above has described the connectivity of the present invention. Description of the present invention will subsequently be provided in greater detail.

Description of Operation

FIG. 1 illustrates a data processing system 100 which implements one embodiment of the present invention. It should be noted that the present invention is implemented in a portion of CPU 110 and is used to provide data and control information to a remaining portion of data processing system 100.

FIG. 2 illustrates the portion of CPU 110 in greater detail. During operation of one embodiment of the present invention, instructions are fetched from I-cache 202 and provided to instruction unit/branch unit 204 with the appropriate control signals for their execution. Operation of an instruction cache, such as I-cache 202, is well-known in the data processing art and, therefore, will not be described in greater detail herein. Within instruction unit/branch unit 204, the instructions provided by I-cache 202 are stored in registers. Specifically, there are four dispatch registers (not illustrated herein) in one embodiment of the present invention. Each of these four dispatched registers is accessed and four instructions are selectively dispatched in a single cycle therefrom. Furthermore, each of the four dispatch registers include an instruction part, an instruction pre-decode part, and an instruction valid part. It should be noted that any number of dispatch registers may be implemented in the present invention with a corresponding modification in a remaining portion of the logic in the data processing system. Additionally, it should be recognized that the dispatch register may include different portions than those previously outlined herein.

As previously mentioned, the dispatch registers included in instruction unit/branch unit 204 include a pre-decode mechanism. This mechanism provides partially decoded information describing an instruction type and target information to facilitate the speedy determination of instruction characteristics. Furthermore, an instruction valid portion of the dispatch registers indicates that an instruction stored within a dispatch register is valid and may be accessed to perform a correct computing function. The use of valid portions and pre-decode mechanisms within an instruction dispatch register is well-known in the data processing art and, therefore, will not be described in greater detail herein. Information about each of the instructions is transferred to an appropriate one of FXU 206, load/store unit 208, and FPU 210 via the dispatched instructions. The functions generally performed by each of devices 206, 208, and 210 are also well-known in the data processing art and, therefore, will not be described in greater detail.

As the present invention resides in FPU 210 in one embodiment of the present invention, operation of FPU 210 will subsequently be described in greater detail.

Refer now to FIG. 3 for a more detailed description of operation of FPU 210. When each of the four instructions stored in the four dispatch registers of instruction unit/branch unit 204 is accessed, the instructions are provided to FPU rename and decode logic circuit 302 of FIG. 3. Each of these dispatched instructions is referred to as one of Inst0, Inst1, Inst2, and Inst3. Additionally, validity portions of each of the instructions is provided via a respective one of the Valid0, Valid1, Valid2, and Valid3 signals provided via a control bus.

FIG. 4 provides' a more detailed illustrated of FPU rename and decode logic circuit 302. During operation, dispatch instruction pre-decode information is decoded to determine an instruction type in instruction categorization logic 408 of FPU rename and decode logic circuit 302. Instruction categorization logic 408 determines a type of instruction which is currently being executed. Instruction categorization logic 408 determines whether an instruction is a floating point unit arithmetic instruction, referred to as a fpu rr, a floating point load operation, or a floating point unit store operation. Furthermore, instruction categorization logic circuit 408 determines which sources are used by the instruction. In one embodiment of the invention, three sources may be used by an instruction. These three sources are referred to as "a," "b," and "c."

In FIG. 4, instruction target detect logic 406 determines whether an fpr register is used by an instruction currently being executed to store results. Information about the use of an fpr register to store results is also encoded in the pre-decode bits of the dispatched instruction in one embodiment of the present invention. Therefore, the pre-decoded bits of the instruction are decoded to determine if the instruction possesses a target fpr. For instance, "compare" instructions have no fpr target, but a multiply instruction does have an fpr target. While instruction target detect logic circuit 406 is making this determination, instruction interlock detect logic circuit 404 determines whether any of the four dispatched instructions are interlocked. The term interlock indicates that multiple instructions have data interdependencies. Furthermore, instruction interlock detect logic circuit 404 determines the existence of potential interlock situations between dispatched instructions and instructions saved in either M2 history register 420 or M1 history register 426. It should be noted that an interlock situations occurs when data accessed by one of the four instructions is generated by another one of the four instructions being concurrently executed. During operation, instruction interlock detect logic 404 provides the Interlock A and Interlock B signals to both M2 validity logic 414 and M1 validity logic 418. Each of M2 validity logic 414 and M1 validity logic 418 uses this information to invalidate information stored in M2 history register 420 and M1 history register 426, respectively.

Instruction issue interlock detect circuit 434 identifies matches between dispatched instructions and instructions maintained in M2 history register 420 and M1 history register 426 to identify "breaks" in dependencies due to an interspersed instruction having the identical target location as the previous instruction. When such breaks are detected, the dependency of a dispatched instruction upon the history register is suppressed and the dependency on the dispatched instruction is asserted instead. To detect such breaks in instruction interlock detect logic 404, targets of a dispatched instruction are compared with the targets of previous instructions which are stored in a respective one of M2 history register 420 and M1 history register 426. If the dispatched instruction has an fpr target (i.e., a target of a fpu rr instruction), a target stored in one of M1 history register 426 and M2 history register 420 is invalid if it matches the fpr target value.

Furthermore, rename logic 402 receives each of the Inst0 through Inst3 instructions and determines an fpr target corresponding to that instruction. Each of the fpr targets of the instructions are allocated to a corresponding rename buffer/FPR location, where the results of the instructions' executions are temporarily stored until the instructions complete. Rename logic 402 subsequently provides the allocated rename buffer locations to M2 update logic 412 and M1 update logic 416, which respectively selectively store the buffer location within M2 history register 420 and M1 history register 426. It should be noted that rename logic 402 and the functions served thereby are well-known to those with skill in the data processing art and, therefore, will not be described in greater detail.

M2/M1 control logic circuit 410 also provides control information for M2 update logic 412 and M1 update logic 416. M2/M1 control logic circuit 410 uses the decoded instruction classification information provided by instruction categorization logic 408 and fpr target information provided by instruction target detect logic 406 to determine a number of fpu rr instructions having a target dispatched in a current cycle. M2/M1 control logic circuit 410 uses this information to control the storage of a dispatch state and the moving or holding of a history state value in one of M2 history register 420 and M1 history register 426.

If no fpu rr instruction having an fpr target is dispatched in the current cycle, then a second, or M2, history state is stored in M2 history register 420 and a first, or M1, history state is stored in M1 history register 426. Conversely, if one fpu rr instruction has an fpr target and is dispatched in a current timing cycle, then a state of the dispatched fpu rr instruction is saved in M1 history register 426. Furthermore, the contents of M1 history register 426 are transferred to M2 history register 420 via M2 update logic 412.

Furthermore, if two or more fpu rr instructions both have an fpr target and are dispatched in a current timing cycle, then the state of the last two fpu rr instructions dispatched and having a fpr target are saved in M2 history register 420 and M1 history register 426, respectively. Stated another way, a state of the next to last fpu rr instruction dispatched and having an fpr target is saved in M2 history register 420. Similarly, a last fpu rr instruction dispatched and having a fpu target is saved in M1 history register 426. Control for making each of these transfers to and from M2 history register 420 and M1 history register 426 is provided by M2/M1 control logic 410, in conjunction with M2 update logic 412 and M1 update logic 416, respectively.

During operation, a state maintained in each of M2 history register 420 and M1 history register 426 includes an fpr target of the corresponding instruction, a rename buffer location associated with the target for that instruction, a valid bit for dependency checking of a first operand (a V) and a valid bit for dependency checking of a second or third operand (bc V). An fpr target state is maintained in M2 history register 420 and M1 history register 426 and is used by instruction interlock detect logic 404 to determine potential interlocks between an instruction residing in a history state register and the dispatched instructions. Only an indication of the target, the rename buffer, and their validity to interlock determinations for aop (a operand) and bop (b operand) or cop (c operand) are stored in the history state register. The instruction itself is queued on instruction queue 304. The state registers are maintained in rename and decode logic 302. The pointers (i.e., the fpr target pointer) for M2 history register 420 and M1 history register 426 are provided to the instruction interlock detect logic 404 which compares these fpr target pointers with the fpr source operand pointers of each dispatched instruction for potential interlocks. This comparison is provided to the instruction issue interlock detect logic 434, where it is qualified with the validity of the appropriate operand and the interlock "breaks" mentioned earlier to determine if interlocked. Interlock detect logic circuit 404 performs this function through the use of pointers.

The pointers (i.e. the fpr target pointer) for M2 history register 420 and M1 history register 426 are provided to instruction interlock detect circuit 404 which compares these fpr target pointers with fpr operand pointers for each instruction to determine when potential interlocks occur. This comparison result is provided to instruction interlock detect logic 404, where it is qualified with the validity of the appropriate operand and the interlock "breaks" to determine if an interlock condition has occurred.

The results of operations of instruction interlock detect logic 404, together with the "a V" and "bc V" validity bits are provided to instruction issue interlock detect logic circuit 434 to identify when an interlock situation persists. If instruction interlock detect logic circuit 404 detects a potential interlock situation between a dispatched instruction and an instruction in one of M2 history register 420 and M1 history register 426, the result is logically combined with a corresponding valid bit to determine when the interlock has and has not been cleared by execution of one of FPU pipe 0 310 or FPU pipe 1 312. It should be noted that in one embodiment of the present invention, this logical combination is a logical AND function. Furthermore, it should be well-known to those skilled in the art that additional logical combinations may be implemented where the circuitry so requires.

During the previously described operations, targets to rename buffer locations associated with fpr targets in the M2 history register 420 and M1 history register 426 are compared with target rename buffer locations piped with an instruction down one of FPU pipe 0 310 and FPU pipe 1 312. This comparison operation is performed to determine whether a detected dependency is being cleared in a current timing cycle. The comparison operation is performed by functional unit dependency clearing check logic 432. It should be noted that the target rename buffer locations are provided by the plurality of p0_e2_bfr signals, the plurality of p0_e3_bfr signals, the plurality of p1_e2_bfr signals, and the plurality of p1_e3_bfr signals. Each of the p0_e2_bfr signal, p0_e3_bfr signal, p1_e2_bfr signal, and p1_e3_bfr signal is provided to a functional unit dependency clearing check logic 432 by control units (not illustrated) within FPU pipe 0 310 and FPU pipe 1 312.

Figure 5:
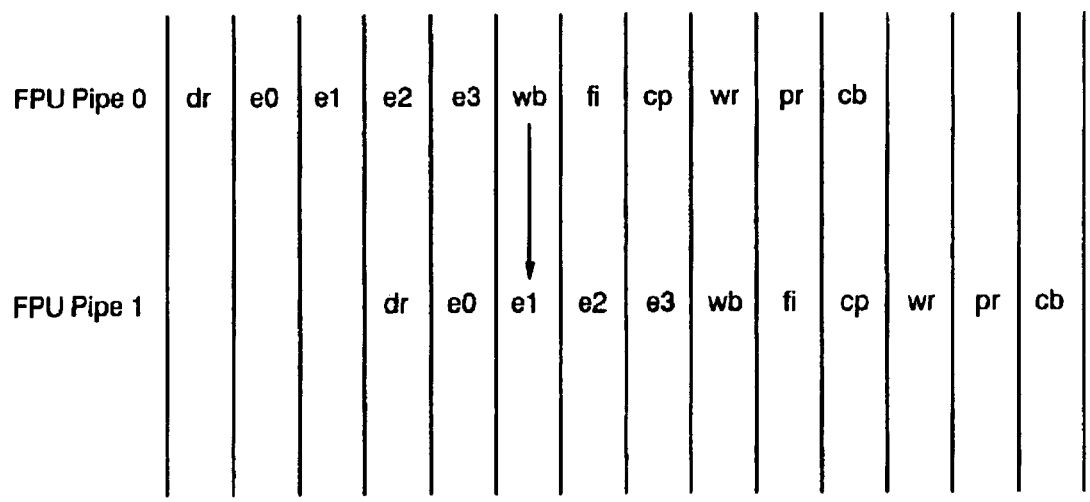
FIG. 5 illustrates, in timing chart form, instructions executed in two pipes of the data processing system in accordance with one embodiment of the present invention.

It should be noted that bop and cop dependencies are cleared when a data generating instruction is in either the e2 stage of FPU pipe 0 310 or FPU pipe 1 312. FIG. 5 illustrates a series of stages of each of FPU pipe 0 310 and FPU pipe 1 312. In FIG. 5, instruction i1 is assumed to have a bop or cop dependency on instruction i0.

In one embodiment to the present invention, assume that three cycle forwarding exists from a write back (WB) stage to a first execution (e1) stage for bop and cop dependencies. Thus, as illustrated in FIG. 5, instruction i1 executes in an e1 stage of FPU pipe 0 310 as instruction i0 executes in a WB stage of FPU pipe 0 310. Before proceeding further with this example, a description of the acronyms utilized in FIG. 5 will be provided below.

The acronyms and their definition are as follows:
DR=instruction dispatch/register rename stage
e0=operand fetch stage
e1=execute one stage
e2=execute two stage
e3=execute three stage
WB=write result to rename buffer (hidden) or a write back stage
FI=finish (hidden) stage
CP=complete (hidden) stage
WV=write back vector to FPR (hidden) stage
PR=prioritize for FPR write (hidden) stage
CB=copy from rename buffer to FPR (hidden).

With these acronyms so defined, FIG. 5 illustrates that when instruction i1 is dispatched and an instruction i2 is in the e2 stage of FPU pipe 0 312, then a dependency of instruction i1 upon instruction i0 may be satisfied by forwarding logic (illustrated in FIG. 3) if instruction i1 is issued to the one of FPU pipe 0 310 and FPU pipe 1 312 which is currently clearing the dependency.

A dependency between an i1 or an i2 instruction occurs in some situations. For example, assume that a fadd instruction is followed by a fmul instruction, where the fadd instruction is a "floating point add" and, therefore, a fpu rr instruction. Additionally, assume the aop and bop values are a source of the fadd instruction and the fmul instruction sources the aop and cop values in a next instruction cycle. This relationship may be expressed in the following manner:

fadd target←aop+bop; and fmul target←aop×cop.

As may be observed, the aop of the fmul instruction is dependent upon the execution of the fadd instruction when the fpr designated for the aop of the multiply instruction is the same as the target location for the fadd instruction. For example, assume the following instructions are to be executed:

fadd (5)←(1)+(2);

fmul (6)←(5)×(8); where (z) means contents of location z.

As may be observed from the example provided above, the fadd instruction has target of (5). This location is subsequently referred to the aop for the fmul instruction. Subsequently, when the fmul instruction is accessed, the value stored at location (5) by the fadd instruction. Therefore, an aop dependency exists between the fadd and fmul instruction. A description of one embodiment to the present invention which clears such dependencies will subsequently be provided below.

In this type of operation, the bop and cop dependencies are cleared when an instruction from which a subsequent instruction depends, is executing in the e2 stage of one of FPU pipe 0 310 and FPU pipe 1 312. For example, consider the above instruction sequence in which the cop of the fmul is dependent on the execution of the fadd instruction in a manner illustrated below:

fadd (5)←(1)+(2);

fmul (6)←(8)×(5).

In this example, an issue state bit to a pipe clearing the dependency is asserted because a value in the M1 history register rename buffer pointer 308 matches the target rename buffer pointer in a pipe's (310 or 312) e2 stage. Stated another way, if instruction i0 is executing in the e2 stage of FPU pipe 1 312 when instruction i1 is dispatched, functional unit dependency clearing check logic circuit 432 will compare a rename buffer location pointer allocated to a target of instruction i0 and residing in M1 history state register 420 with the rename buffer pointer allocated to the target of the instructions executing in the e2 stage of FPU pipe 1 312 (in this case instruction i0). The target of the instruction executing in the e2 stage of FPU pipe 1 312 is provided as a p1_e2_bfr signal to functional unit dependency clearing check logic 432. When the pointers match, as in this case, an indication is provided to instruction issue state logic 436 to assert the issue bit to the matching pipe (in this case, FPU pipe 1 312). Functional unit dependency clearing check logic 432 subsequently provides a signal which selectively enables instruction issue state logic 436 to assert an issue bit to FPU pipe 1 312 for instruction i1 in response to this comparison operation.

Furthermore, since an instruction only executes in one of FPU pipe 0 310 and FPU pipe 1 312 and a rename buffer location associated with a target is unique because of a configuration of rename logic 402, a bop rename buffer (not illustrated in detail herein) matches the target rename buffer in only one of FPU pipe 0 310 and FPU pipe 1 312. Therefore, only the issue bit provided to a matching one of FPU pipe 0 310 and FPU pipe 1 312 e2 stage will be asserted in one embodiment of the present invention. The issue bit is also subsequently provided to FPU instruction queue 304 (of FIG. 3) to indicate that a bop or cop dependent instruction is only available for issue in the following cycle to the FPU pipe (FPU pipe 0 310 or FPU pipe 1 312) identified by the issue bit(s). Aop dependencies are handled in a similar manner to bop and cop dependencies. However, when cop dependencies are detected, the e3 stage of the pipeline is compared. Additionally, when an interlock clearing operation occurs, the issue bits to both FPU pipe 0 310 and FPU pipe 1 312 are asserted.

While the state of the issue bits is being determined, functional unit dependency clearing check logic 432 invalidates a "bc V" bit of a corresponding history register when the "bc V" bit recurs in either the M2 history register 420 or M1 history register 426 in a following timing cycle when the dependency clearing logic matches the history buffer pointer with the buffer pointers in the e2 stage of either FPU pipe 0 310 or FPU pipe 1 312. When the "bc V" bit has been cleared from one of M2 register 424 or M1 register 430, a dependency is not detected by instruction interlock detect circuit 434 or instruction issue state logic 436. Therefore, instruction issue state logic 436 asserts issue bits to both FPU pipe 0 310 and FPU pipe 1 312. If a dependency is detected between a bop or cop of an instruction and either M2 history register 420 and M1 history register 426, and a corresponding "bc V" bit is asserted, and the M2 or M1 rename buffer pointer does not match the FPU pipe 0 or FPU pipe 1 e2 stage rename buffer pointer, then neither issue bit is asserted.

FPR targets of previous instructions are compared to fpr instruction pointers of source operands of subsequent instructions to determine whether the source of a subsequent instruction is being calculated by the previous instruction. This dependency is detected between a bop or cop pointer of an instruction and target pointers residing in M2 history register 420 and M1 history register 426. If the "bc V" bit is asserted, the comparison of the current and previous instruction indicates that the dependency exists preventing the setting of issue bits unless dependency clearing logic determines otherwise, as discussed above.

Subsequently, The "bc V" bit may be reset by determining if a pipe has calculated the dependent value by the time the dependent instruction is issued.

This operation is accomplished by comparing a pointer into a first location of rename buffer 308 allocated by rename logic 402 to the target of the instruction whose history is maintained in M2 history register 420 or M1 history register 426 with a pointer into a second location of rename buffer 308 allocated by rename logic 402 to the target of the instruction being executed in an appropriate stage of either pipe. In one embodiment of the present invention, an appropriate stage to reset the "bc V" bit is the e2 stage of either pipe. More specifically, the pointer into the rename buffer location allocated to the target of the instructions whose history is in M2 history register 420 is compared to p0_e2_ bfr signals and to p1_e2_bfr signals. A corresponding "bc V" value is reset when the instruction history in M2 history register 420 is to be retained in M2 history register 420 in a next timing cycle. A similar operation occurs for comparisons in M1 history register 426.

Additionally, if the contents of M1 history register 426 are transferred to M2 history register 420 in a cycle, a pointer of M1 history register 426 into the rename buffer location allocated to its target is compared to the plurality of p0_e2_ bfr and p1_e2_bfr signals to determine if the "bc V" is stored in M2 register 424 is to be reset during the next timing cycle.

Additionally, when the pointer into the rename buffer location allocated to the target of the instruction whose history is in M2 history register 420 or M1 history register 426 matches the pointer into the location rename buffer allocated to the target of the instructions executing in the e2 stage of one of the pipes, the issue bit for the matching pipe is asserted for a currently dispatched instruction possessing a bop or cop dependency on the instruction whose history is stored in M2 history register 420 or M1 history register 426, while the issue bit for the non-matching pipe is left unasserted.

Figure 6:
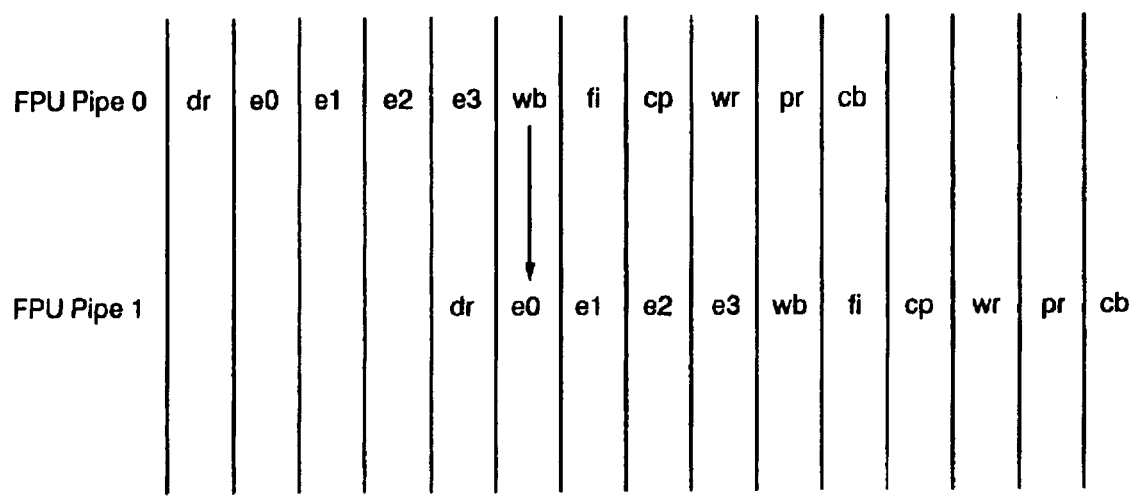
FIG. 6 illustrates, in timing chart form, two pipes of instructions executed by the data processing system of the present invention.

A methodology for determining when dependencies on an aop (a operand) should be issued is similar to the methodology described above for determining when instructions with bop or cop dependencies should be issued with two exceptions. FIG. 6 illustrates the stages of execution of two instructions in FPU pipe 0 310 when the instructions have an aop dependency. As illustrated in FIG. 6, aop dependencies are cleared in the e3 stage of a pipe, because forwarding from a WB (write back) stage to the dependent aop is only allowed into the e0 stage of either pipeline. This requirement is due to timing considerations in one embodiment of the invention. In this embodiment of the present invention, a multiply instruction typically occurs between a value aop and a cop value. Furthermore, as is performed in state-of-the-art multiply implementations, one of aop or cop values is Booth recoded to reduce a number of partial products that are produced.

In one embodiment of the present invention, the aop is chosen for Booth recoding. During execution of a multiplication operation, timing path is too lengthy to forward the result from the WB stage of a pipe into the e1 stage of the pipe and then execute Booth recoding, partial product generation, and partial product reduction for the multiplication operation. However, the result in the WB stage of the pipe may be forwarded to the cop value while the aop value is being Booth recoded. Therefore, an operand is forwarded to only an e0 stage of a pipe during an access of an aop value. Thus, FIG. 6 illustrates that when instruction i1 is dispatched and instruction i0 is in the e3 stage of FPU pipe 0 310, the data is available for forwarding to the e0 stage of instruction i1. Therefore, the dependency is cleared for an aop when the instruction upon which the "a" operand is dependent is executing in the e3 stage of either pipe.

Secondly, any operand (a, b, or c) may be forwarded into an e0 cycle for a corresponding FPU pipe. Therefore, in the example illustrated in FIG. 6, when functional unit dependency clearing check logic circuit 432 determines that an instruction upon which a subsequent instruction is dependent is executing in an e3 stage of one of FPU pipe 0 310 and FPU pipe 1 312, functional unit dependency clearing check logic 432 enables instruction issue state logic 436 to assert issue bits to both FPU pipe 310 and FPU pipe 1 312 to indicate that a dependent instruction can be issued to either of the pipes in a following timing cycle. Concurrently, the "a V" bit of one of M2 register 422 and M1 register 428 is negated if the instruction remains on either of M2 history register 420 or M1 history register 426 in a subsequent timing cycle and the instruction whose target history is in M2 history register 420 or M1 history register 426 has executed in the e3 stage of either pipe. Therefore, the dependency will not be detected for subsequently dispatched instructions. Additionally, the issue bits will be asserted to both FPU pipe 0 310 and FPU pipe 1 312 for those instructions.

The aforementioned description provides a basic explanation of operation of the out-of-order mechanism of the present invention. However, the present invention also provides solutions for more difficult cases in which a determination of issue bits' logic states is more difficult. The determination of issue bits is further complicated when instructions have multiple operands that are dependent upon different instructions within a "checking window." For example, assume that instruction i2 has a bop (b operand) that is dependent upon instruction i1 and a cop (c operand) that is dependent upon instruction i0. Furthermore, assume that instruction i0 is stored within M2 history register 420 and instruction i1 is stored within M1 history register 426. Additionally, assume that instruction i0 is in an e2 stage of FPU pipe 0 310 and instruction i1 is in an e2 stage of FPU pipe 1 312. As described above in this situation, the issue bit to FPU pipe 0 310 would be asserted to reflect the "b" operand (bop) dependency and the issue bit to FPU pipe 1 312 would be asserted to reflect the cop dependency. However, in this example, the instruction cannot issue in a next timing cycle since instruction i2 would have to issue to FPU pipe 0 310 to forward into the "c" operand (cop) in the e1 stage of FPU pipe 0 310 and instruction i2 would issue FPU pipe 1 312 to forward into its b operand (b1) in the e1 stage of FPU pipe 1 312.

Clearly, both operations do not occur concurrently. To handle such cases, three additional status bits are defined, generated upon dispatch from instruction unit/branch unit 204, and maintained in queues. As is illustrated in FIG. 4, these queues follow the issue bit generation logic (i.e., instruction issue state logic 436). These three additional status bits are respectively referred to as a_available, b_available, and c_available bits. Each of the a_available, b_available, and c_available bits allow the issue bits for the above cases to remain unasserted, but provide status information for each instruction to indicate when multiple dependencies have been cleared. Therefore, in the above case, the a_available bit would be asserted since the "a" operand (aop) has no dependency in instructions i0, i1, or i2. Additionally, since the "b" operand (bop) is satisfied by instruction i1 in FPU pipe 0 310 and the "c" operand (cop) is satisfied by the execution of instruction i2 and FPU pipe 1 312, the b_available and c_available bits are set.

Subsequently, in a following cycle, the b_available and c_available bits appear in the queue; however, the issue bits remain unasserted in the queue. In this following timing cycle, instructions i0 and i1 are in the e3 stages of FPU pipe 0 310 and FPU pipe 1 312, respectively. Furthermore, instruction i2 is not issued. As will be discussed in greater detail below, when all of the operands (a, b, and c) are available, the issue bits to both FPU pipe 0 310 and FPU pipe 1 312 are asserted and stored in FPU instruction queue 304. Thus, in a second timing cycle, both issue bits are asserted and instruction i2 can issue into an e0 stage of an appropriate one of FPU pipe 0 310 and FPU pipe 1 312. In this cycle, both instruction i0 and instruction i1 are in a WB (write back) state of a corresponding pipe and available to be forwarded as the bop and cop in an e0 stage of either FPU pipe 0 312 or FPU pipe 1 312. As this instruction can issue equally well to either pipe, determination of the pipe to which it issues is determined by the other instructions within the four instruction window stored at the bottom of the queue. For example, if a second instruction selected for issue can issue only to FPU pipe 0 310, then the previously described instruction that can issue to either pipe, issues to FPU pipe 1 312 and vice versa.

It should be noted that appropriate issue bits and a_available, b_available, and c_available bits are asserted when certain conditions are met. For example, the "available" bits are set when an operand is not required by the instruction. For example, for an "add" instruction in which an "a" operand is added to a "b" operand, the c_available bit would be asserted as the c operand is not required by the instruction. The c_available bit is also set during an instruction decode operation executed by FPU rename and decode logic circuit 302. As well, an available bit will be set when an operand is independent of other fpr rr instructions updating an FPR target within a window of three such instructions.

For example, assume instructions i1 through i3 are independent of one another. Instruction i4 is dependent on instruction i1, but is not within the three instruction window implemented in one embodiment of the present invention. The following instructions illustrate this relationship:

i1 fadd (0)←(1)+(2);
i2 fadd (3)←(4)+(5);
i3 fadd (6)←(7)+(8);
i4 fadd (9)←(0)+(10).

One embodiment of the present invention will indicate the aop, bop and cop values of instruction i4 are available and assert the issue bits to both FPU pipe 0 310 and FPU pipe 1 312.

Other alternative implementations may also be implemented. For example, history buffer information may be maintained for more than the last two FPU rr instructions. Additionally, the dependencies between M2, M1, and each of instructions i1, i2, i3, i4 could be determined for any number of instruction windows. Furthermore, another embodiment of the present invention may implement different instruction window lengths for a number of instructions. For example, assume six instruction windows for i4, five instruction windows for i3, four instruction windows for i2, and three instruction window for i1, where i1, i2, i3, and i4 are the four dispatched instructions.

Additionally, the available bits, a_available, b_available, and c_available, are set when the operand is dependent upon another instruction, but certain situations exist. For example, in a first such situation which involves an "a" operand, the a_available bit will be set when the "a V" bit is negated or an instruction satisfying the dependency is operating in the e3 stage of an appropriate one of FPU pipe 0 310 and FPU pipe 1 312.

The mechanism described above provides a precise out-of-order issue mechanism which efficiently and effectively handles several multiple dependencies among different fpu rr instructions within a three instruction window. The mechanism is, however, not precise between instructions outside the three instruction window. For these cases, dependent instructions may be eagerly issued occupying issue slots though their dependencies persist. In these cases, hold logic precisely determines whether the issuing instruction can truly execute and holds the instruction in the queue until the following cycle if the instruction cannot execute. Furthermore, a less precise mechanism may also be implemented to select issuance, which the hold circuitry again maintains architectural compliance at the expense of wasted issue cycles. For instance, assume the issue bits provided to both FPU pipe 0 310 and FPU pipe 1 312 are asserted. Subsequently, hold logic (not illustrated herein) may be used to recognize that the operands are not available for execution and the instruction should be held in the queue until the operands become available. In such a situation, an instruction that could have issued out-of-order would be preempted from issue by the instruction that was erroneously thought to be available for issue, but could not truly execute.

In fact, the above-described mechanism is often dependent upon such hold logic. For example, instructions that are dependent upon load instructions do not recognize dependencies in terms of scheduling for issue. Therefore, issue bits associated with instructions dependent upon load instructions are asserted and such instructions are scheduled to be issued even though the load execution may not have executed. This scheduling will then take an issue slot in one of the pipes. In one embodiment of the present invention, two FPU units are implemented and, there are two issue slots available per cycle. In this situation, as many as four instructions at a predetermined location in the queue are considered for selecting two instructions to fill the two slots. One instruction will issue to one of the pipes and a second instruction will issue to the other pipe. The issue slot is represented by outputs of Table 1.

TABLE 1

| Inputs | | | | | | | | Outputs | | | | | | | |
|---|---|---|---|---|---|---|---|---|---|---|---|---|---|---|---|
| AIQ0st0 | AIQ0st0 | AIQ1st0 | AIQ1st0 | AIQ2st0 | AIQ2st0 | AIQ3st0 | AIQ3st0 | AIQ0 | AIQ0 | AIQ1 | AIQ1 | AIQ2 | AIQ2 | AIQ3 | AIQ3 |
| 0 | 1 | 0 | 1 | 0 | 1 | 0 | 1 | 0 | 1 | 0 | 1 | 0 | 1 | 0 | 1 |
| 0 | 0 | 0 | 0 | 0 | 0 | 0 | 1 | 0 | 0 | 0 | 0 | 0 | 0 | 0 | 1 |
| 0 | 0 | 0 | 0 | 0 | 0 | 1 | 1 | 0 | 0 | 0 | 0 | 0 | 0 | 0 | 1 |
| 0 | 0 | 0 | 0 | 0 | 1 | 0 | 0 | 0 | 0 | 0 | 0 | 0 | 0 | 1 | 0 |
| 0 | 0 | 0 | 0 | 0 | 1 | 1 | 0 | 0 | 1 | 0 | 0 | 0 | 0 | 1 | 0 |
| 0 | 0 | 0 | 0 | 1 | 0 | 0 | 0 | 0 | 0 | 0 | 0 | 0 | 1 | 1 | 0 |
| 0 | 0 | 0 | 0 | 1 | 0 | 0 | 1 | 0 | 0 | 0 | 0 | 0 | 1 | 1 | 0 |
| 0 | 0 | 0 | 0 | 1 | 0 | 1 | 0 | 0 | 0 | 0 | 0 | 0 | 1 | 1 | 0 |
| 0 | 0 | 0 | 0 | 1 | 1 | 0 | 0 | 0 | 1 | 0 | 0 | 0 | 0 | 1 | 0 |
| 0 | 0 | 0 | 1 | 0 | 0 | 0 | 0 | 0 | 0 | 0 | 0 | 1 | 0 | 0 | 1 |
| 0 | 0 | 0 | 1 | 0 | 0 | 0 | 1 | 0 | 0 | 0 | 0 | 1 | 0 | 0 | 1 |
| 0 | 0 | 0 | 1 | 0 | 0 | 1 | 0 | 0 | 0 | 0 | 0 | 1 | 0 | 0 | 1 |
| 0 | 0 | 0 | 1 | 0 | 1 | 0 | 0 | 0 | 0 | 0 | 0 | 1 | 0 | 0 | 1 |
| 0 | 0 | 0 | 1 | 0 | 1 | 1 | 0 | 0 | 0 | 0 | 0 | 1 | 0 | 0 | 1 |
| 0 | 0 | 0 | 1 | 1 | 0 | 0 | 0 | 0 | 0 | 0 | 0 | 1 | 0 | 1 | 0 |
| 0 | 0 | 0 | 1 | 1 | 0 | 1 | 0 | 0 | 0 | 0 | 0 | 1 | 0 | 1 | 0 |
| 0 | 0 | 0 | 1 | 1 | 1 | 0 | 0 | 0 | 1 | 0 | 0 | 1 | 0 | 0 | 0 |
| 0 | 0 | 1 | 0 | 0 | 0 | 0 | 0 | 0 | 0 | 0 | 1 | 0 | 0 | 1 | 0 |
| 0 | 0 | 1 | 0 | 0 | 0 | 1 | 0 | 0 | 0 | 0 | 1 | 0 | 0 | 1 | 0 |
| 0 | 0 | 1 | 0 | 0 | 1 | 0 | 0 | 0 | 0 | 0 | 1 | 0 | 0 | 1 | 0 |
| 0 | 0 | 1 | 0 | 0 | 1 | 1 | 0 | 0 | 0 | 0 | 1 | 0 | 0 | 1 | 0 |
| 0 | 0 | 1 | 0 | 1 | 0 | 0 | 0 | 0 | 0 | 0 | 1 | 0 | 0 | 1 | 0 |
| 0 | 0 | 1 | 0 | 1 | 0 | 1 | 0 | 0 | 0 | 0 | 1 | 0 | 0 | 1 | 0 |
| 0 | 0 | 1 | 0 | 1 | 1 | 0 | 0 | 0 | 0 | 0 | 1 | 0 | 0 | 1 | 0 |
| 0 | 0 | 1 | 0 | 1 | 1 | 1 | 0 | 0 | 0 | 0 | 1 | 0 | 0 | 1 | 0 |
| 0 | 0 | 1 | 1 | 0 | 0 | 0 | 0 | 0 | 1 | 1 | 0 | 0 | 0 | 0 | 0 |
| 0 | 0 | 1 | 1 | 0 | 0 | 1 | 0 | 0 | 1 | 1 | 0 | 0 | 0 | 0 | 0 |
| 0 | 0 | 1 | 1 | 0 | 1 | 0 | 0 | 0 | 1 | 1 | 0 | 0 | 0 | 0 | 0 |
| 0 | 0 | 1 | 1 | 0 | 1 | 1 | 0 | 0 | 1 | 1 | 0 | 0 | 0 | 0 | 0 |
| 0 | 0 | 1 | 1 | 1 | 0 | 0 | 0 | 0 | 1 | 1 | 0 | 0 | 0 | 0 | 0 |
| 0 | 0 | 1 | 1 | 1 | 0 | 1 | 0 | 0 | 1 | 1 | 0 | 0 | 0 | 0 | 0 |
| 0 | 0 | 1 | 1 | 1 | 1 | 0 | 0 | 0 | 1 | 1 | 0 | 0 | 0 | 0 | 0 |
| 0 | 0 | 1 | 1 | 1 | 1 | 1 | 0 | 0 | 1 | 1 | 0 | 0 | 0 | 0 | 0 |
| 0 | 0 | 1 | 0 | 0 | 0 | 0 | 1 | 0 | 0 | 1 | 0 | 0 | 0 | 0 | 1 |
| 0 | 0 | 1 | 0 | 0 | 0 | 1 | 1 | 0 | 0 | 1 | 0 | 0 | 0 | 0 | 1 |
| 0 | 0 | 1 | 0 | 0 | 1 | 0 | 1 | 0 | 0 | 1 | 0 | 0 | 0 | 0 | 1 |
| 0 | 0 | 1 | 0 | 0 | 1 | 1 | 1 | 0 | 0 | 1 | 0 | 0 | 0 | 0 | 1 |
| 0 | 0 | 1 | 0 | 1 | 0 | 0 | 1 | 0 | 0 | 1 | 0 | 0 | 0 | 1 | 0 |
| 0 | 0 | 1 | 0 | 1 | 0 | 1 | 1 | 0 | 0 | 1 | 0 | 0 | 0 | 1 | 0 |
| 0 | 0 | 1 | 0 | 1 | 1 | 0 | 1 | 0 | 0 | 1 | 0 | 0 | 0 | 1 | 0 |
| 0 | 0 | 1 | 0 | 1 | 1 | 1 | 1 | 0 | 0 | 1 | 0 | 0 | 0 | 1 | 0 |
| 0 | 0 | 1 | 1 | 0 | 0 | 0 | 1 | 0 | 0 | 0 | 1 | 1 | 0 | 0 | 0 |
| 0 | 0 | 1 | 1 | 0 | 0 | 1 | 1 | 0 | 0 | 0 | 1 | 1 | 0 | 0 | 0 |
| 0 | 0 | 1 | 1 | 0 | 1 | 0 | 0 | 0 | 0 | 0 | 1 | 0 | 0 | 1 | 0 |
| 0 | 0 | 1 | 1 | 0 | 1 | 0 | 1 | 0 | 0 | 1 | 0 | 0 | 0 | 1 | 0 |
| 0 | 0 | 1 | 1 | 0 | 1 | 1 | 0 | 0 | 0 | 0 | 1 | 1 | 0 | 0 | 0 |
| 0 | 0 | 1 | 1 | 0 | 1 | 1 | 1 | 0 | 0 | 1 | 0 | 0 | 0 | 1 | 0 |
| 0 | 0 | 1 | 1 | 1 | 0 | 0 | 1 | 0 | 0 | 0 | 1 | 1 | 0 | 0 | 0 |
| 0 | 0 | 1 | 1 | 1 | 0 | 1 | 1 | 0 | 0 | 0 | 1 | 1 | 0 | 0 | 0 |
| 0 | 0 | 1 | 1 | 1 | 1 | 0 | 0 | 0 | 1 | 1 | 0 | 0 | 0 | 0 | 0 |
| 0 | 0 | 1 | 1 | 1 | 1 | 0 | 1 | 0 | 0 | 1 | 0 | 0 | 0 | 1 | 0 |
| 0 | 0 | 1 | 1 | 1 | 1 | 1 | 0 | 0 | 1 | 1 | 0 | 0 | 0 | 0 | 0 |
| 0 | 0 | 1 | 1 | 1 | 1 | 1 | 1 | 0 | 0 | 1 | 0 | 0 | 0 | 1 | 0 |
| 0 | 1 | 0 | 0 | 0 | 0 | 0 | 0 | 1 | 0 | 0 | 0 | 0 | 0 | 1 | 0 |
| 0 | 1 | 0 | 0 | 0 | 0 | 1 | 0 | 1 | 0 | 0 | 0 | 0 | 0 | 1 | 0 |
| 0 | 1 | 0 | 0 | 0 | 1 | 0 | 0 | 1 | 0 | 0 | 0 | 0 | 0 | 1 | 0 |
| 0 | 1 | 0 | 0 | 0 | 1 | 1 | 0 | 1 | 0 | 0 | 0 | 0 | 0 | 1 | 0 |
| 0 | 1 | 0 | 0 | 1 | 0 | 0 | 0 | 1 | 0 | 0 | 0 | 0 | 0 | 1 | 0 |
| 0 | 1 | 0 | 0 | 1 | 0 | 1 | 0 | 1 | 0 | 0 | 0 | 0 | 0 | 1 | 0 |
| 0 | 1 | 0 | 0 | 1 | 1 | 0 | 0 | 1 | 0 | 0 | 0 | 0 | 0 | 1 | 0 |
| 0 | 1 | 0 | 0 | 1 | 1 | 1 | 0 | 1 | 0 | 0 | 0 | 0 | 0 | 1 | 0 |
| 0 | 1 | 0 | 1 | 0 | 0 | 0 | 0 | 1 | 0 | 0 | 0 | 1 | 0 | 0 | 0 |
| 0 | 1 | 0 | 1 | 0 | 0 | 1 | 0 | 1 | 0 | 0 | 0 | 1 | 0 | 0 | 0 |
| 0 | 1 | 0 | 1 | 0 | 1 | 0 | 0 | 1 | 0 | 0 | 0 | 1 | 0 | 0 | 0 |
| 0 | 1 | 0 | 1 | 0 | 1 | 1 | 0 | 1 | 0 | 0 | 0 | 1 | 0 | 0 | 0 |
| 0 | 1 | 0 | 1 | 1 | 0 | 0 | 0 | 1 | 0 | 0 | 0 | 1 | 0 | 0 | 0 |
| 0 | 1 | 0 | 1 | 1 | 0 | 1 | 0 | 1 | 0 | 0 | 0 | 1 | 0 | 0 | 0 |
| 0 | 1 | 0 | 1 | 1 | 1 | 0 | 0 | 1 | 0 | 0 | 0 | 1 | 0 | 0 | 0 |
| 0 | 1 | 0 | 1 | 1 | 1 | 1 | 0 | 1 | 0 | 0 | 0 | 1 | 0 | 0 | 0 |
| 0 | 1 | 1 | 0 | 0 | 0 | 0 | 0 | 1 | 0 | 1 | 0 | 0 | 0 | 0 | 0 |
| 0 | 1 | 1 | 0 | 0 | 0 | 1 | 0 | 1 | 0 | 1 | 0 | 0 | 0 | 0 | 0 |
| 0 | 1 | 1 | 0 | 0 | 1 | 0 | 0 | 1 | 0 | 1 | 0 | 0 | 0 | 0 | 0 |
| 0 | 1 | 1 | 0 | 0 | 1 | 1 | 0 | 1 | 0 | 1 | 0 | 0 | 0 | 0 | 0 |
| 0 | 1 | 1 | 0 | 1 | 0 | 0 | 0 | 1 | 0 | 1 | 0 | 0 | 0 | 0 | 0 |
| 0 | 1 | 1 | 0 | 1 | 0 | 1 | 0 | 1 | 0 | 1 | 0 | 0 | 0 | 0 | 0 |
| 0 | 1 | 1 | 0 | 1 | 1 | 0 | 0 | 1 | 0 | 1 | 0 | 0 | 0 | 0 | 0 |
| 0 | 1 | 1 | 0 | 1 | 1 | 1 | 0 | 1 | 0 | 1 | 0 | 0 | 0 | 0 | 0 |
| 0 | 1 | 1 | 1 | 0 | 0 | 0 | 0 | 1 | 0 | 0 | 1 | 0 | 0 | 0 | 0 |
| 0 | 1 | 1 | 1 | 0 | 0 | 1 | 0 | 1 | 0 | 0 | 1 | 0 | 0 | 0 | 0 |
| 0 | 1 | 1 | 1 | 0 | 1 | 0 | 0 | 1 | 0 | 0 | 1 | 0 | 0 | 0 | 0 |
| 0 | 1 | 1 | 1 | 0 | 1 | 1 | 0 | 1 | 0 | 0 | 1 | 0 | 0 | 0 | 0 |
| 0 | 1 | 1 | 1 | 1 | 0 | 0 | 0 | 1 | 0 | 0 | 1 | 0 | 0 | 0 | 0 |
| 0 | 1 | 1 | 1 | 1 | 0 | 1 | 0 | 1 | 0 | 0 | 1 | 0 | 0 | 0 | 0 |
| 0 | 1 | 1 | 1 | 1 | 1 | 0 | 0 | 1 | 0 | 0 | 1 | 0 | 0 | 0 | 0 |
| 0 | 1 | 1 | 1 | 1 | 1 | 1 | 0 | 1 | 0 | 0 | 1 | 0 | 0 | 0 | 0 |

TABLE 1-continued

| Inputs | | | | | | | | Outputs | | | | | | | |
|---|---|---|---|---|---|---|---|---|---|---|---|---|---|---|---|
| 0 | 1 | 1 | 1 | 1 | 1 | 1 | 0 | 1 | 1 | 0 | 0 | 0 | 0 | 0 | 0 |
| 1 | 0 | 0 | 0 | 0 | 0 | 0 | 1 | 0 | 0 | 0 | 0 | 0 | 0 | 0 | 1 |
| 1 | 0 | 0 | 0 | 0 | 0 | 1 | 1 | 0 | 0 | 0 | 0 | 0 | 0 | 0 | 1 |
| 1 | 0 | 0 | 0 | 0 | 1 | 0 | 1 | 0 | 0 | 0 | 0 | 0 | 0 | 0 | 1 |
| 1 | 0 | 0 | 0 | 0 | 1 | 1 | 1 | 0 | 0 | 0 | 0 | 0 | 0 | 0 | 1 |
| 1 | 0 | 0 | 0 | 1 | 0 | 0 | 1 | 0 | 0 | 0 | 0 | 0 | 0 | 1 | 0 | 0 |
| 1 | 0 | 0 | 0 | 1 | 0 | 1 | 1 | 0 | 0 | 0 | 0 | 0 | 0 | 1 | 0 | 0 |
| 1 | 0 | 0 | 0 | 1 | 1 | 0 | 1 | 0 | 0 | 0 | 0 | 0 | 0 | 1 | 0 | 0 |
| 1 | 0 | 0 | 0 | 1 | 1 | 1 | 1 | 0 | 0 | 0 | 0 | 0 | 0 | 1 | 0 | 0 |
| 1 | 0 | 0 | 1 | 0 | 0 | 0 | 1 | 0 | 0 | 0 | 0 | 0 | 0 | 0 | 1 |
| 1 | 0 | 0 | 1 | 0 | 0 | 1 | 1 | 0 | 0 | 0 | 0 | 0 | 0 | 0 | 1 |
| 1 | 0 | 0 | 1 | 0 | 1 | 0 | 1 | 0 | 0 | 0 | 0 | 0 | 0 | 0 | 1 |
| 1 | 0 | 0 | 1 | 0 | 1 | 1 | 1 | 0 | 0 | 0 | 0 | 0 | 0 | 0 | 1 |
| 1 | 0 | 0 | 1 | 1 | 0 | 0 | 1 | 0 | 0 | 0 | 0 | 0 | 0 | 1 | 0 | 0 |
| 1 | 0 | 0 | 1 | 1 | 0 | 1 | 1 | 0 | 0 | 0 | 0 | 0 | 0 | 1 | 0 | 0 |
| 1 | 0 | 0 | 1 | 1 | 1 | 0 | 1 | 0 | 0 | 0 | 0 | 0 | 0 | 1 | 0 | 0 |
| 1 | 0 | 0 | 1 | 1 | 1 | 1 | 1 | 0 | 0 | 0 | 0 | 0 | 0 | 1 | 0 | 0 |
| 1 | 0 | 0 | 1 | 0 | 0 | 0 | 0 | 1 | 0 | 0 | 0 | 1 | 0 | 0 | 0 | 0 |
| 1 | 0 | 0 | 1 | 0 | 0 | 0 | 1 | 0 | 0 | 0 | 1 | 0 | 0 | 0 | 0 |
| 1 | 0 | 0 | 1 | 0 | 0 | 1 | 1 | 0 | 0 | 0 | 1 | 0 | 0 | 0 | 0 |
| 1 | 0 | 0 | 1 | 0 | 1 | 0 | 1 | 0 | 0 | 0 | 1 | 0 | 0 | 0 | 0 |
| 1 | 0 | 0 | 1 | 0 | 1 | 0 | 1 | 0 | 0 | 0 | 1 | 0 | 0 | 0 | 0 |
| 1 | 0 | 0 | 1 | 0 | 1 | 1 | 1 | 0 | 0 | 0 | 1 | 0 | 0 | 0 | 0 |
| 1 | 0 | 0 | 1 | 1 | 0 | 0 | 1 | 0 | 0 | 0 | 1 | 0 | 0 | 0 | 0 |
| 1 | 0 | 0 | 1 | 1 | 0 | 1 | 1 | 0 | 0 | 0 | 1 | 0 | 0 | 0 | 0 |
| 1 | 0 | 0 | 1 | 1 | 1 | 0 | 1 | 0 | 0 | 0 | 1 | 0 | 0 | 0 | 0 |
| 1 | 0 | 0 | 1 | 1 | 1 | 1 | 1 | 0 | 0 | 0 | 1 | 0 | 0 | 0 | 0 |
| 1 | 0 | 0 | 1 | 0 | 0 | 0 | 1 | 0 | 0 | 0 | 1 | 0 | 0 | 0 | 0 |
| 1 | 0 | 0 | 1 | 0 | 0 | 1 | 1 | 0 | 0 | 0 | 1 | 0 | 0 | 0 | 0 |
| 1 | 0 | 0 | 1 | 0 | 1 | 0 | 1 | 0 | 0 | 0 | 1 | 0 | 0 | 0 | 0 |
| 1 | 0 | 0 | 1 | 0 | 1 | 1 | 1 | 0 | 0 | 0 | 1 | 0 | 0 | 0 | 0 |
| 1 | 0 | 0 | 1 | 1 | 0 | 0 | 1 | 0 | 0 | 0 | 1 | 0 | 0 | 0 | 0 |
| 1 | 0 | 0 | 1 | 1 | 0 | 1 | 1 | 0 | 0 | 0 | 1 | 0 | 0 | 0 | 0 |
| 1 | 0 | 0 | 1 | 1 | 1 | 0 | 1 | 0 | 0 | 0 | 1 | 0 | 0 | 0 | 0 |
| 1 | 0 | 0 | 1 | 1 | 1 | 1 | 1 | 0 | 0 | 0 | 1 | 0 | 0 | 0 | 0 |
| 1 | 0 | 1 | 0 | 0 | 0 | 0 | 1 | 0 | 1 | 0 | 0 | 0 | 0 | 0 | 1 |
| 1 | 0 | 1 | 0 | 0 | 0 | 1 | 1 | 0 | 0 | 0 | 0 | 0 | 0 | 0 | 1 |
| 1 | 0 | 1 | 0 | 0 | 1 | 0 | 1 | 0 | 0 | 0 | 0 | 0 | 0 | 0 | 1 |
| 1 | 0 | 1 | 0 | 0 | 1 | 1 | 1 | 0 | 0 | 0 | 0 | 0 | 0 | 0 | 1 |
| 1 | 0 | 1 | 0 | 1 | 0 | 0 | 1 | 0 | 0 | 0 | 0 | 0 | 0 | 1 | 0 | 0 |
| 1 | 0 | 1 | 0 | 1 | 0 | 1 | 1 | 0 | 0 | 0 | 0 | 0 | 0 | 1 | 0 | 0 |
| 1 | 0 | 1 | 0 | 1 | 1 | 0 | 1 | 0 | 0 | 0 | 0 | 0 | 0 | 1 | 0 | 0 |
| 1 | 0 | 1 | 0 | 1 | 1 | 1 | 1 | 0 | 0 | 0 | 0 | 0 | 0 | 1 | 0 | 0 |
| 1 | 0 | 1 | 0 | 0 | 0 | 0 | 1 | 0 | 0 | 0 | 0 | 0 | 0 | 0 | 1 |
| 1 | 0 | 1 | 0 | 0 | 0 | 1 | 1 | 0 | 0 | 0 | 0 | 0 | 0 | 0 | 1 |
| 1 | 0 | 1 | 0 | 0 | 1 | 0 | 1 | 0 | 0 | 0 | 0 | 0 | 0 | 0 | 1 |
| 1 | 0 | 1 | 0 | 0 | 1 | 1 | 1 | 0 | 0 | 0 | 0 | 0 | 0 | 0 | 1 |
| 1 | 0 | 1 | 0 | 1 | 0 | 0 | 1 | 0 | 0 | 0 | 0 | 0 | 0 | 1 | 0 | 0 |
| 1 | 0 | 1 | 0 | 1 | 0 | 1 | 1 | 0 | 0 | 0 | 0 | 0 | 0 | 1 | 0 | 0 |
| 1 | 0 | 1 | 0 | 1 | 1 | 0 | 1 | 0 | 0 | 0 | 0 | 0 | 0 | 1 | 0 | 0 |
| 1 | 0 | 1 | 0 | 1 | 1 | 1 | 1 | 0 | 0 | 0 | 0 | 0 | 0 | 1 | 0 | 0 |
| 1 | 0 | 1 | 1 | 0 | 0 | 0 | 1 | 0 | 0 | 1 | 0 | 0 | 0 | 0 | 0 |
| 1 | 0 | 1 | 1 | 0 | 0 | 1 | 1 | 0 | 0 | 1 | 0 | 0 | 0 | 0 | 0 |
| 1 | 0 | 1 | 1 | 0 | 1 | 0 | 1 | 0 | 0 | 1 | 0 | 0 | 0 | 0 | 0 |
| 1 | 0 | 1 | 1 | 0 | 1 | 1 | 1 | 0 | 0 | 1 | 0 | 0 | 0 | 0 | 0 |
| 1 | 0 | 1 | 1 | 1 | 0 | 0 | 1 | 0 | 0 | 1 | 0 | 0 | 0 | 0 | 0 |
| 1 | 0 | 1 | 1 | 1 | 0 | 1 | 1 | 0 | 0 | 1 | 0 | 0 | 0 | 0 | 0 |
| 1 | 0 | 1 | 1 | 1 | 1 | 0 | 1 | 0 | 0 | 1 | 0 | 0 | 0 | 0 | 0 |
| 1 | 0 | 1 | 1 | 1 | 1 | 1 | 1 | 0 | 0 | 1 | 0 | 0 | 0 | 0 | 0 |
| 1 | 0 | 1 | 1 | 0 | 0 | 0 | 1 | 0 | 0 | 1 | 0 | 0 | 0 | 0 | 0 |
| 1 | 0 | 1 | 1 | 0 | 0 | 1 | 1 | 0 | 0 | 1 | 0 | 0 | 0 | 0 | 0 |
| 1 | 0 | 1 | 1 | 0 | 1 | 0 | 1 | 0 | 0 | 1 | 0 | 0 | 0 | 0 | 0 |
| 1 | 0 | 1 | 1 | 0 | 1 | 1 | 1 | 0 | 0 | 1 | 0 | 0 | 0 | 0 | 0 |
| 1 | 0 | 1 | 1 | 1 | 0 | 0 | 1 | 0 | 0 | 1 | 0 | 0 | 0 | 0 | 0 |
| 1 | 0 | 1 | 1 | 1 | 0 | 1 | 1 | 0 | 0 | 1 | 0 | 0 | 0 | 0 | 0 |
| 1 | 0 | 1 | 1 | 1 | 1 | 0 | 1 | 0 | 0 | 1 | 0 | 0 | 0 | 0 | 0 |
| 1 | 0 | 1 | 1 | 1 | 1 | 1 | 1 | 0 | 0 | 1 | 0 | 0 | 0 | 0 | 0 |
| 1 | 1 | 0 | 0 | 0 | 0 | 0 | 1 | 0 | 0 | 0 | 0 | 0 | 0 | 0 | 1 |
| 1 | 1 | 0 | 0 | 0 | 0 | 1 | 1 | 0 | 0 | 0 | 0 | 0 | 0 | 0 | 1 |
| 1 | 1 | 0 | 0 | 0 | 1 | 0 | 0 | 1 | 0 | 0 | 0 | 0 | 0 | 1 | 0 |
| 1 | 1 | 0 | 0 | 0 | 1 | 0 | 1 | 0 | 0 | 0 | 0 | 0 | 0 | 1 | 0 |
| 1 | 1 | 0 | 0 | 0 | 1 | 1 | 0 | 1 | 0 | 0 | 0 | 0 | 0 | 1 | 0 | 0 |
| 1 | 1 | 0 | 0 | 1 | 0 | 0 | 0 | 1 | 0 | 0 | 0 | 0 | 0 | 1 | 0 | 0 |
| 1 | 1 | 0 | 0 | 1 | 0 | 0 | 1 | 1 | 0 | 0 | 0 | 0 | 0 | 1 | 0 | 0 |
| 1 | 1 | 0 | 0 | 1 | 0 | 1 | 0 | 1 | 0 | 0 | 0 | 0 | 0 | 1 | 0 | 0 |
| 1 | 1 | 0 | 0 | 1 | 0 | 1 | 1 | 1 | 0 | 0 | 0 | 0 | 0 | 1 | 0 | 0 |
| 1 | 1 | 0 | 0 | 1 | 1 | 0 | 0 | 0 | 1 | 0 | 0 | 1 | 0 | 0 | 0 | 0 |
| 1 | 1 | 0 | 0 | 1 | 1 | 0 | 1 | 1 | 0 | 0 | 0 | 0 | 0 | 1 | 0 | 0 |
| 1 | 1 | 0 | 0 | 1 | 1 | 1 | 0 | 1 | 0 | 0 | 0 | 0 | 0 | 1 | 0 | 0 |
| 1 | 1 | 0 | 0 | 1 | 1 | 1 | 1 | 0 | 0 | 0 | 0 | 0 | 0 | 1 | 0 | 0 |
| 1 | 1 | 0 | 1 | 0 | 0 | 0 | 1 | 0 | 0 | 1 | 0 | 0 | 0 | 0 | 0 |
| 1 | 1 | 0 | 1 | 0 | 0 | 1 | 1 | 0 | 0 | 1 | 0 | 0 | 0 | 0 | 0 |
| 1 | 1 | 0 | 1 | 0 | 0 | 1 | 0 | 0 | 0 | 1 | 0 | 0 | 0 | 0 | 0 |
| 1 | 1 | 0 | 1 | 0 | 1 | 1 | 1 | 0 | 0 | 1 | 0 | 0 | 0 | 0 | 0 |
| 1 | 1 | 0 | 1 | 0 | 1 | 0 | 1 | 0 | 0 | 1 | 0 | 0 | 0 | 0 | 0 |
| 1 | 1 | 0 | 1 | 0 | 1 | 1 | 1 | 0 | 0 | 1 | 0 | 0 | 0 | 0 | 0 |
| 1 | 1 | 0 | 1 | 1 | 0 | 0 | 1 | 0 | 0 | 1 | 0 | 0 | 0 | 0 | 0 |
| 1 | 1 | 0 | 1 | 1 | 0 | 1 | 1 | 0 | 0 | 1 | 0 | 0 | 0 | 0 | 0 |
| 1 | 1 | 0 | 1 | 1 | 1 | 0 | 1 | 0 | 0 | 1 | 0 | 0 | 0 | 0 | 0 |
| 1 | 1 | 0 | 1 | 1 | 1 | 1 | 1 | 0 | 0 | 1 | 0 | 0 | 0 | 0 | 0 |
| 1 | 1 | 0 | 1 | 0 | 0 | 0 | 1 | 0 | 0 | 1 | 0 | 0 | 0 | 0 | 0 |
| 1 | 1 | 0 | 1 | 0 | 0 | 1 | 1 | 0 | 0 | 1 | 0 | 0 | 0 | 0 | 0 |
| 1 | 1 | 0 | 1 | 0 | 1 | 0 | 1 | 0 | 0 | 1 | 0 | 0 | 0 | 0 | 0 |
| 1 | 1 | 0 | 1 | 0 | 1 | 1 | 1 | 0 | 0 | 1 | 0 | 0 | 0 | 0 | 0 |
| 1 | 1 | 0 | 1 | 1 | 0 | 0 | 1 | 0 | 0 | 1 | 0 | 0 | 0 | 0 | 0 |
| 1 | 1 | 0 | 1 | 1 | 0 | 1 | 1 | 0 | 0 | 1 | 0 | 0 | 0 | 0 | 0 |
| 1 | 1 | 0 | 1 | 1 | 1 | 0 | 1 | 0 | 0 | 1 | 0 | 0 | 0 | 0 | 0 |
| 1 | 1 | 0 | 1 | 1 | 1 | 1 | 1 | 0 | 0 | 1 | 0 | 0 | 0 | 0 | 0 |
| 1 | 1 | 1 | 0 | 0 | 0 | 0 | 0 | 1 | 1 | 0 | 0 | 0 | 0 | 0 | 0 |
| 1 | 1 | 1 | 0 | 0 | 0 | 0 | 1 | 0 | 1 | 0 | 0 | 0 | 0 | 0 | 0 |
| 1 | 1 | 1 | 0 | 0 | 0 | 1 | 1 | 0 | 1 | 0 | 0 | 0 | 0 | 0 | 0 |
| 1 | 1 | 1 | 0 | 0 | 1 | 0 | 1 | 1 | 0 | 0 | 0 | 0 | 0 | 0 | 0 |
| 1 | 1 | 1 | 0 | 0 | 1 | 1 | 1 | 1 | 0 | 0 | 0 | 0 | 0 | 0 | 0 |
| 1 | 1 | 1 | 0 | 1 | 0 | 0 | 0 | 1 | 1 | 0 | 0 | 0 | 0 | 0 | 0 |
| 1 | 1 | 1 | 0 | 1 | 0 | 0 | 1 | 1 | 0 | 0 | 0 | 0 | 0 | 0 | 0 |
| 1 | 1 | 1 | 0 | 1 | 0 | 1 | 0 | 1 | 1 | 0 | 0 | 0 | 0 | 0 | 0 |
| 1 | 1 | 1 | 0 | 1 | 0 | 1 | 1 | 1 | 0 | 0 | 0 | 0 | 0 | 0 | 0 |
| 1 | 1 | 1 | 0 | 1 | 1 | 0 | 1 | 1 | 0 | 0 | 0 | 0 | 0 | 0 | 0 |
| 1 | 1 | 1 | 0 | 1 | 1 | 1 | 1 | 1 | 0 | 0 | 0 | 0 | 0 | 0 | 0 |
| 1 | 1 | 1 | 1 | 0 | 0 | 0 | 1 | 0 | 0 | 1 | 0 | 0 | 0 | 0 | 0 |
| 1 | 1 | 1 | 1 | 0 | 0 | 1 | 1 | 0 | 0 | 1 | 0 | 0 | 0 | 0 | 0 |
| 1 | 1 | 1 | 1 | 0 | 1 | 0 | 1 | 0 | 0 | 1 | 0 | 0 | 0 | 0 | 0 |
| 1 | 1 | 1 | 1 | 0 | 1 | 1 | 1 | 0 | 0 | 1 | 0 | 0 | 0 | 0 | 0 |
| 1 | 1 | 1 | 1 | 1 | 0 | 0 | 1 | 0 | 0 | 1 | 0 | 0 | 0 | 0 | 0 |
| 1 | 1 | 1 | 1 | 1 | 0 | 1 | 1 | 0 | 0 | 1 | 0 | 0 | 0 | 0 | 0 |
| 1 | 1 | 1 | 1 | 1 | 1 | 0 | 1 | 0 | 0 | 1 | 0 | 0 | 0 | 0 | 0 |
| 1 | 1 | 1 | 1 | 1 | 1 | 1 | 1 | 0 | 0 | 1 | 0 | 0 | 0 | 0 | 0 |

Note that only two of the eight outputs of Table 1 of the present invention are asserted for a given input line. The inputs are the issue bits of Table 1 determined by the FPU rename and decode logic 302 described in FIG. 4. The issue bits frame four queue positions (AIQ0–AIQ3). The four queue portions are shown as inputs to Table 1 with two issue bits per queue position. Furthermore, each queue position is associated with one instruction, and the two issue bits for a queue position indicate whether that instruction is ready for issue to FPU pipe 0 310 or pipe 1 312. When both issue bits are asserted, the instruction is ready for issue to either of FPU pipe 0 310 or FPU pipe 1 312.

For example, consider the line denoted with an "*" in Table 1. At this point in Table 1, an instruction in the AIQ0 queue position can't issue to either FPU pipe 0 310 or FPU pipe 1 312. Rather, this instruction is dependent upon an instruction that has yet to execute to a stage of a pipe to clear its dependency. The instruction in the AIQ1 queue position can issue to FPU pipe 0 310, the instruction in the AIQ2 queue position can issue to FPU pipe 0 310, and the instruction in the AIQ3 queue position can issue to either pipe. As the output of the table indicates, the instruction in the AIQ1 queue position is selected to issue to FPU pipe 0 310 and the instruction in the AIQ3 queue position is selected to issue to FPU pipe 1 312. Thus, the instruction in the AIQ1 queue position takes the issue slot to FPU pipe 0 310 and the instruction in the AIQ3 queue position takes the issue slot to FPU pipe 1 312. Assuming neither of these instructions are held by hold logic, they are removed from the queue during the current cycle. Otherwise, the held instruction, as well as the instruction, not selected for an issue slot, remain in the queue to be considered for filling an issue slot in the subsequent cycle.

Refer again to the line denoted with a "*" in a left margin of Table 1. The instruction at the AIQ1 queue position was chosen over the instruction at the AIQ2 queue position to take the issue slot to FPU pipe 0 310 because it was earlier in the instruction sequence. These conditions are expected to be infrequent due to the short load latency with respect to the FPU pipes implemented herein, load instruction slippage ahead of dependent instructions via register rename and queuing, and the pre-fetch of FPU data.

A third part of the mechanism of the present invention maintains the two issue state bits of FPU pipe 0 310 and FPU pipe 1 312 once the instruction is placed in FPU instruction queue 304. The issue bits for a given instruction arrive to FPU instruction queue 304 from FPU rename and decode logic 302. The issue bits may have the following states:

1. Neither issue bit to either pipe is asserted;
2. Issue bit to FPU pipe 0 310 is asserted, while issue bit to FPU pipe 1 312 is unasserted;
3. Issue bit to FPU pipe 0 310 is unasserted, while issue bit to FPU pipe 1 312 is asserted; and
4. Both issue bits are asserted.

When both issue bits are asserted, an instruction is ready for issue to either pipe with no restrictions. Such a state occurs either because the instruction is independent of fpu rr instructions or all of the instructions dependencies have been cleared, satisfied outside the dependence window, or dependent upon a load. Once in this state, the issue bits remain in this state until the instruction is issued.

When one of the issue bits is asserted, and the other issue bit is unasserted, dependent data can be forwarded to the "b" operand, "c" operand, or both in a following cycle when an instruction is issued to a matching pipe in the issue cycle. This operation may occur only if the instruction is issued to a pipe whose issue bit is asserted. If the instruction is retained in FPU instruction queue 304 for an extra cycle, the dependent data can be forwarded to a "b" operand, "c" operand, or both from either of the pipes, as the present invention supports cross-pipe forwarding into the e0 stage of the pipe for each of the "a" operand, "b" operand, and "c" operand values. Therefore, any position within FPU instruction queue 304 in either state 2 or 3, should assert both issue bits in a following cycle, if the instruction is retained in the queue. Thus, the issue bits to a given pipe are set for a next cycle when the issue bit of the other pipe is asserted in the given cycle. Therefore, states 2 and 3 denoted above, go to state 4 after residing in the queue for one cycle if the instruction is retained in FPU instruction queue 304.

Lastly, consider an instruction entering the queue in which neither issue bit is asserted. This indicates that the instruction must be retained within the queue for an additional cycle since it cannot issue the following cycle. State 1 must transition to either of states 2, 3 or 4 before being issued. The instruction will transition to either state 2 or 3 if it has a "b" operand or "c" operand dependency on an instruction in the e2 execution stage of pipe 0 or pipe 1, respectively, but has no dependency on another instruction that has not executed. For example, if instruction i1 has a "b" operand dependency upon instruction i0, and the "a" operand and "c" operands are independent, then instruction i1 transitions from state 1 to state 2 when instruction i0 is in the e2 execution stage of FPU pipe 0 310 and from state 1 to state 3 if instruction i0 is in the e2 execution stage of FPU pipe 1 312.

Consider another example in which instruction i2 has a "b" operand dependency upon instruction i1, which is in the e2 execution stage of FPU pipe 0 310. Additionally, the "c" operand of instruction i2 is dependent upon instruction i0, which is in the e2 stage of FPU pipe 1 312. In this instance, the instruction should remain in state 0. However, the "b" operand and "c" operand are marked as available for a next timing cycle and the b_available and c_available bits are set in FPU instruction queue 304. In a second timing cycle, the a_available bit (assuming that the "a" operand is independent), the b_available bit, and the c_available bit are all asserted to set the issue bits for both pipes for the subsequent cycle. In this subsequent cycle, both issue bits are asserted, and the dependent instruction can issue to either FPU pipe 0 310 or FPU pipe 1 312 since instruction i0 and instruction i1 are in the same write back (WB) cycle and can be forwarded to the "b" operand from FPU pipe 0 310 and to the "c" operand from FPU pipe 1 312.

The out-of-order issue mechanism of the present invention also implements logic which receives eight issue bits, two from each of the bottom four queue positions of FPU instruction queue 304. This logic determines which two of the four instructions should be issued to each of FPU pipe 0 310 and FPU pipe 1 312. This logic is implemented as issue logic 306. Issue logic 306 prioritizes queue positions for issue from bottom to top, wherein the bottom indicates a highest priority and the top indicates a lowest priority. In this prioritization scheme, if two instructions with equal issue requirements contend for a slot in either of FPU pipe 0 310 or FPU pipe 1 312, the bottom position will preempt the higher position. Issue logic 306 has a truth table as set forth in Table 1. As may be observed from Table 1, the issue bits are used to intelligently issue the instructions to FPU pipe 0 310 and FPU pipe 1 312 in a manner in which three cycle forwarding of the "b" operand and "c" operand implemented by the present invention can be effectively utilized.

As is observed from the discussion provided above, the present invention provides a mechanism for removing instructions from an instruction queue as soon as possible. Thus, the queue is free to allow dispatch of subsequent instructions from I-cache 202 and instruction unit/branch unit 204. This increases the possibility that other instructions for other functional units will be dispatched and, therefore, increases the chance of keeping all functional units within CPU 110 busy, while allowing cache miss operations for load operations to slip ahead of dependent instructions. A more detailed description of operation of the present invention will be provided in the subsequent discussion referencing the flow charts illustrated in FIGS. 7-1 through FIGS. 10-11.

Description of Flow Charts

The flow charts provided herein are not indicative of the serialization of operations being performed in one embodiment of the present invention. Many of the steps disclosed within these flow charts are actually performed in parallel. The flow chart is only meant to designate those considerations that must be performed to produce the operation available on issue bits for an instruction.

Figures 7, 7A, 8:
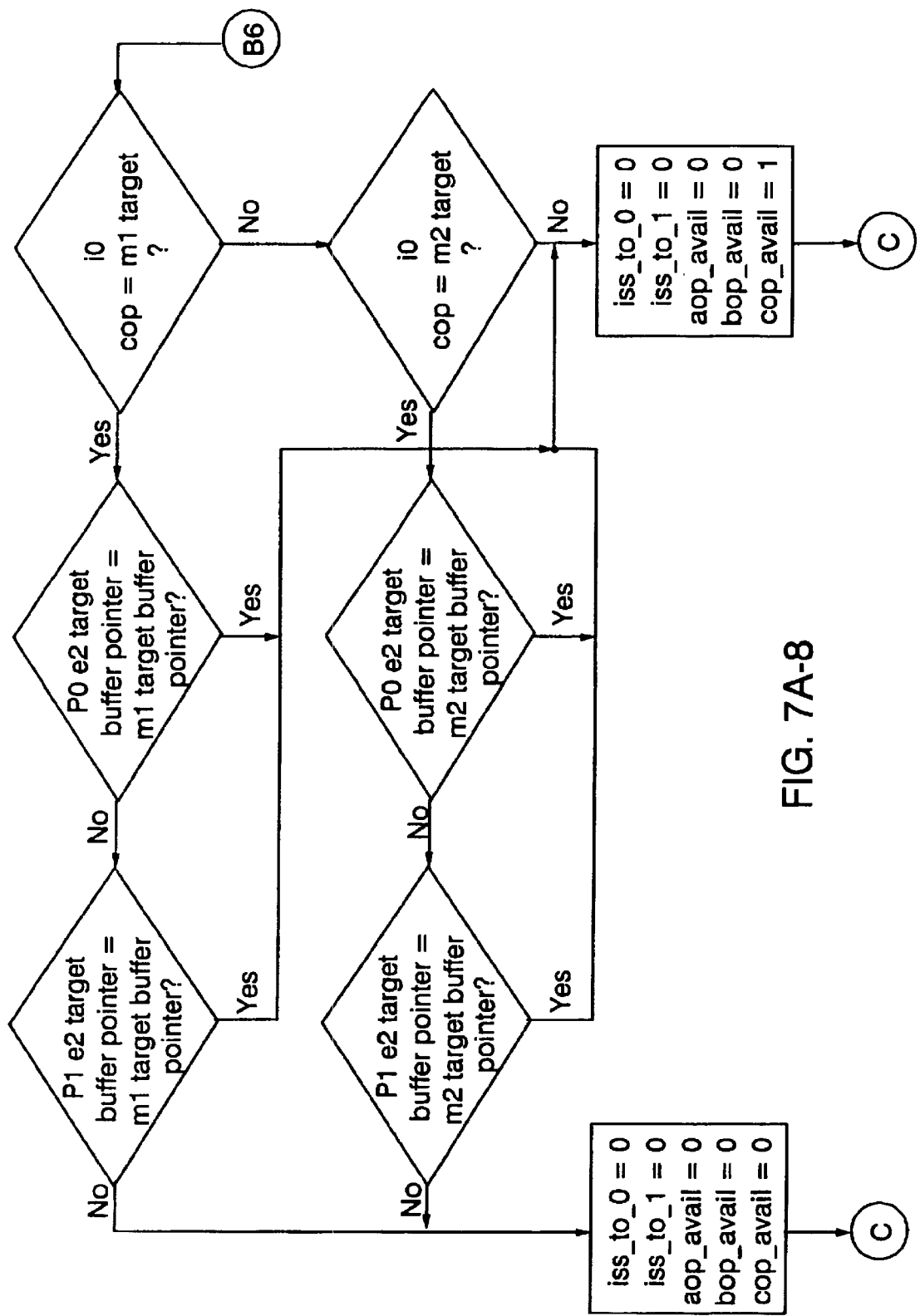

Referring now to FIG. 7-1, operation of the present invention is initiated when an instruction is provided from I-cache 202 to instruction unit/branch unit 204. Thereafter, instruction unit/branch unit 204 dispatches the instruction. Subsequently, instruction unit/branch unit 204 determines whether the instruction, labeled i0, is a fpu rr instruction by evaluating the opcode of the instruction provided by I-cache 202. If the instruction is a fpu rr instruction, instruction target detect logic 406 of FPU rename and decode logic 302 of floating point unit 210 determines whether instruction i0 has an fpr target. The fpr target indicates an FPR location that will be accessed by the present invention. If instruction i0 has an fpr target, a location in a rename buffer (not illustrated herein) is allocated to the fpr target by rename logic 402 for temporarily storing the results of the instruction's execution prior to the instruction being completed. When the instruction is completed, the results are moved to an architected fpr at the locations specified by a target designator of the instructions and the rename buffer is deallocated and freed for use by subsequent instructions. Once the presence or absence of the fpr target is established and a buffer is allocated to the present target designators, the source operands are extracted to be used to determine when a dependency on a fpu rr instruction exists. This information is then utilized to set available bits and instruction issue bits, in accordance with FIGS. 7-6 through 7-14.

If, after the instruction is dispatched, the rename and instruction decode logic of FIG. 4 determines that instruction i0 is not a fpu rr instruction, but is a FPU load instruction, a target of that load instruction is compared with the target of M1 history register 426. If the two are equal, the M1 history register target value is invalidated for an "a" operand and a corresponding "b" or "c" operand dependency check. Additionally, a target of instruction i0 is compared with the target of M2 history register 420. If a target of instruction i0 equals a target of M2 history register 420, an M2 target is invalidated for an "a" operand and a "b" or "c" operand dependency check.

This step is referred to as the previously mentioned "breaking" of a dependency. For any dispatched instruction, the targets of the intervening dispatched instructions are compared with the targets of the history state to invalidate dependency checking for that instruction. For example, assume the fpr of history state M1, (i.e. block 426 of FIG. 4) is a hexadecimal value of $15, and that M1's "aV" value (428) and "bc V" value (430) are both asserted. Consider then that an instruction sequence is:

lfd $15←mem (64+8), and then fadd $7←$15+$8, is dispatched. The aop source of the dispatched fadd (i.e. $15) matches the history state M1 in block 426 to indicate that the aop is dependent upon the execution of the instruction whose history is saved in the M1 history state. Because M1's "aV" value (428) and "bc V" value (430) are asserted, the instruction has not executed. The failure to execute causes the a_available signal corresponding to the fadd instruction to be unasserted and the issue bits to be negated. This dependence, however, is false due to the intervening load (lfd) instruction to $15. In this instance, the fadd instruction is actually dependent upon the load rather than the instruction whose history is retained in M1 history state registers.

Because load operations are assumed to slip ahead in one embodiment of the present invention, the a_available and the issue bits for the fadd instruction should be asserted. These values may be asserted by resetting the M1 history state registers "aV" and "bc V" bits.

Returning again to FIGS. 7-1 and 7-2, if a target of instruction i0 does not correspond to a target of M2 history register 420, each of the aforementioned steps 702–718 is repeated for a next instruction, i1. This repetition is illustrated in FIG. 7-2. Additionally, if instruction i0 is not a FPU load instruction and is not a fpu rr instruction, steps 704–718 are repeated for the next instruction, i1.

Additionally, as is illustrated in FIG. 7-3 and FIG. 7-4, each of steps 702–718 is respectively repeated for instructions i2 and i3.

However, if it is determined that instruction i3's target does not correspond to a target of M2 history register 420, the steps in FIG. 7-5 are executed. As illustrated in FIG. 7-5, it is next determined whether a buffer pointer of either FPU pipe 0 310 or FPU pipe 1 312 equals a buffer pointer of M1 history register 426. If the two correspond to one another, the "bc V" bit stored in one register 430 is negated. If the buffer pointer in the e2 stage of FPU pipe 0 310 and FPU pipe 1 312 is not equal to the M1 history register 426 buffer pointer, it is next determined whether an e2 target buffer pointer of either FPU pipe 0 310 or FPU pipe 1 312 equals a buffer pointer of M2 history register 420. If the two do equal one another, the "bc V" bit of M2 register 424 is negated. If not, a program flow returns to step a1 and step 702 of FIG. 7-1.

After the steps in FIG. 7-1 through 7-5 have been completed and the "a" operand, "b" operand, and "c" operand values are assigned, an order of instruction operation is determined. In each of FIG. 7-6 through 7-13, the state of the issue bits and available bits for a first dispatched fpu rr instruction are determined. Refer now to FIG. 7-6. As illustrated in FIG. 7-6, when an aop of instruction i0 is equal to a value stored in an M1 target, then it is determined whether a target buffer pointer found in an e3 stage of pipeline p0 is equal to a target buffer pointer of the M1 history register 426. If the two are equal, a program flow goes to a program entry point referred to as B7.

Figures 7, 7A, 8, 9:
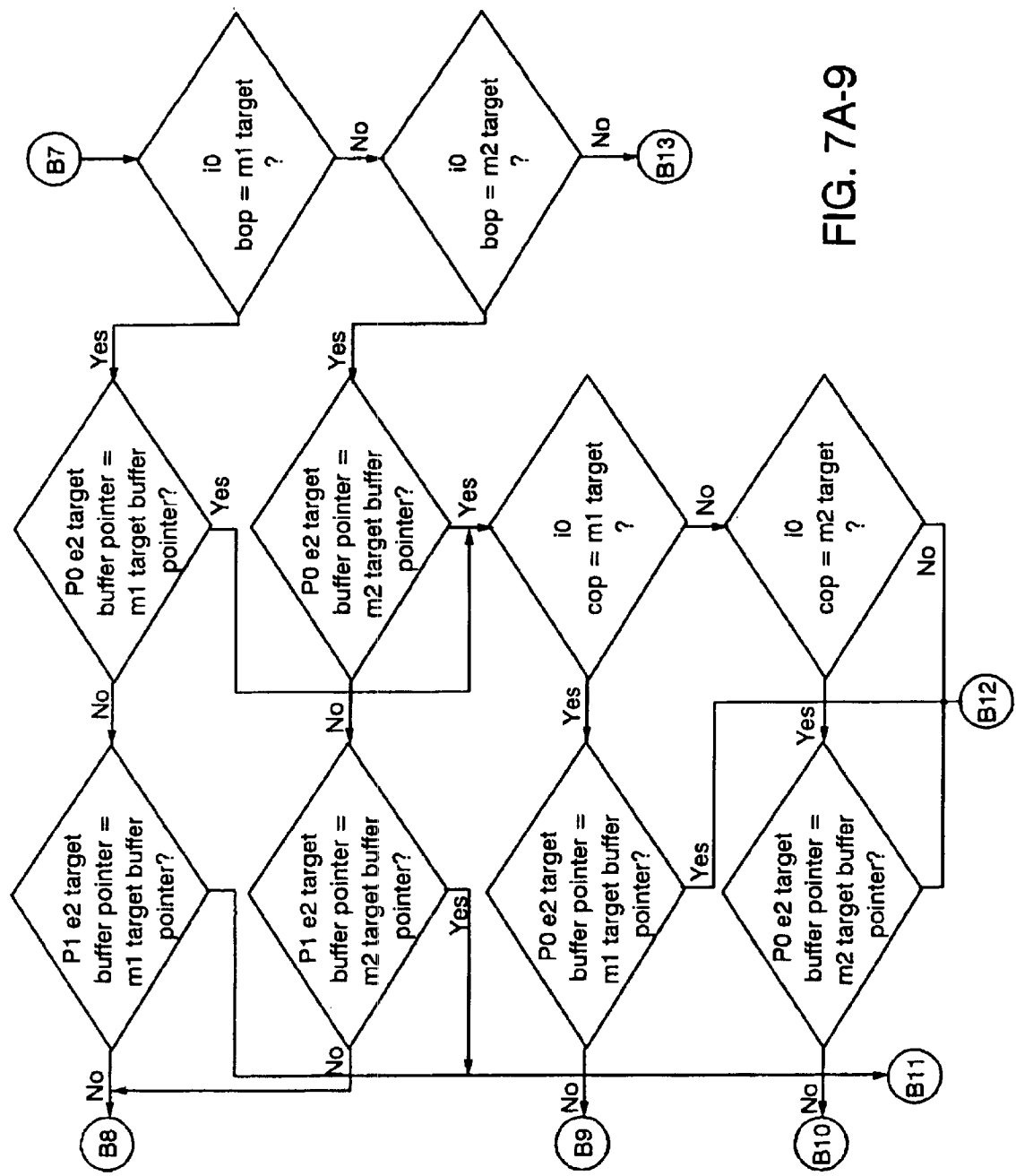

The B7 program entry point is found on FIG. 7-9. There, in step 790, a bop corresponding to instruction i0 is compared with a target register in M1 history register 426. If the two are equal, a target buffer pointer of the e2 stage of pipeline p0 is compared with the target buffer pointer of M1 history register 426. If the two are equal, a cop of instruction i0 is compared with a target in M1 history register 426. If the two are equal, a target buffer pointer to the e2 stage of pipeline p0 is compared with a target buffer pointer of M1 history register 426. If the two are equal, a program flow goes to a program entry point labeled B12. The program entry point labeled B12 is found in FIG. 7-13. There, in a step labeled 713 0, an iss_to_0 signal is asserted to indicate that the instruction being dispatched should be issued to fpu pipe 0 310. Additionally, an iss_to_1 signal is negated to indicate that the instruction being dispatched should be issued to fpu pipe 1 312. Additionally, each of the aop_available, bop_available, and cop_available signals are asserted to indicate that the instruction may be issued to either pipe after the subsequent cycle.

It should be noted that a myriad of paths may be taken through the flow charts from FIG. 7-6 through FIG. 7-13 to determine a value of the issue bits and the available bits for the first dispatched fpu rr instruction. Each of these myriad of manners will not be described in detail herein, as to do so would be unduly confusing and burdensome to the reader. Therefore, the flow charts in each of FIGS. 7-6 through 7-13 are provided to indicate a manner in which the issue bits and available bits for a first dispatched fpu rr instruction may be determined.

Next, in FIGS. 7-14 through 7-19, the sources of an instruction being dispatched are compared with targets in each of M1 history register 426 and M2 history register 420.

During this operation, FPU rename and decode logic 302 determines when a dependency identified in the previous steps is cleared by the pipe. For example, assume that a fpu rr instruction accesses a same address location as a value stored in one of M1 history register 426 and M2 history register 420. However, during execution by one of FPU pipe 0 310 and FPU pipe 1 312, the address is freed. Thus, the dependency is then cleared in a corresponding one of the pipes.

For one such operation, refer to FIG. 7-14. It should be noted that additional operations are executed in each of FIGS. 7-15 through 7-19, but for the sake of clarity and brevity, only one of the many operations carried out in each of FIGS. 7-14 through 7-19 will be described in greater detail herein. However, it should be known that each of the steps disclosed in FIGS. 7-15 through 7-19 are executed in one embodiment of the present invention.

Refer now to FIG. 7-14 and a step 7140 therein. There, FPU rename and decode logic 302 determine when instruction i1 is a fpu rr instruction. If instruction i1 is a fpu rr instruction, it must next be determined whether instruction i1 has an fpr target in a step 7142. If instruction i1 has an fpr target, then a location in rename buffer 308 is allocated to the fpr target value in a step 7144. It should be noted that to get to step 7140, instruction i0 is an fpu rr instruction and to instruction i1 is checked as an fpu rr instruction. In reach step 7142, instruction i1 is also a fpu rr instruction. Therefore, instruction i1 is the second dispatched fpu rr instruction and instruction i0 is the first dispatched fpu rr instruction.

Furthermore, each of the aop, bop, and cop values of instruction i1 are denoted as aop, bop, and cop, respectively, in the flowchart steps of FIGS. 7-20 through 7-25, and the instruction i0 is provided as pi in those steps.

Next, in FIGS. 7-20 through 7-25, dependencies of the second dispatched fpu rr instruction are determined. As was performed with the first dispatched fpu rr instruction, the issue bits and available bits are determined to evaluate whether a dependency exists between a dispatched instruction and an instruction currently executing within one of FPU pipe 0 310 and FPU 1 312. As these determination steps have previously been described with respect to the first dispatched fpu rr instruction, they will not be described in greater detail herein. Reference should be made by the read to the flow charts illustrated in FIGS. 7-20 through 7-25 for further details on execution of the steps for determining dependency of a second dispatched fpu rr instruction.

FIGS. 7-26 through 7-33 perform a classification step to determine a pipeline to which a third fpu rr instruction should be allocated. Again, these classification steps are previously referred to in FIGS. 7-1 through 7-5 for the first dispatched fpu rr instruction. Therefore, these steps will not be described in greater detail as they have previously been described in explicit detail.

FIGS. 7-34 and 7-35 illustrates the steps required to determine whether the third dispatched fpu rr instruction is interlocked with the first and second dispatched fpu rr instructions, dispatched in the same cycles. An example of operation will subsequently be provided. It should be noted that this example is provided for illustrative purposes only and only describes one of a myriad of operations which may be executed using the steps of the flow chart illustrated in FIGS. 7-34 and 7-35.

Refer now to FIG. 7-34. In the step 7340 of FIG. 7-34, an aop of the third dispatched fpu rr instruction is compared with a target location within M1 history register 426. If the two are equal, a B operation of the third dispatched fpu rr instruction is compared with the M1 history register 426 to determine if it matches a target value stored therein in a step 7342. If not, the B operation is compared with M2 history register 420 to determine whether it matches a target value stored therein in a step 7344. If not, a cop of the third dispatched fpu rr instruction is compared with M1 history register 426 to determine if it matches the target value stored therein in step 7346. If yes, the iss, the iss_to_0 signal and the iss_to_1 signals are negated to indicate that the third instruction may issue to either FPU pipe 0 310 or FPU pipe 1 312. Additionally, the aop_available signal and the cop_available signal are both negated to indicate that the aop and the cop of the third dispatched fpu rr instruction may not be forwarded into a corresponding stage of a respective one of FPU pipe 0 310 and FPU pipe 1 312. However, because the bop of the third dispatched fpu rr instruction did not match a target value in either M1 history register 426 or M2 history register 420, the bop_available signal is asserted to indicate that the bop value of the third dispatched fpu rr instruction may be forwarded thereto.

Lastly, the methodologies illustrated in FIGS. 7-36 through 7-41 are executed to complete operation of the present invention. Specifically, the steps illustrated in each of FIGS. 7-36 through 741 are executed to allocate locations within rename buffer 308 to M1 history register 426 and M2 history register 420, where required.

Additionally, FIGS. 8 and 9 illustrate a methodology implemented to maintain FPU instruction queue 304 for both FPU pipe 0 310 and FPU pipe 1 312. The methodology implemented to maintain issue bits in FPU instruction queue 304 for FPU pipe 0 310 is illustrated in FIG. 8, while the methodology used to maintain issue bits for FPU instruction queue 304 for FPU pipe 1 312 is illustrated in FIG. 9.

Refer now to FIG. 8. After the issue bits have been determined in FIGS. 7-1 through 7-81, maintenance of the issue bits for each of FPU pipe 0 310 and FPU pipe 1 312 must be determined. In a first step 800, it is determined whether an issue bit indicates that an instruction would be issued to FP pipe 0 310. If not, it is next determined in a step 802 whether the instruction should issue to FPU pipe 1 312. If an issue bit to one pipe is on and an issue bit to the other pipe is off, then for that cycle, the instruction can be issued to the matching pipe to take advantage of the three-cycle forwarding implemented by the present invention. If the instruction does not issue in that cycle, then the instruction upon which the held instruction is dependent has progressed to where the result can be forwarded to either pipe. If the instruction in question should not issue to FPU pipe 1 312, step 804 next determines whether the aop of the instruction is available for execution. If not, it is next determined whether a target buffer pointer to the e3 stage of FPU pipe 0 310 (p0 e3 tgg bfr ptr) is equal to an AIQ frab value, where the AIQ frab value corresponds to the rename buffer from which the aop is to get its data. If the two values correspond to one another, the a_available signal is asserted in a step 810.

Each of these steps is repeated for the bop and the cop of the instruction in question. Furthermore, it should be noted that each of these steps is repeated in the methodology illustrated in FIG. 9 to determine which pipe is producing the dependent result to allow issue to only that pipe taking advantage of three cycle forwarding available for those operations.

Figures 7, 7A, 8, 9, 10:
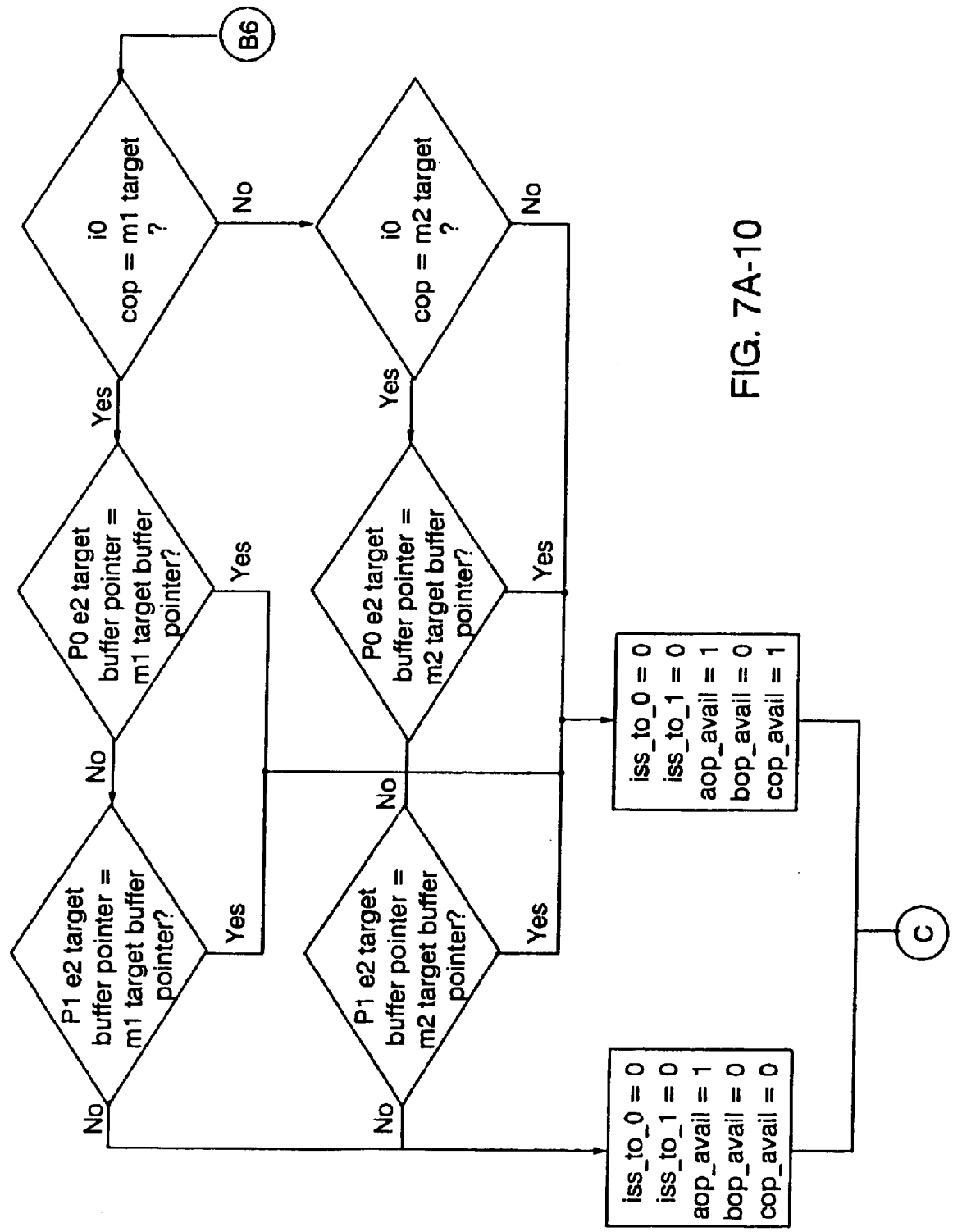
Figures 7, 7A, 8, 9, 10, 11:
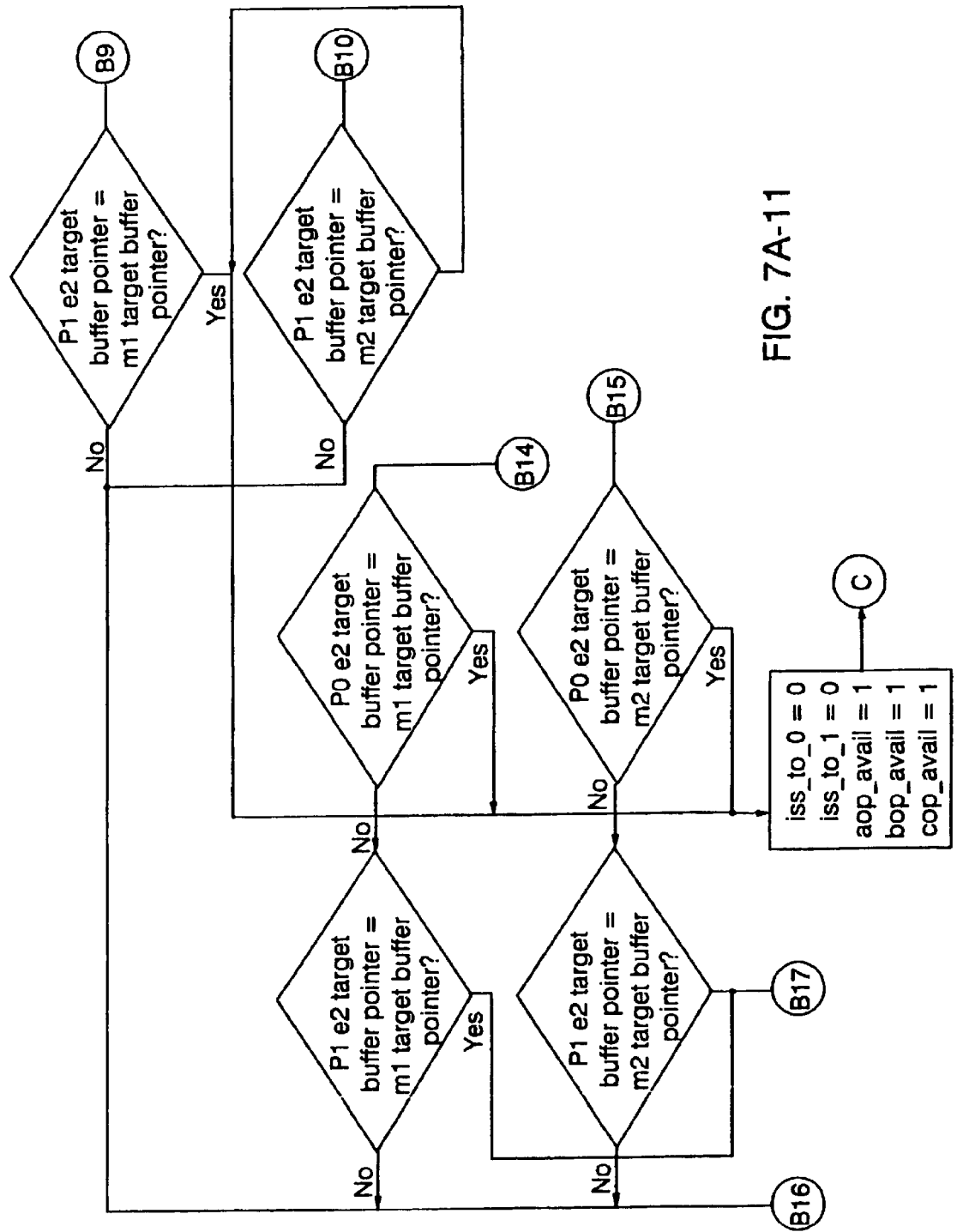
Figures 7, 7A, 8, 9, 10, 11, 12:
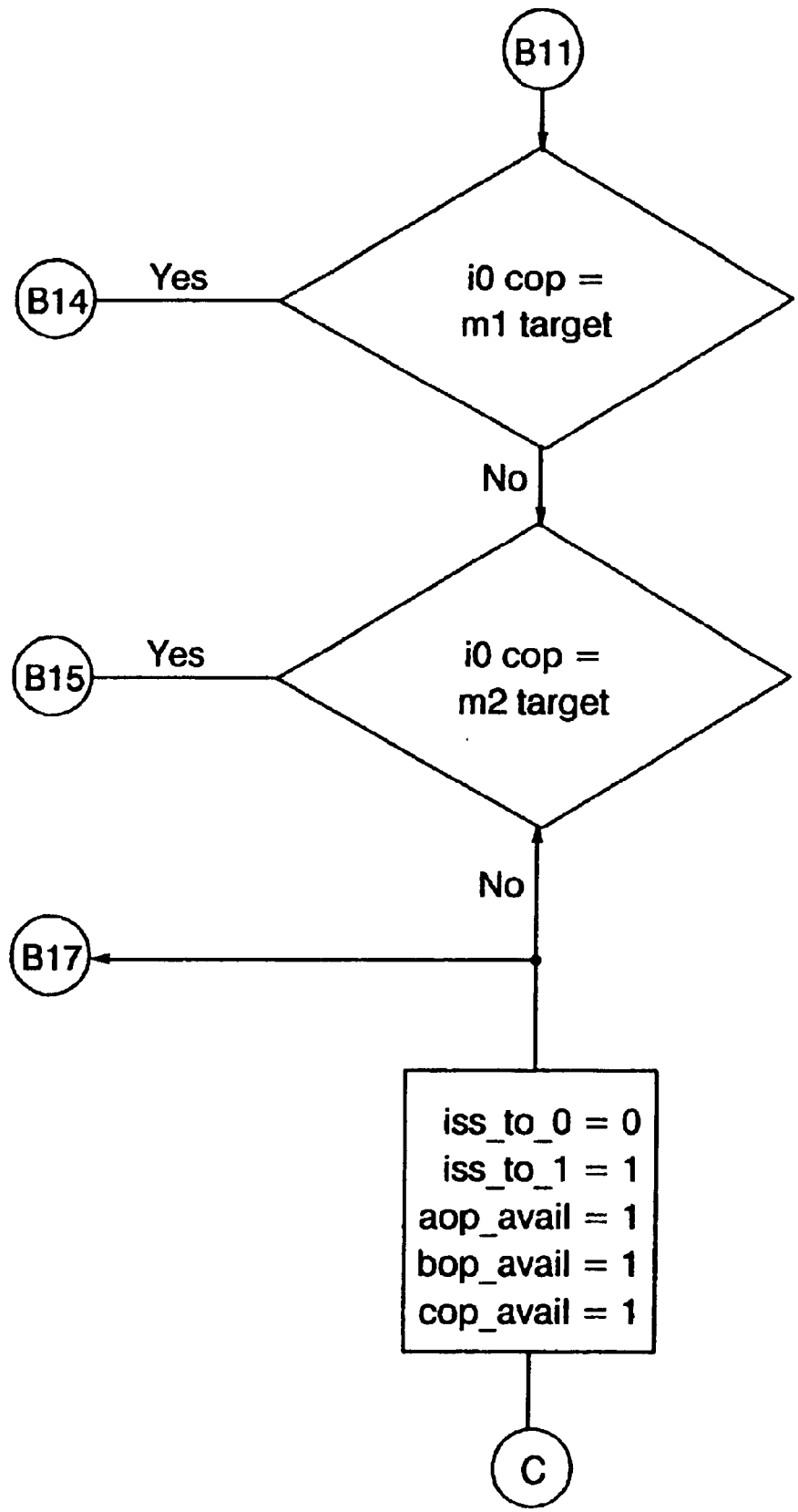
Figures 7, 7A, 8, 9, 10, 11, 12, 13:
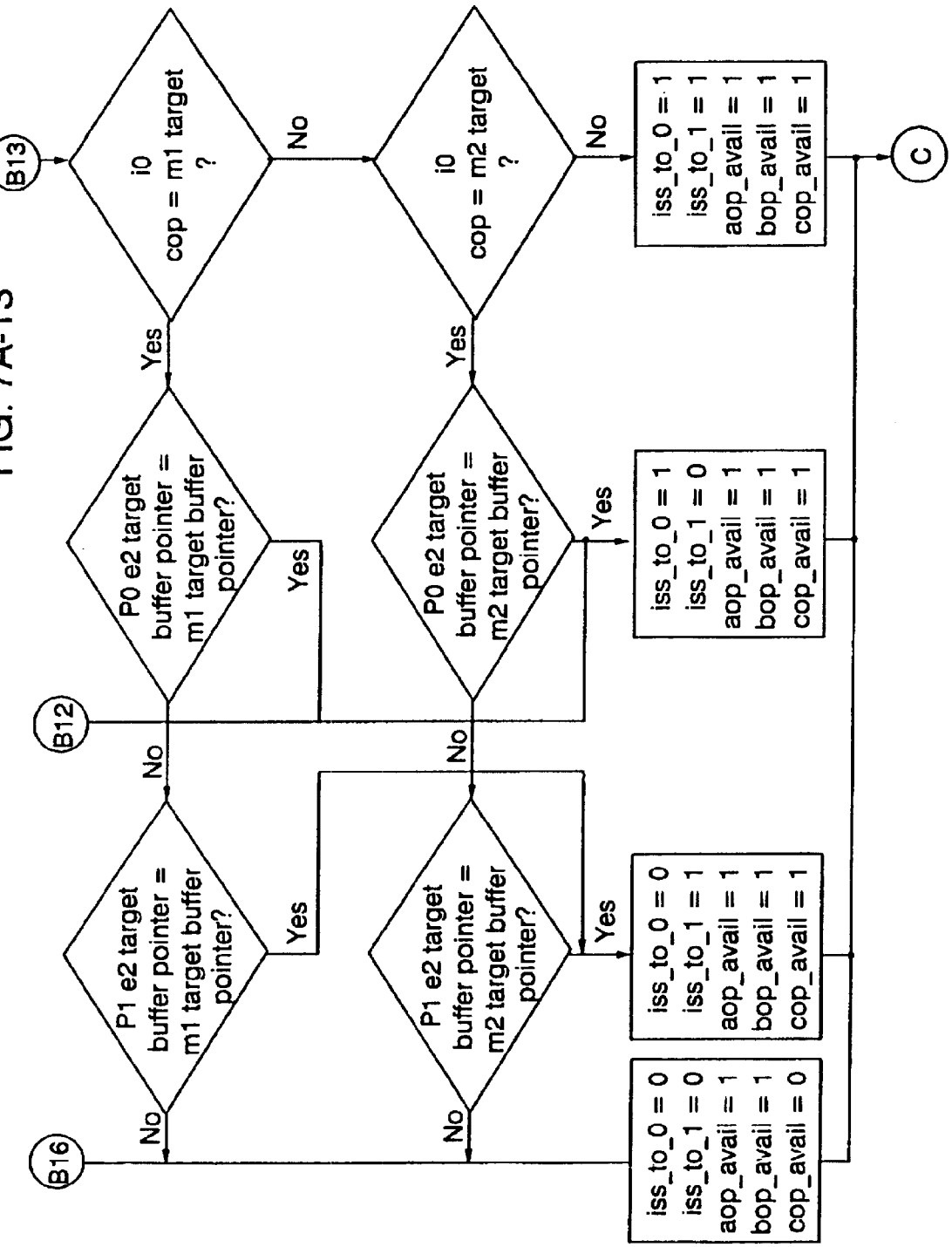
Figures 7, 7A, 8, 9, 10, 11, 12, 13, 14:
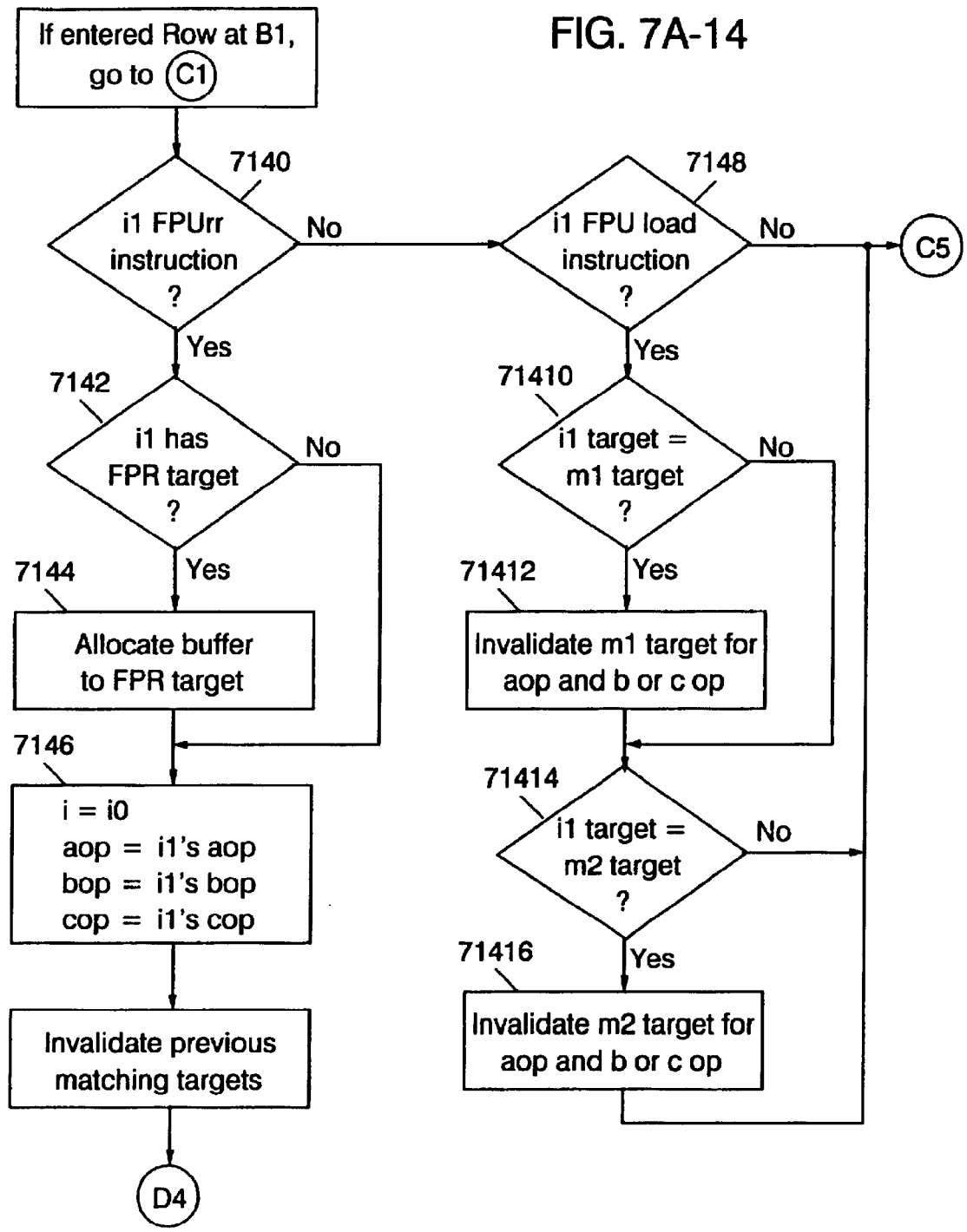
Figures 7, 7A, 8, 9, 10, 11, 12, 13, 14, 15:
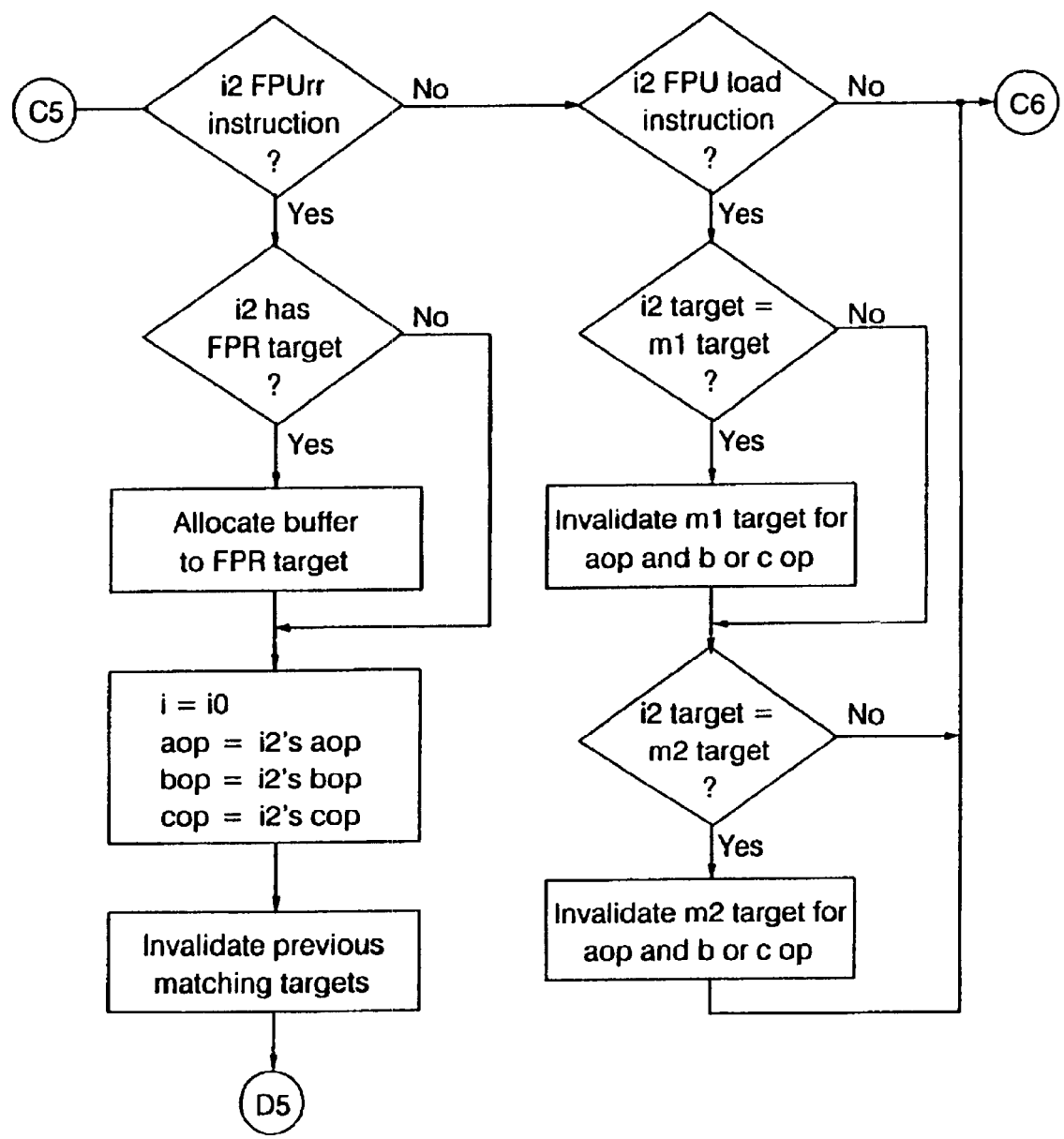
Figures 7, 7A, 8, 9, 10, 11, 12, 13, 14, 15, 16:
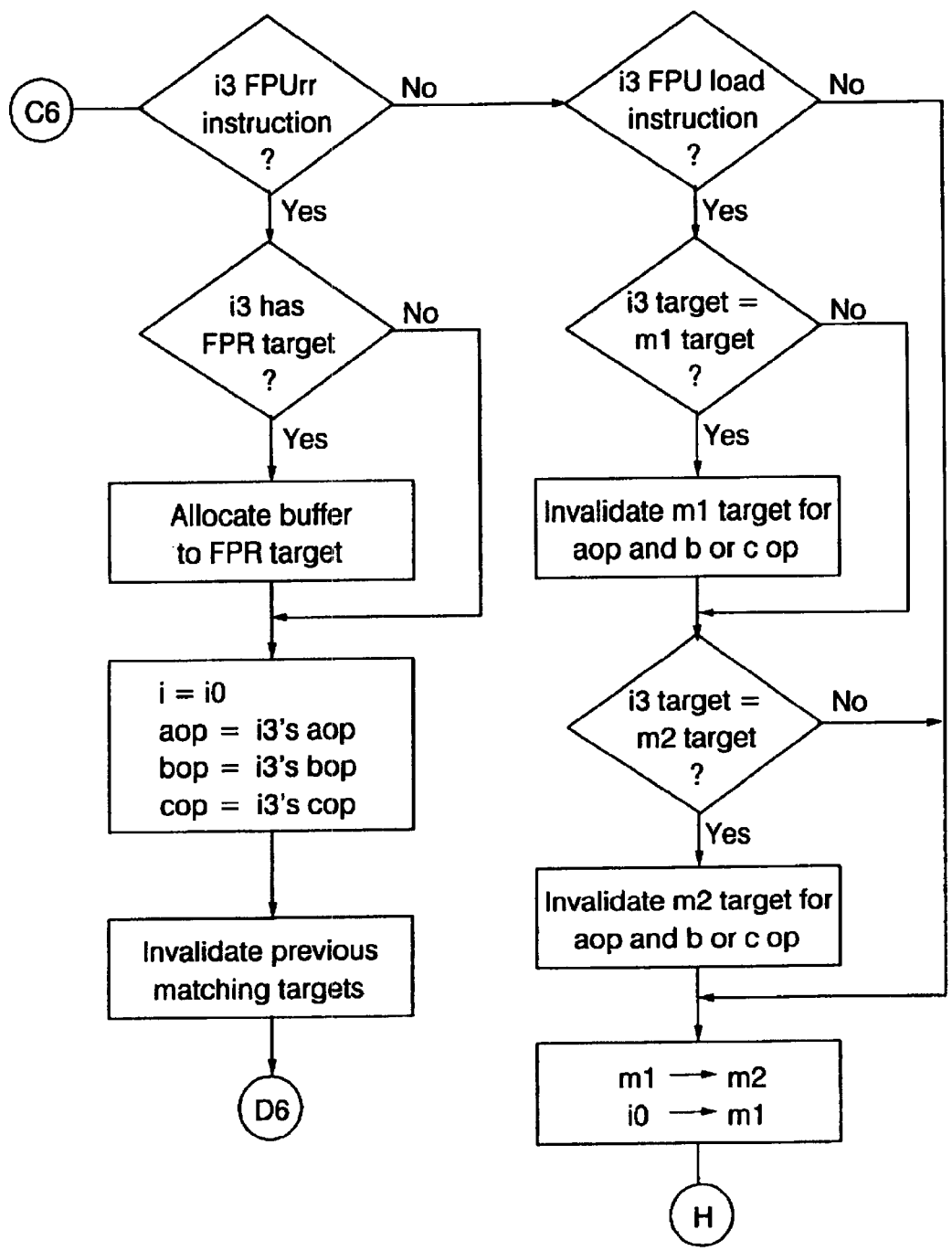
Figures 7, 7A, 8, 9, 10, 11, 12, 13, 14, 15, 16, 17:
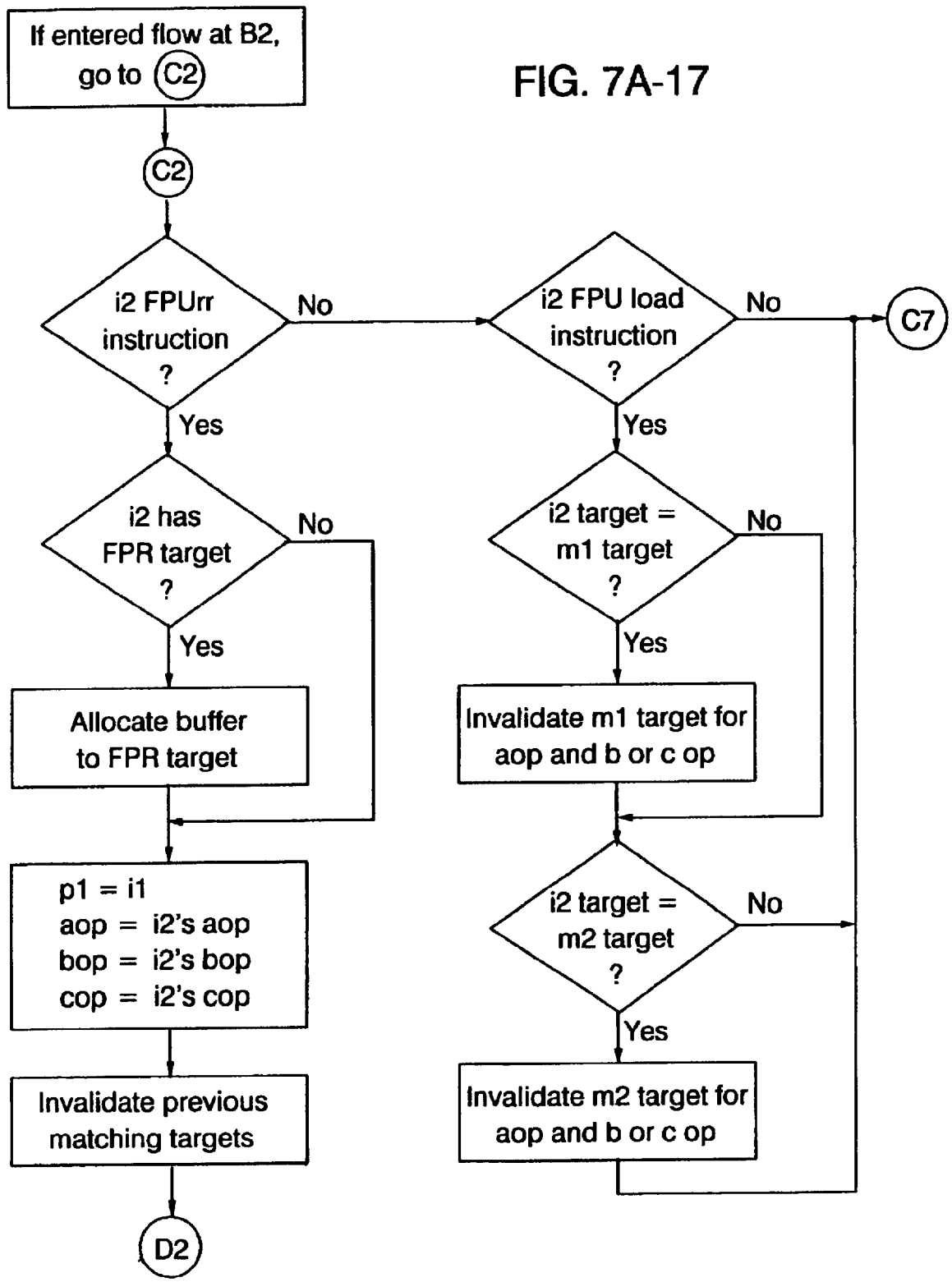
Figures 7, 7A, 8, 9, 10, 11, 12, 13, 14, 15, 16, 17, 18:
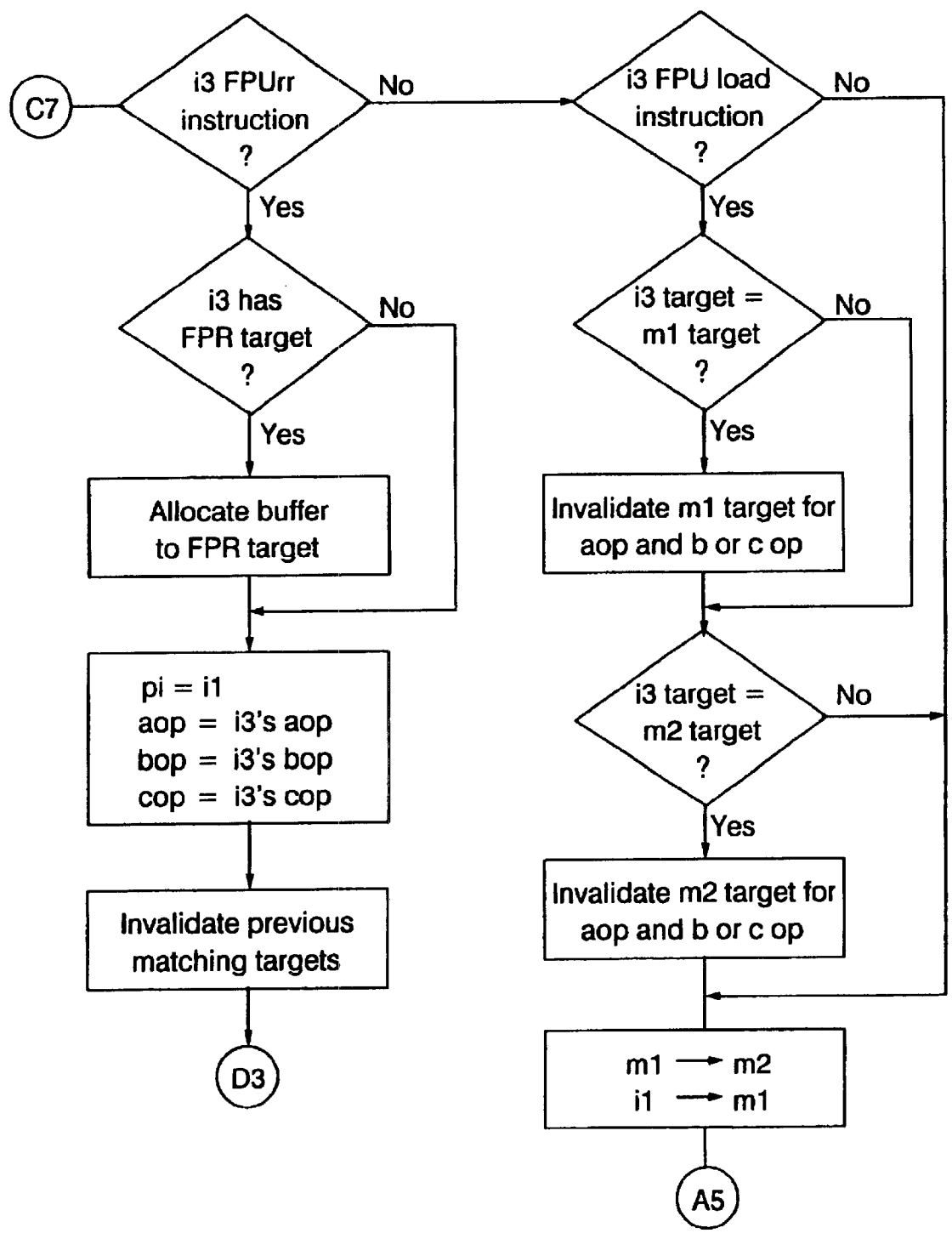
Figures 7, 7A, 8, 9, 10, 11, 12, 13, 14, 15, 16, 17, 18, 19:
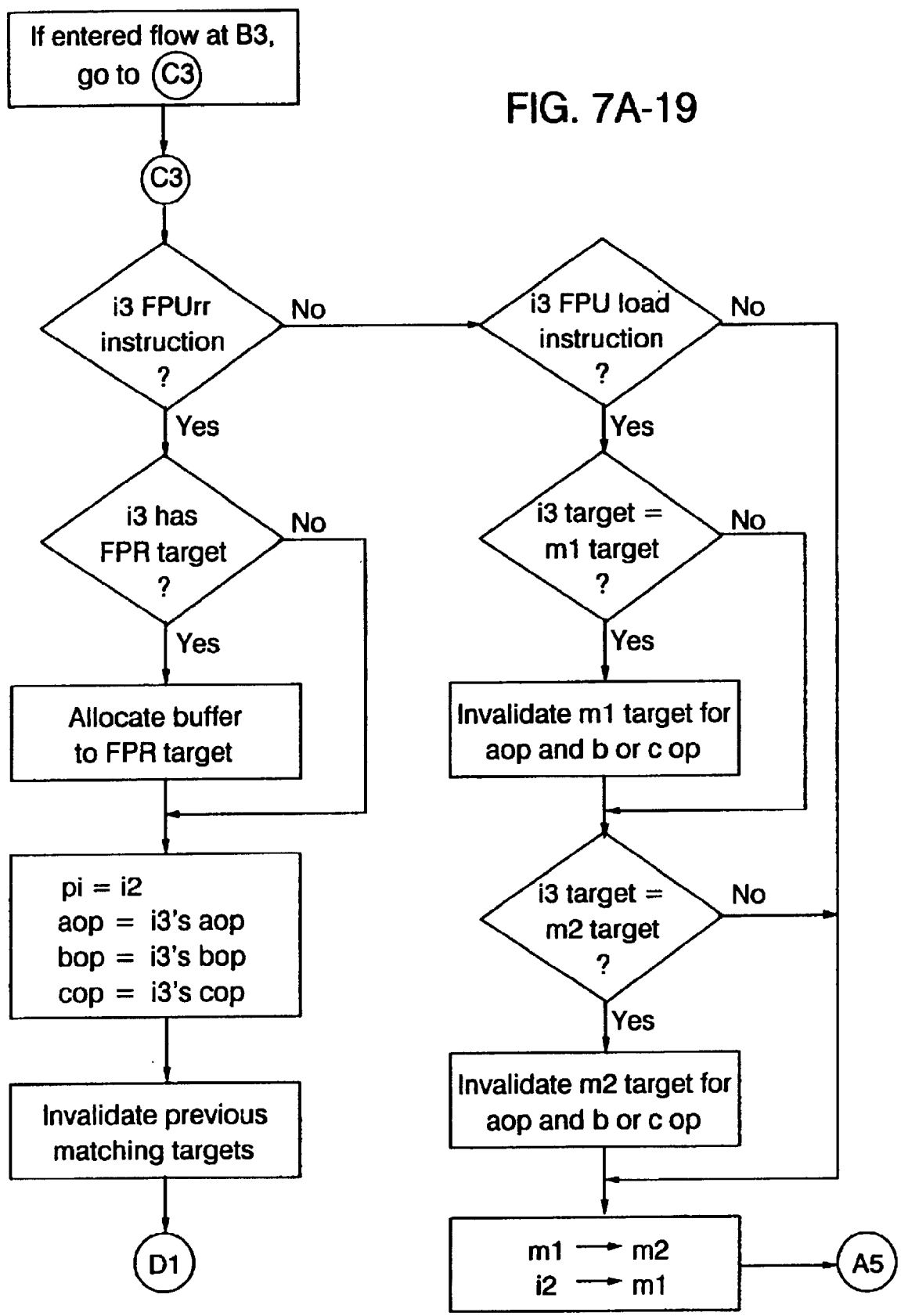
Figures 7, 7A, 8, 9, 10, 11, 12, 13, 14, 15, 16, 17, 18, 19, 20:
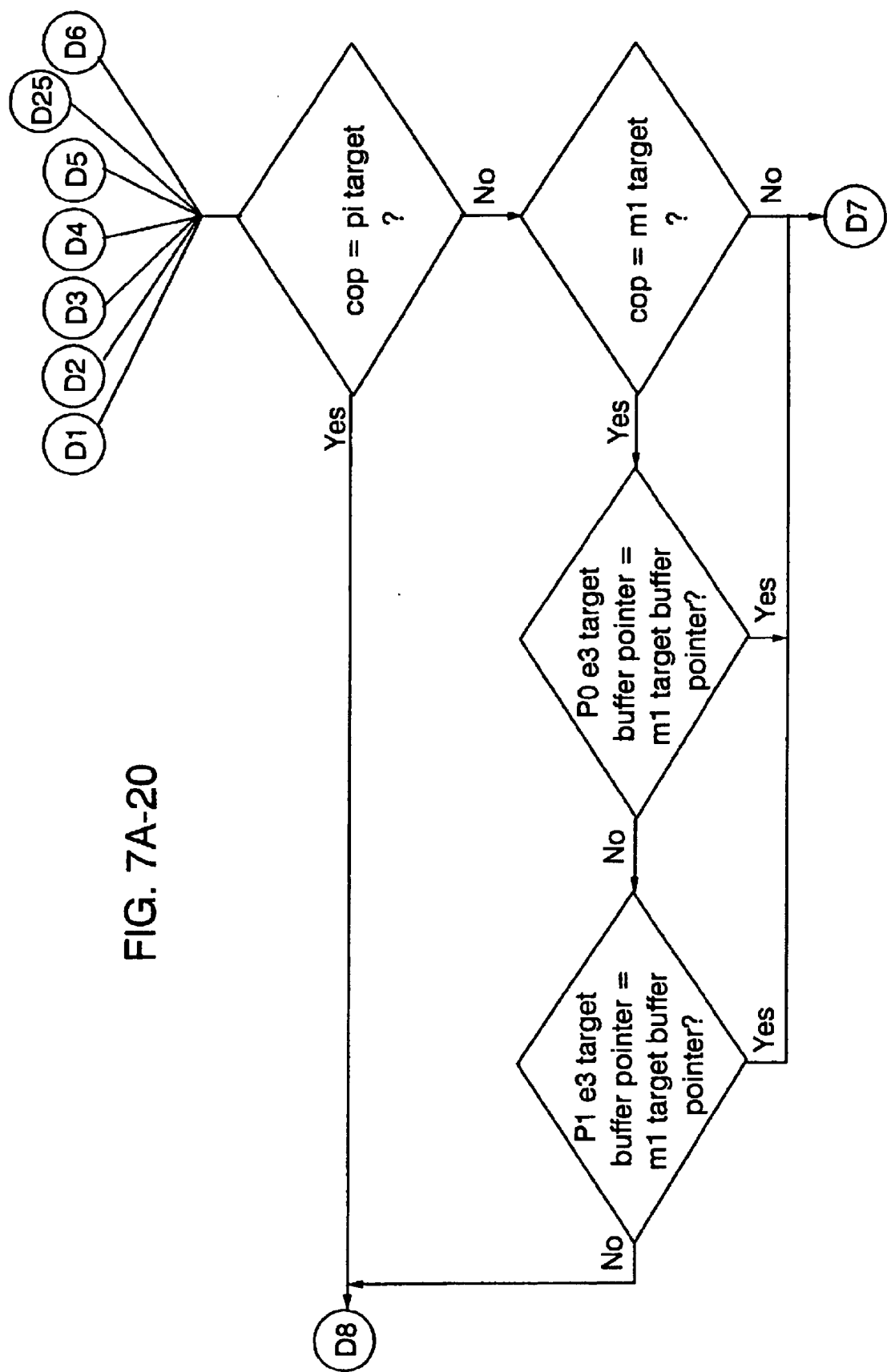
Figures 7, 7A, 8, 9, 10, 11, 12, 13, 14, 15, 16, 17, 18, 19, 20, 21:
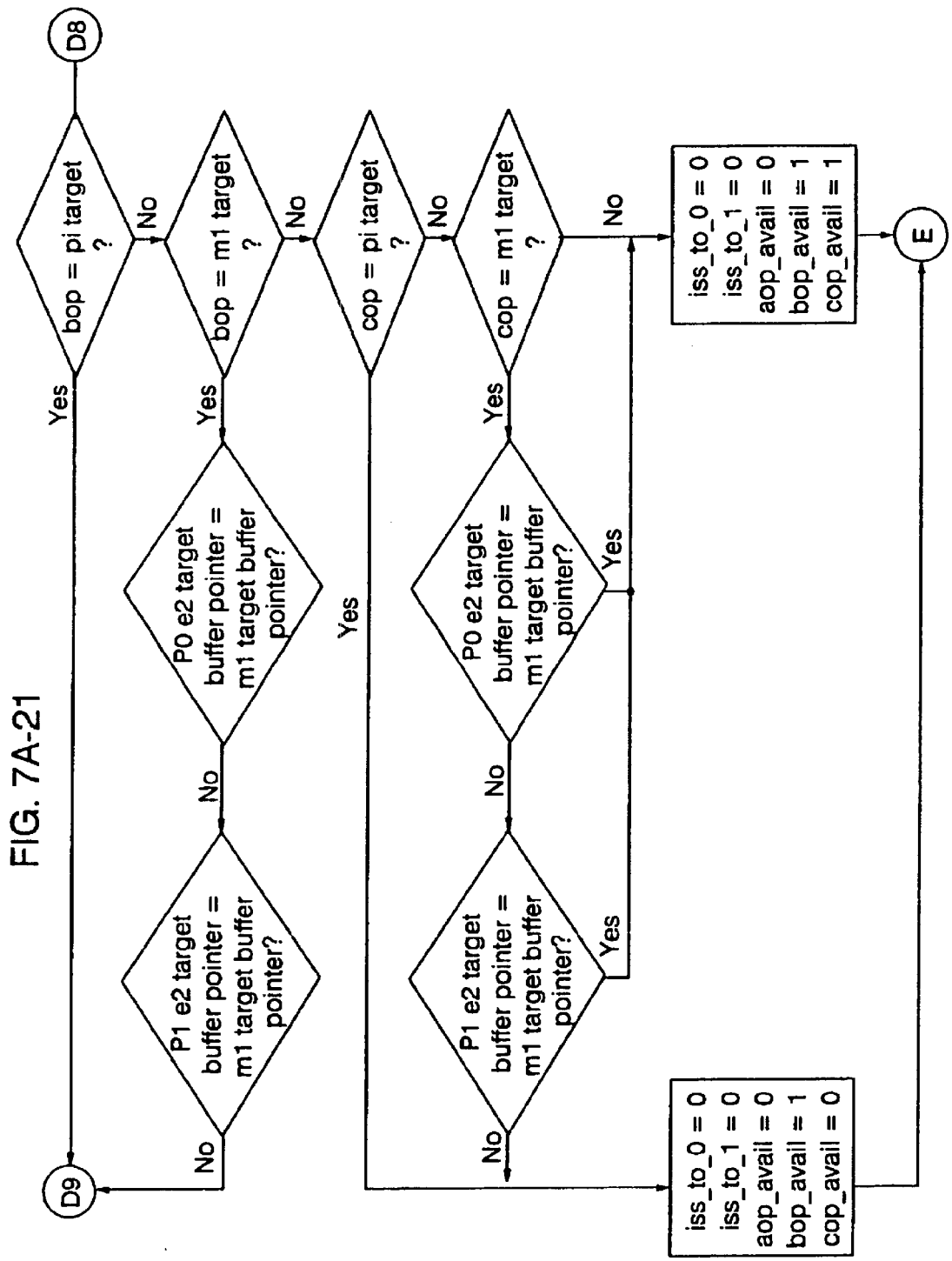
Figures 7, 7A, 8, 9, 10, 11, 12, 13, 14, 15, 16, 17, 18, 19, 20, 21, 22:
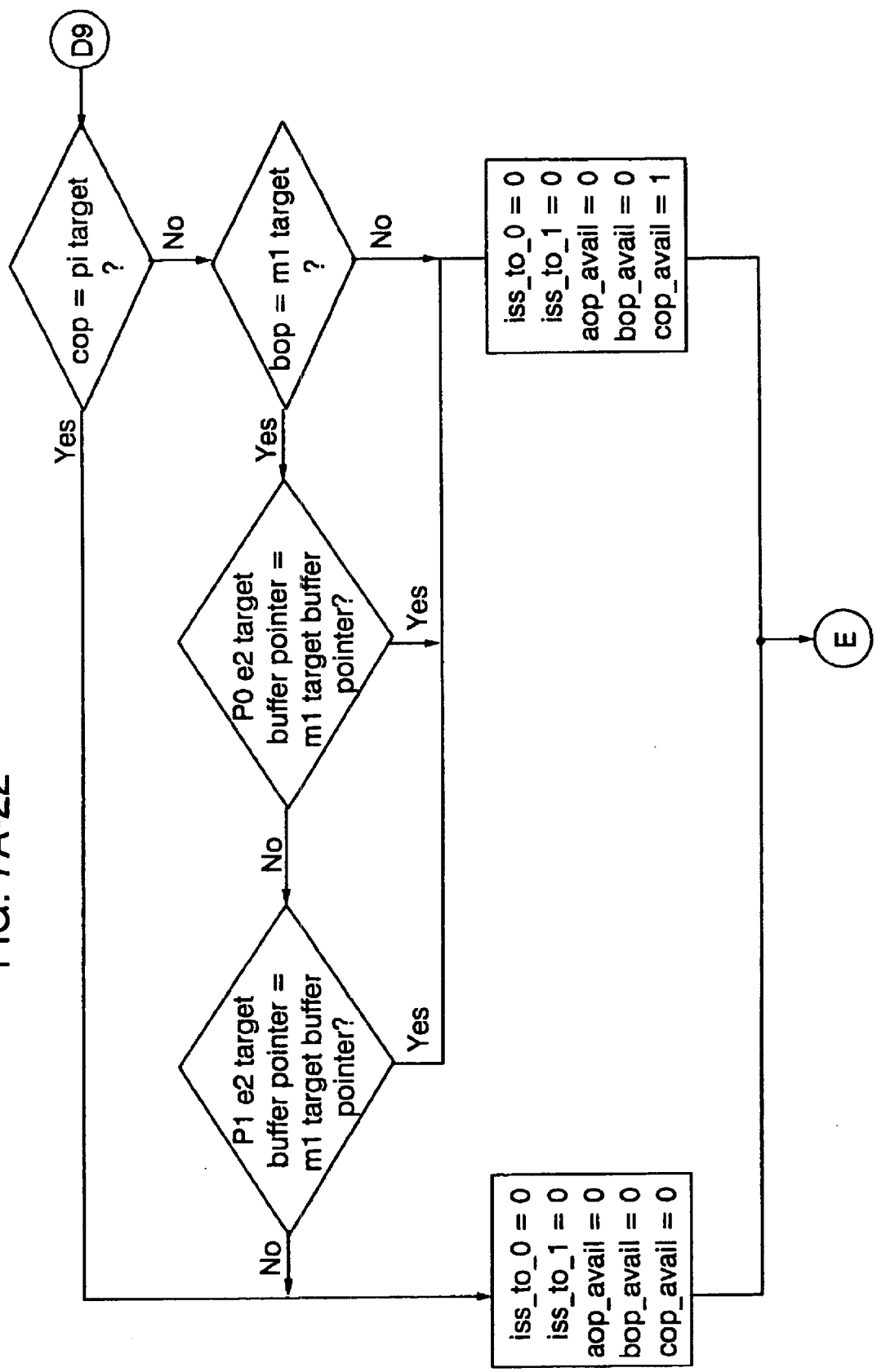
Figures 7, 7A, 8, 9, 10, 11, 12, 13, 14, 15, 16, 17, 18, 19, 20, 21, 22, 23, 24:
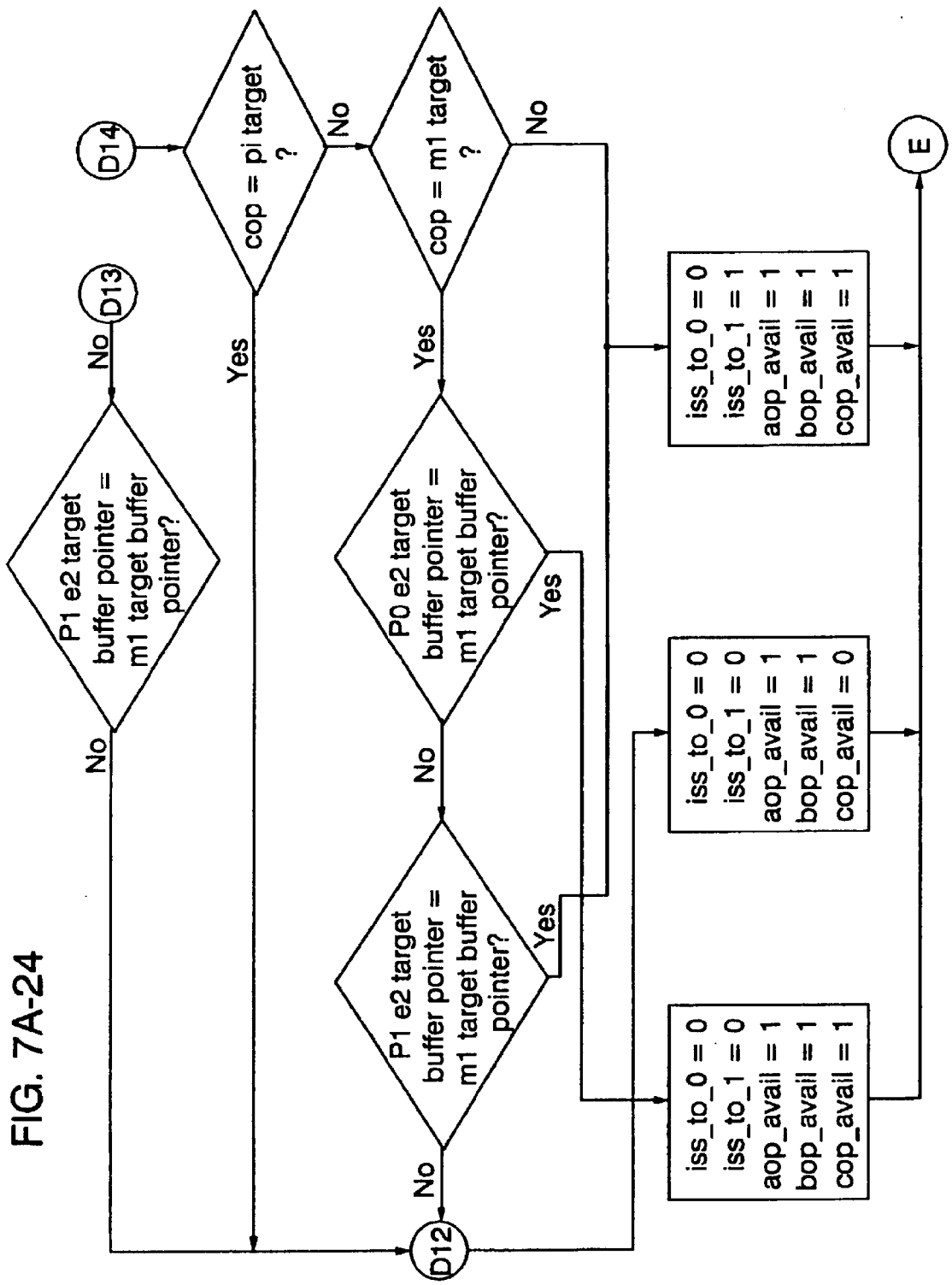
Figures 7, 7A, 8, 9, 10, 11, 12, 13, 14, 15, 16, 17, 18, 19, 20, 21, 22, 23, 24, 25:
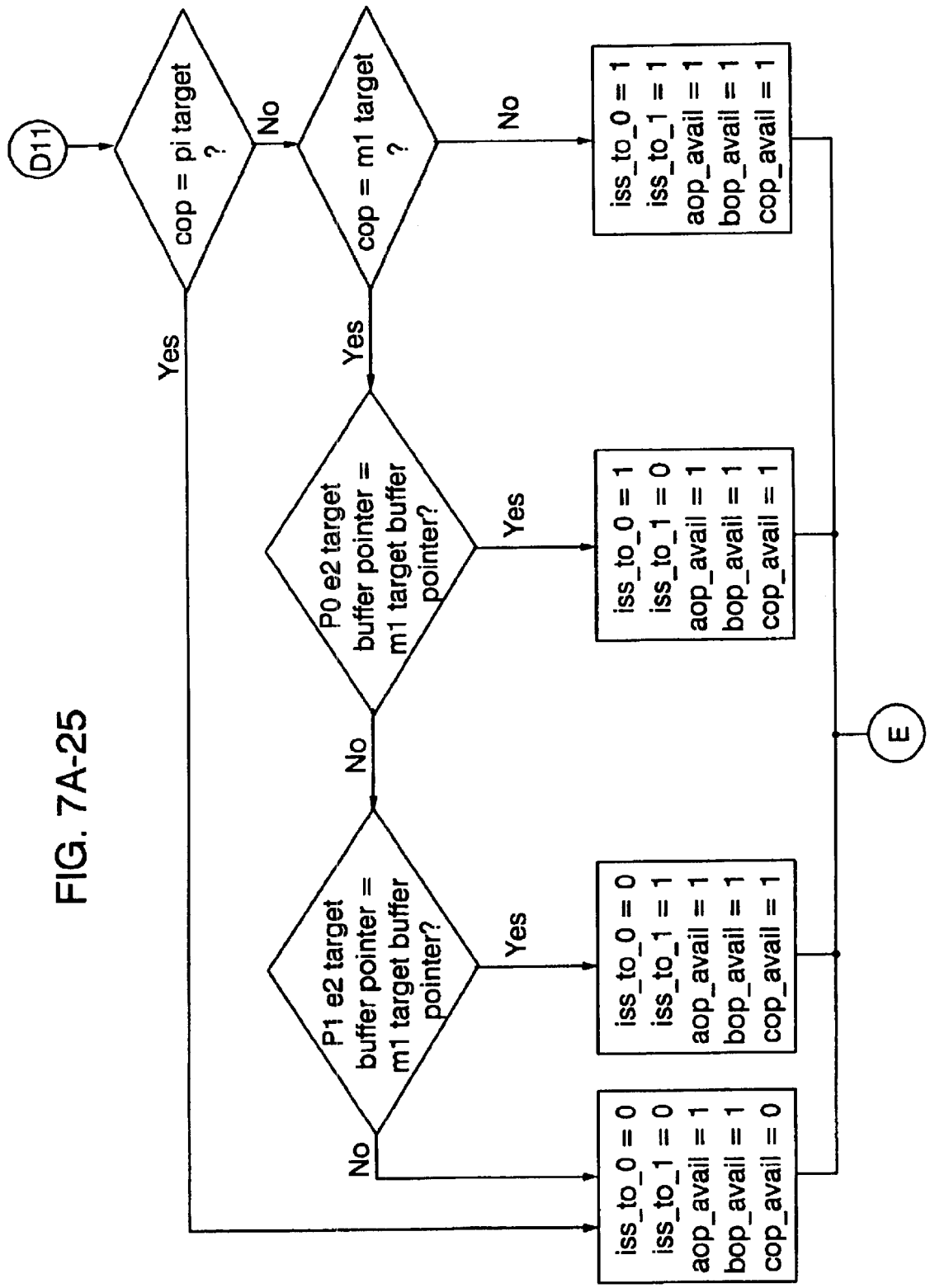
Figures 7, 7A, 8, 9, 10, 11, 12, 13, 14, 15, 16, 17, 18, 19, 20, 21, 22, 23, 24, 25, 26:
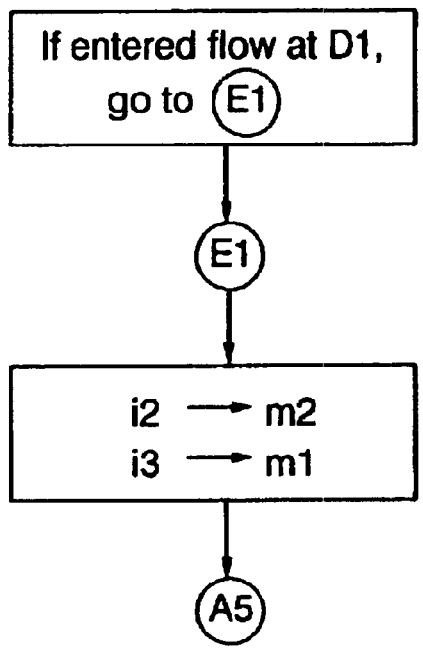
Figures 7, 7A, 8, 9, 10, 11, 12, 13, 14, 15, 16, 17, 18, 19, 20, 21, 22, 23, 24, 25, 26, 27, 28, 29, 30, 31, 32:
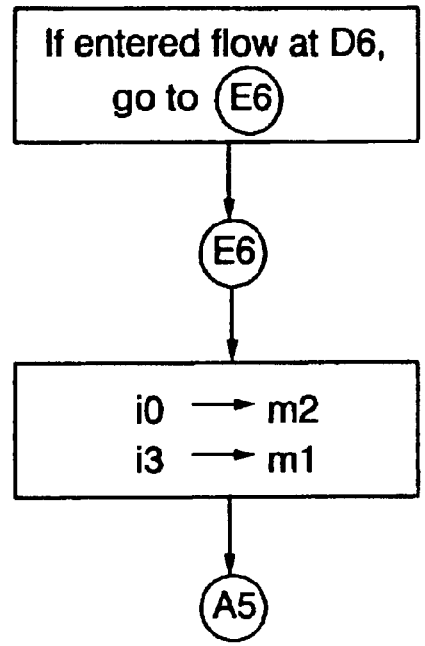
Figures 7, 7A, 8, 9, 10, 11, 12, 13, 14, 15, 16, 17, 18, 19, 20, 21, 22, 23, 24, 25, 26, 27, 28:
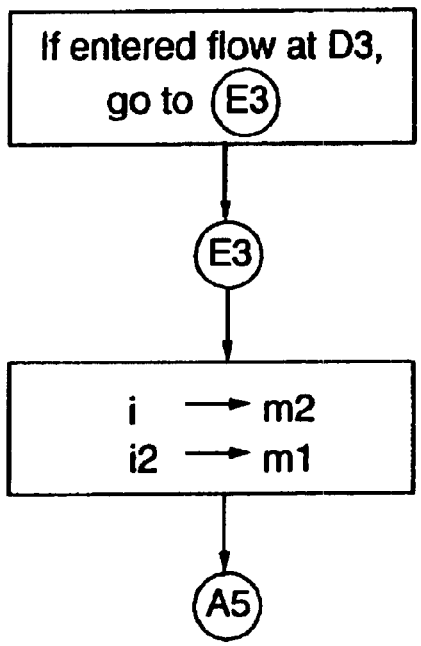
Figures 7, 7A, 8, 9, 10, 11, 12, 13, 14, 15, 16, 17, 18, 19, 20, 21, 22, 23, 24, 25, 26, 27, 28, 29, 30, 31, 32, 33:
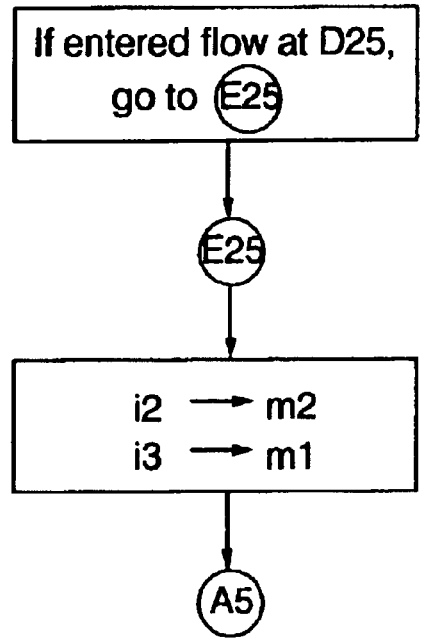
Figures 7, 7A, 8, 9, 10, 11, 12, 13, 14, 15, 16, 17, 18, 19, 20, 21, 22, 23, 24, 25, 26, 27:
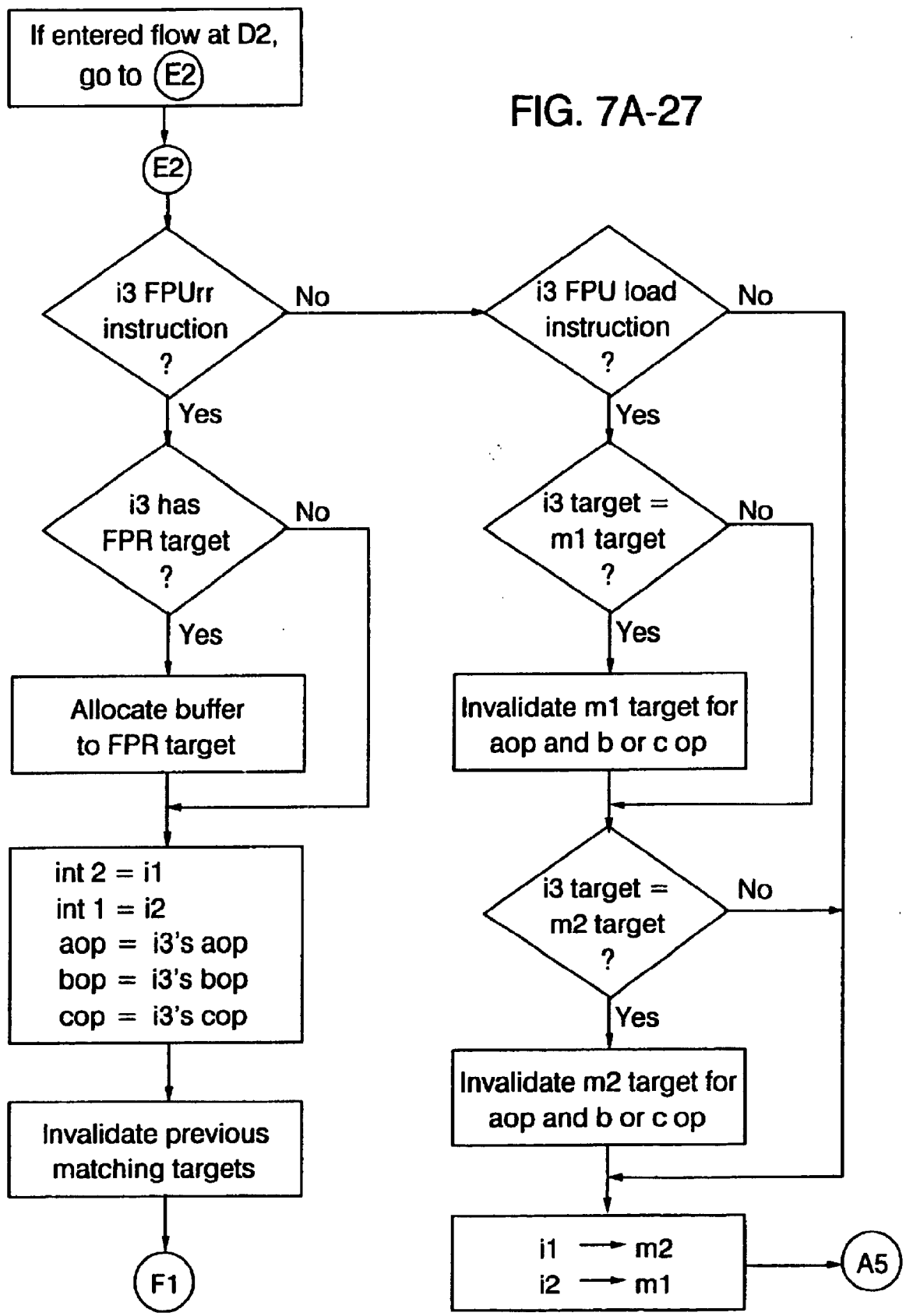
Figures 7, 7A, 8, 9, 10, 11, 12, 13, 14, 15, 16, 17, 18, 19, 20, 21, 22, 23, 24, 25, 26, 27, 28, 29:
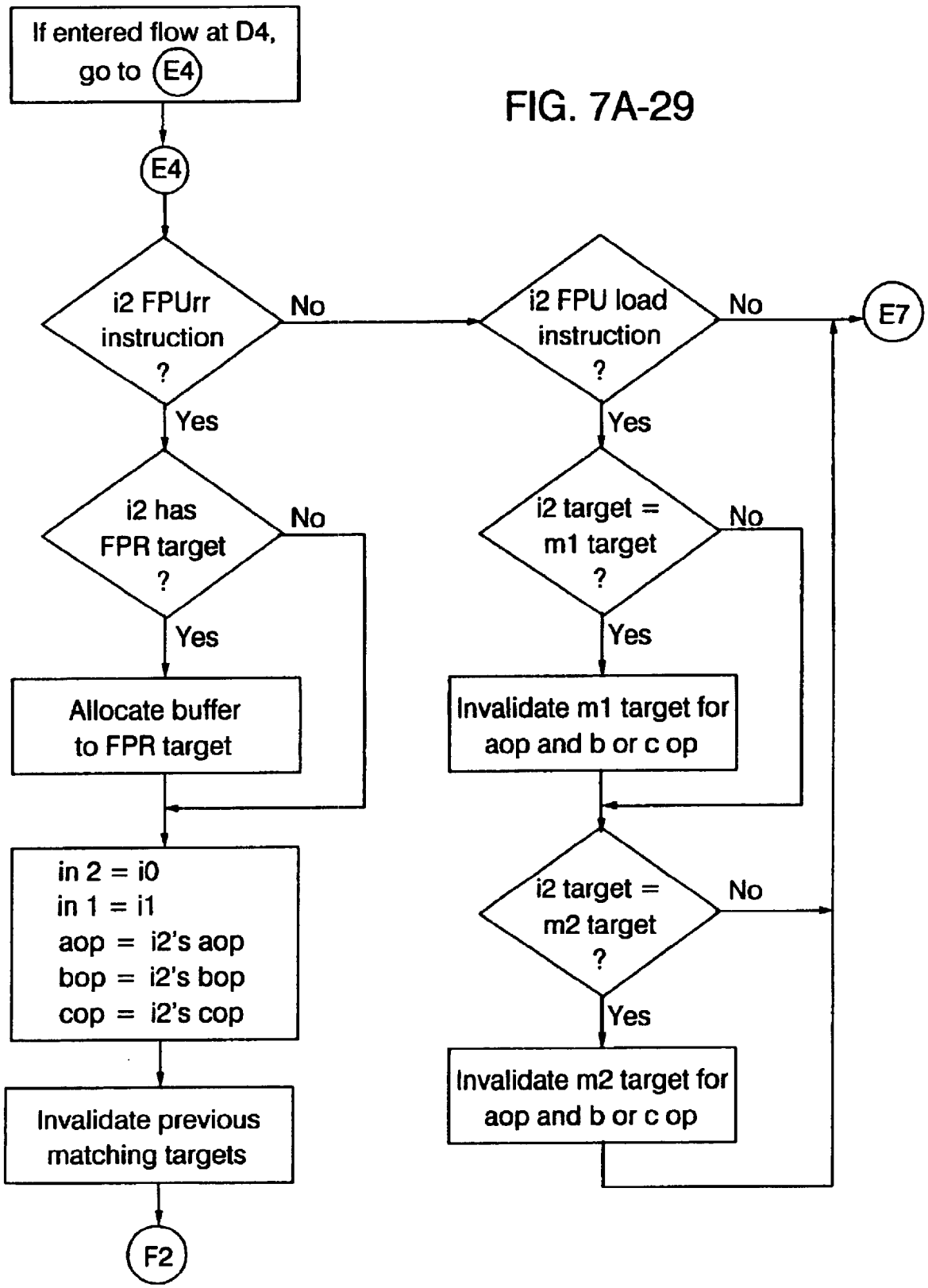
Figures 7, 7A, 8, 9, 10, 11, 12, 13, 14, 15, 16, 17, 18, 19, 20, 21, 22, 23, 24, 25, 26, 27, 28, 29, 30:
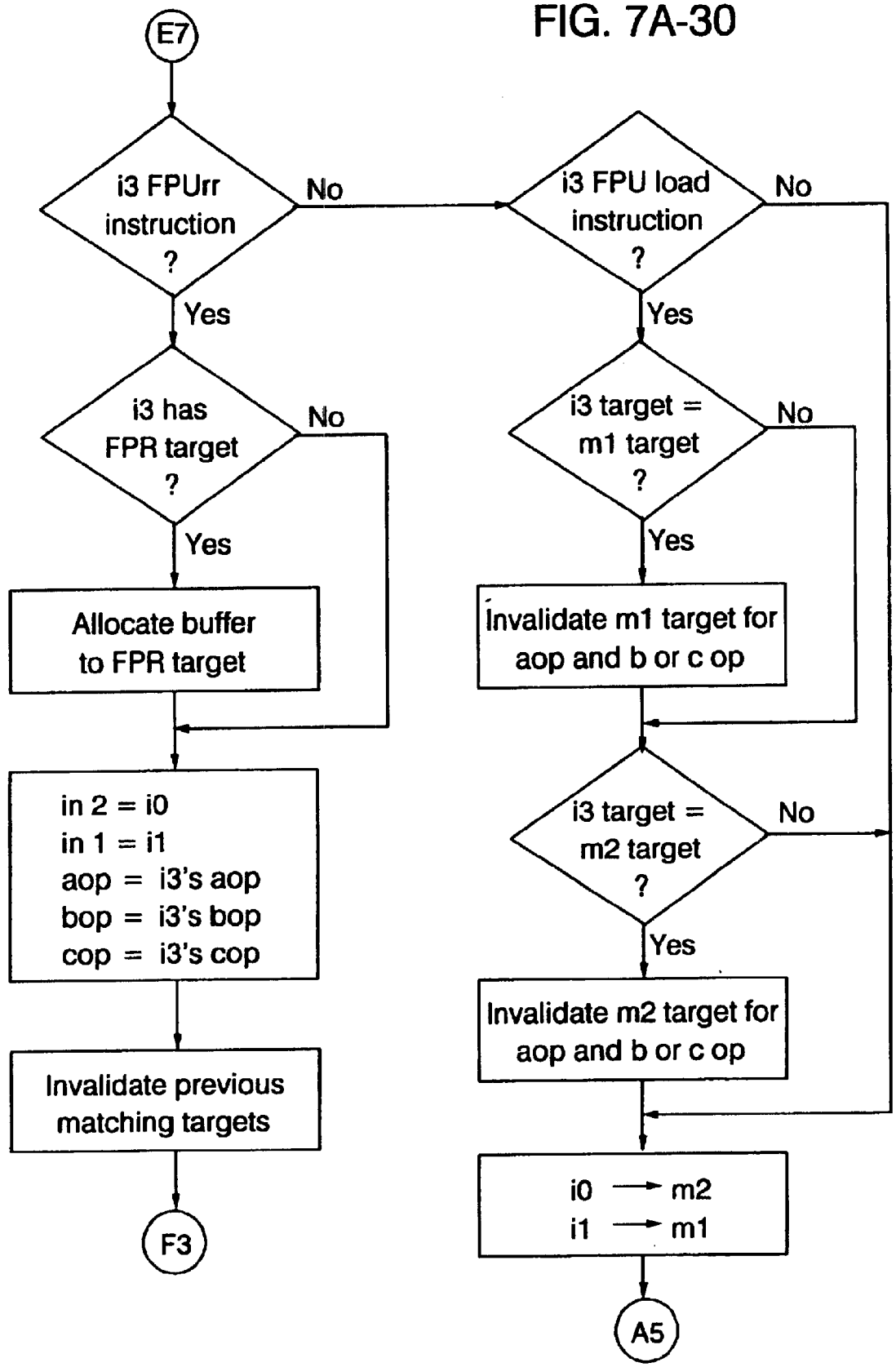
Figures 7, 7A, 8, 9, 10, 11, 12, 13, 14, 15, 16, 17, 18, 19, 20, 21, 22, 23, 24, 25, 26, 27, 28, 29, 30, 31:
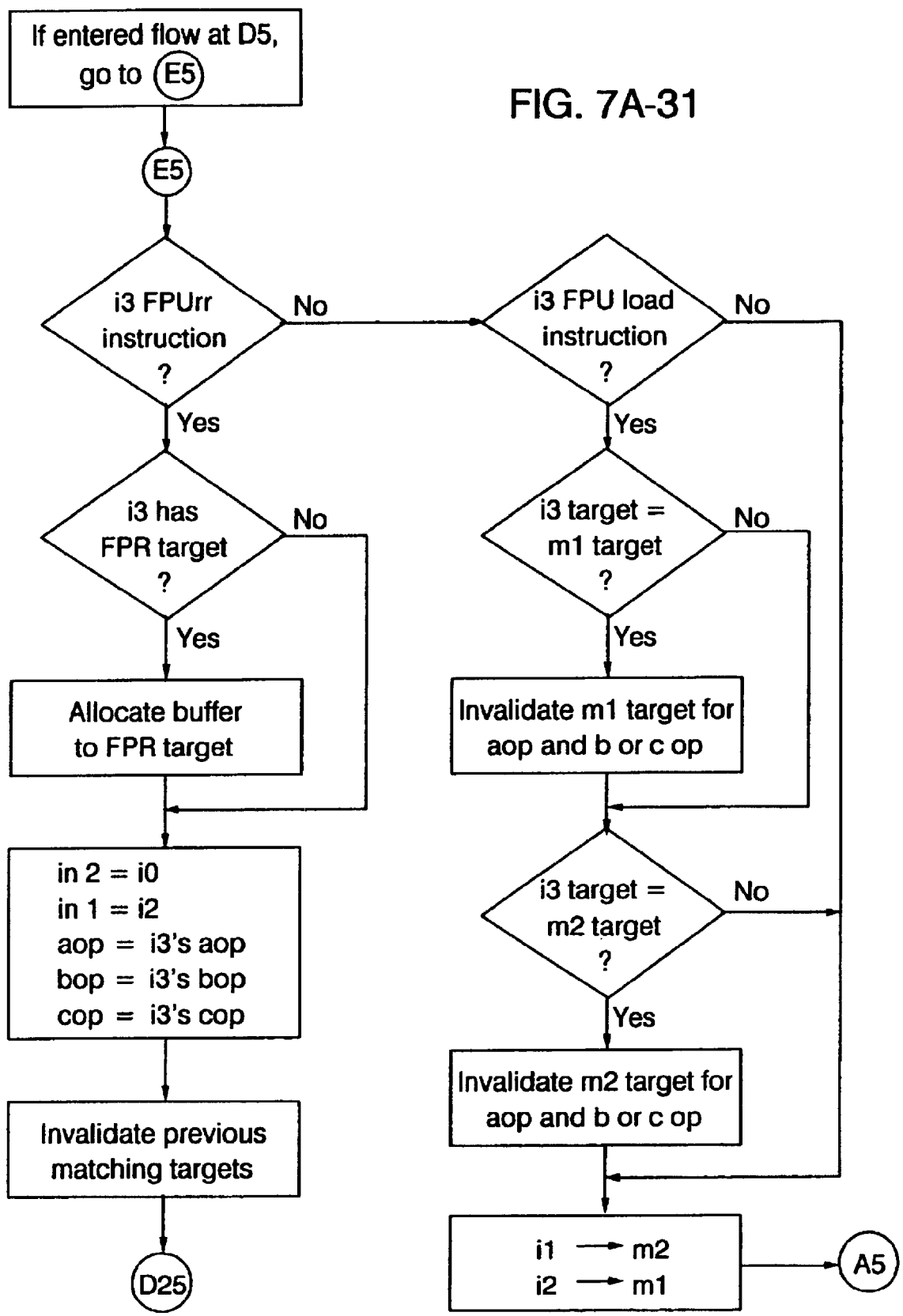
Figures 7, 7A, 8, 9, 10, 11, 12, 13, 14, 15, 16, 17, 18, 19, 20, 21, 22, 23, 24, 25, 26, 27, 28, 29, 30, 31, 32, 33, 34:
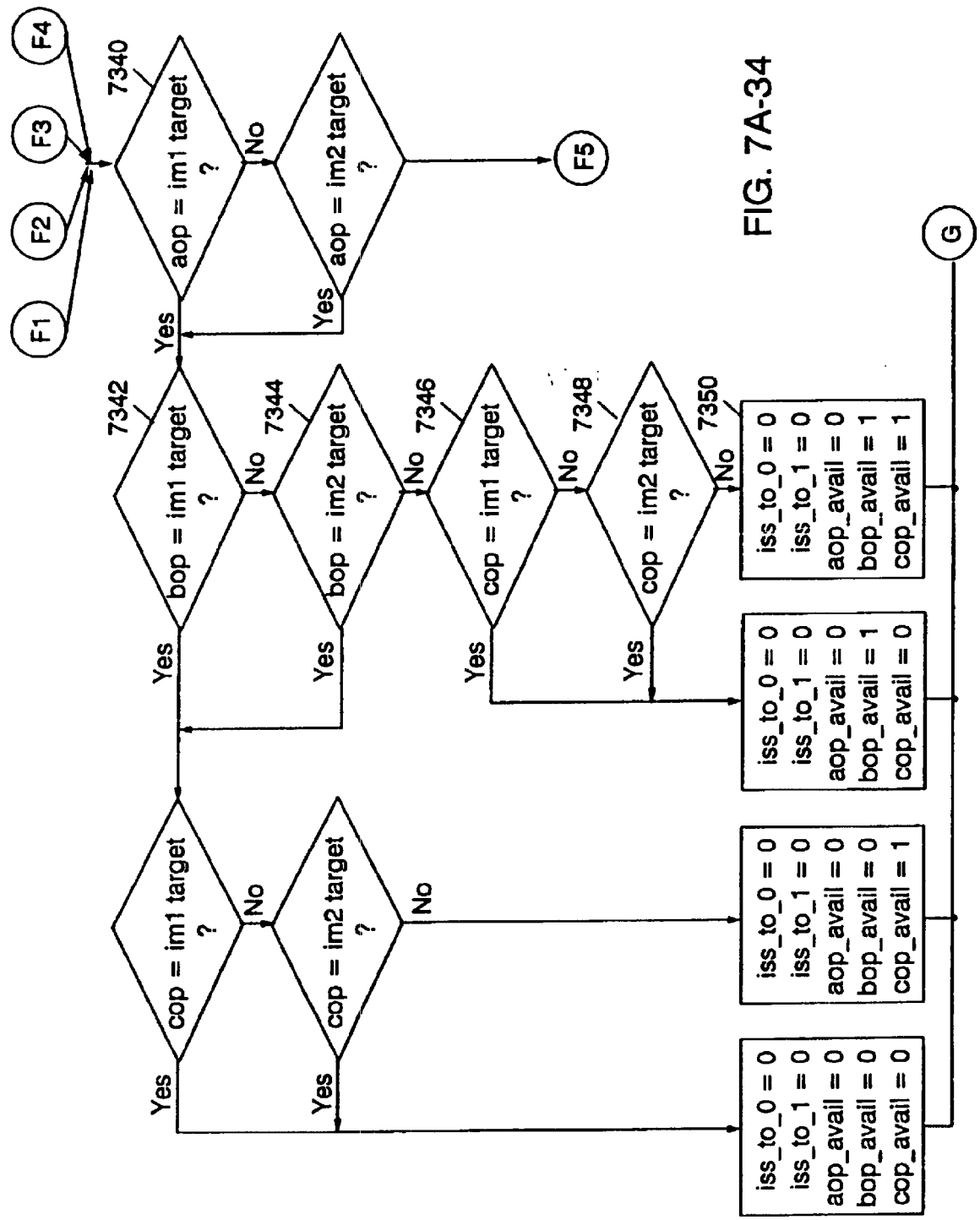
Figures 7, 7A, 8, 9, 10, 11, 12, 13, 14, 15, 16, 17, 18, 19, 20, 21, 22, 23, 24, 25, 26, 27, 28, 29, 30, 31, 32, 33, 34, 35:
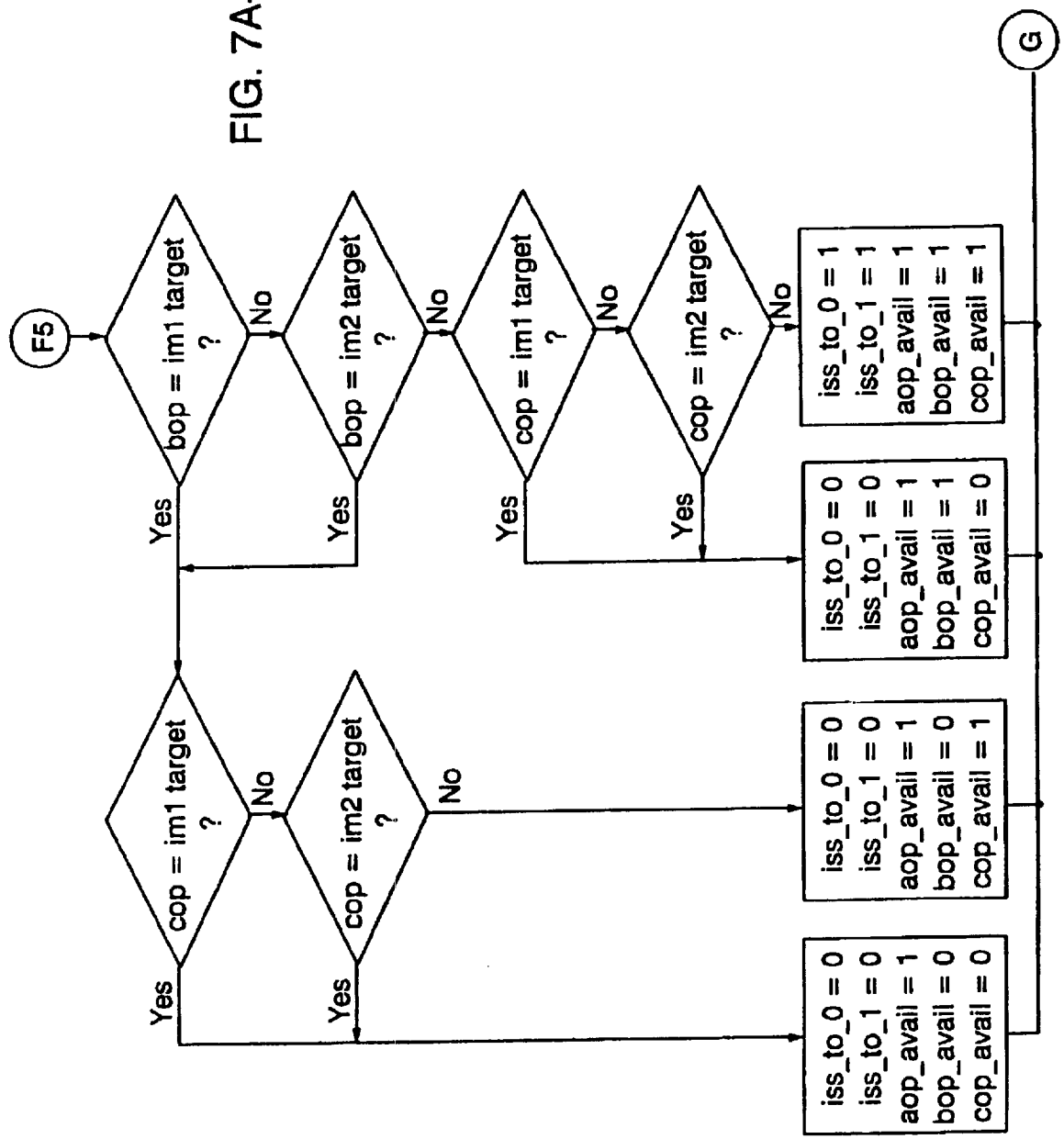
Figures 7, 7A, 8, 9, 10, 11, 12, 13, 14, 15, 16, 17, 18, 19, 20, 21, 22, 23, 24, 25, 26, 27, 28, 29, 30, 31, 32, 33, 34, 35, 36:
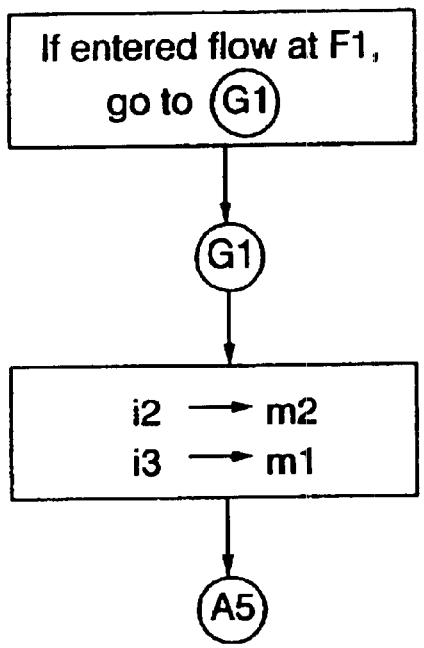
Figures 7, 7A, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
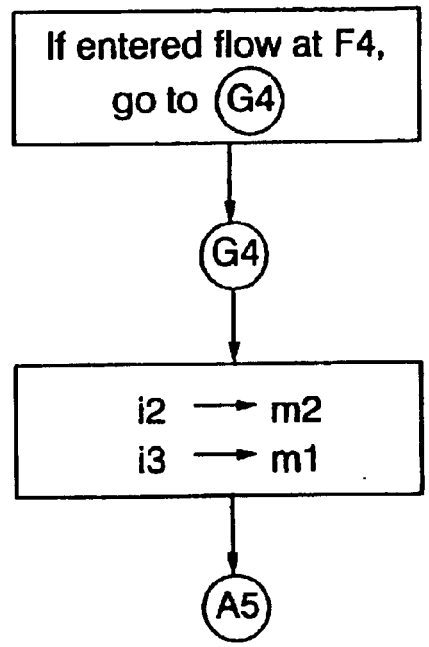
Figures 7, 7A, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
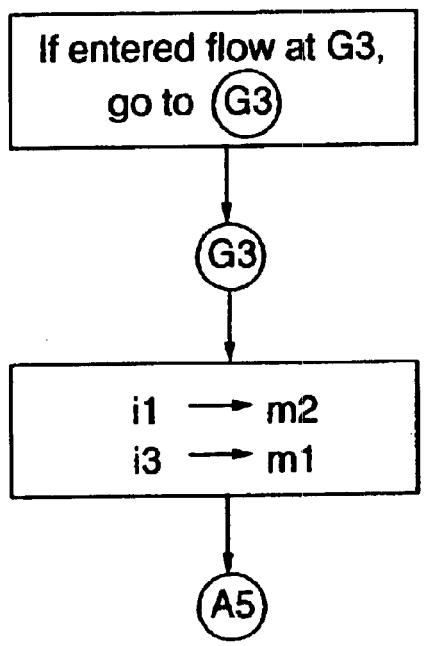
Figures 7, 7A, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
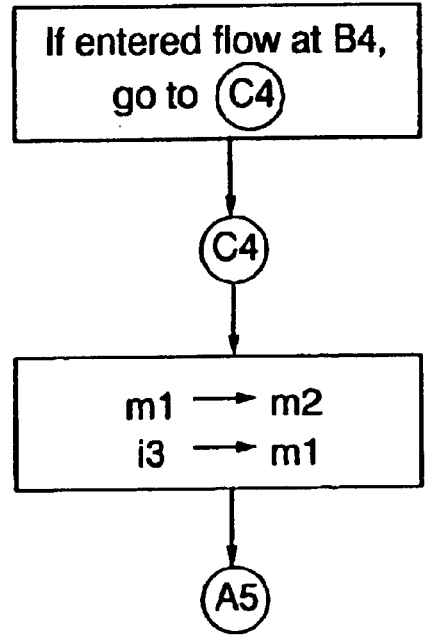
Figures 7, 7A, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
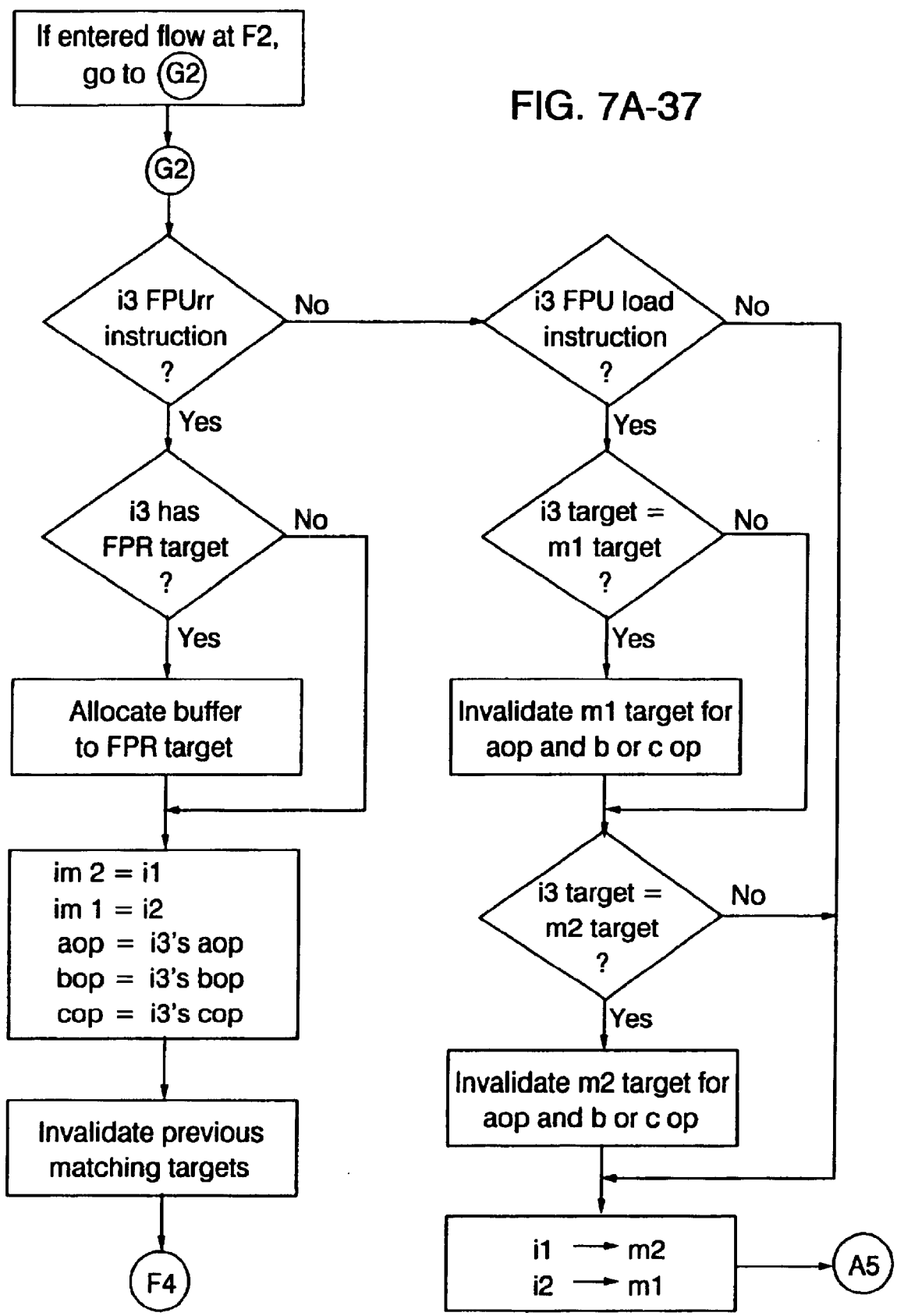
Figures 7, 7A, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41:
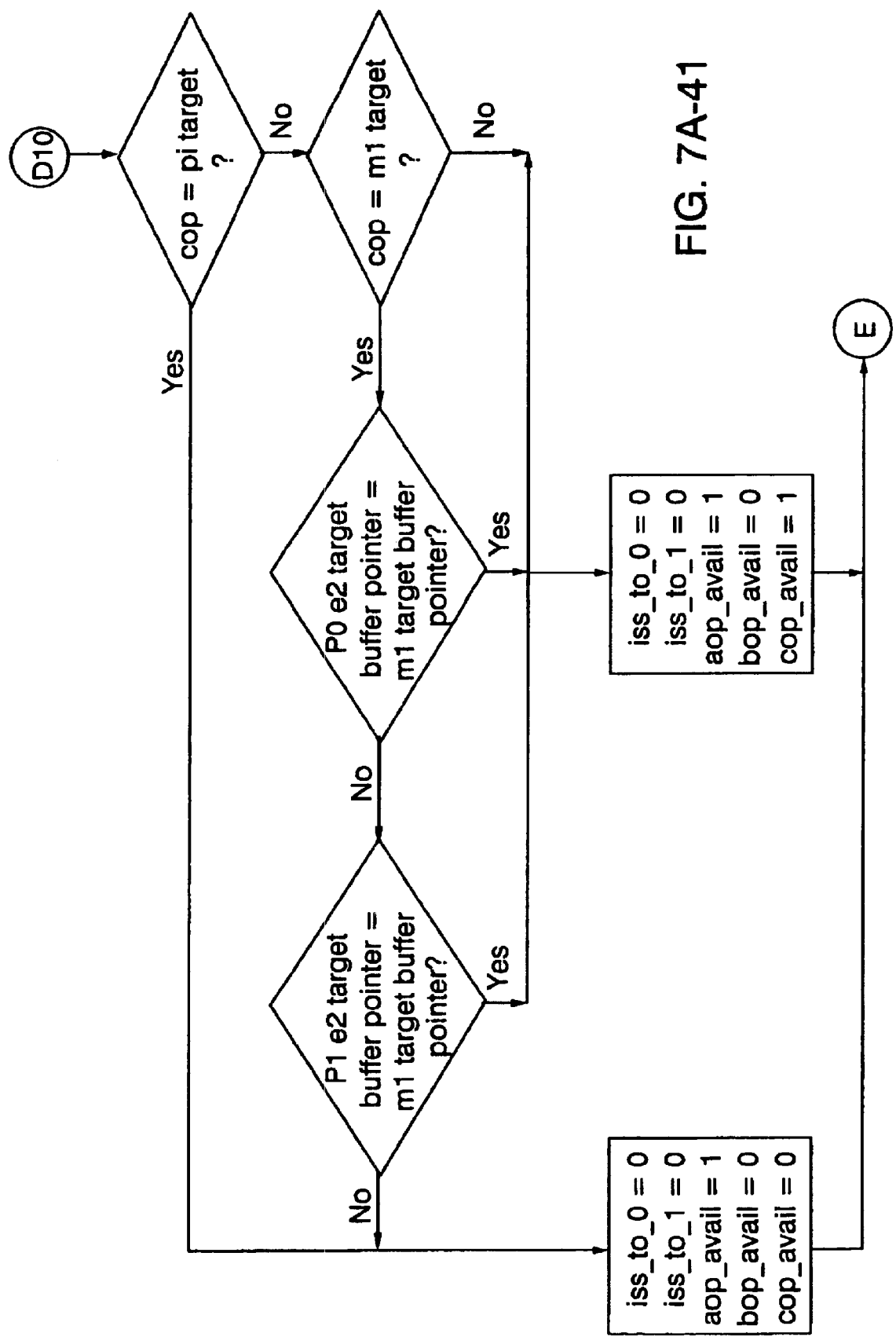
Figure 8:
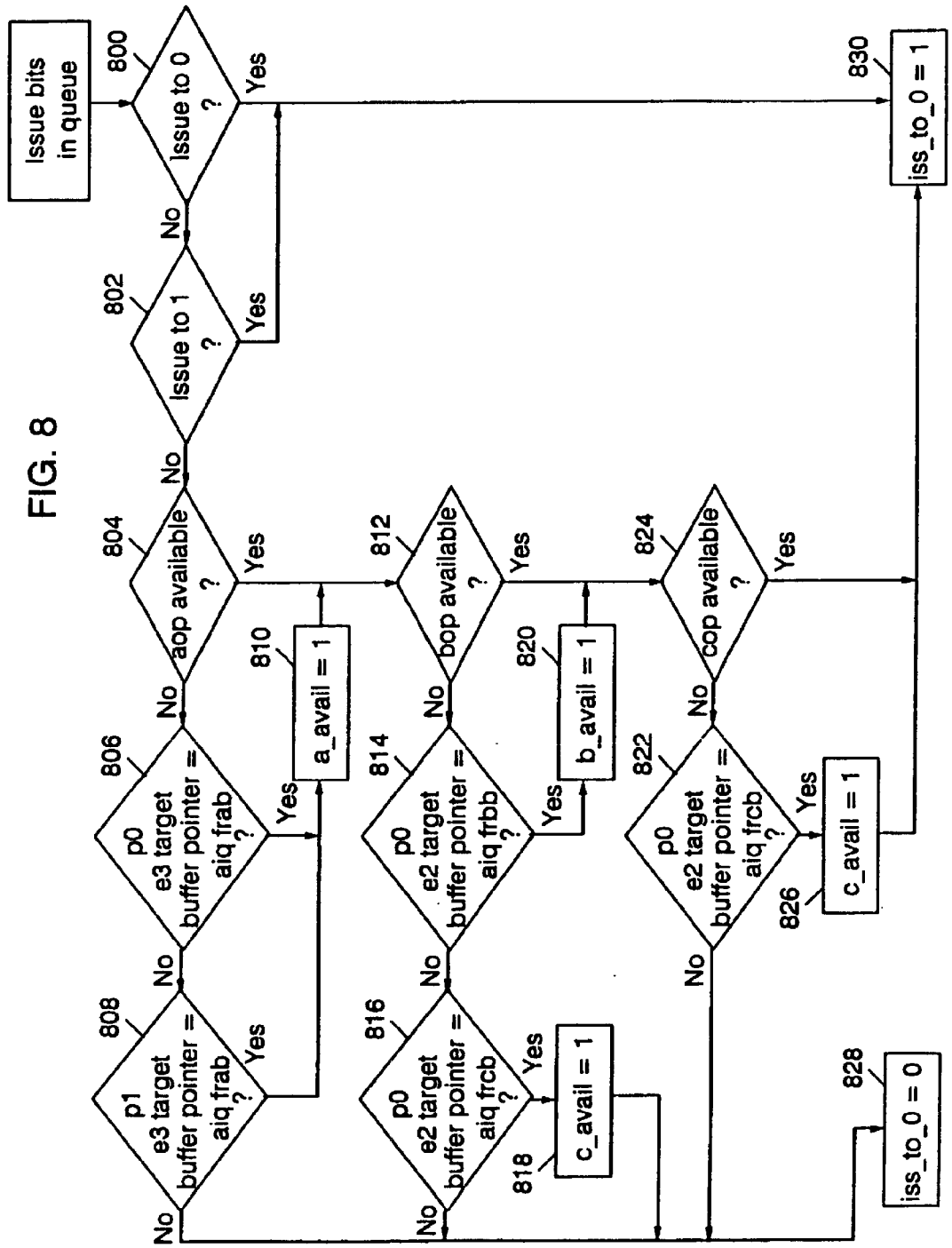
Figure 9:
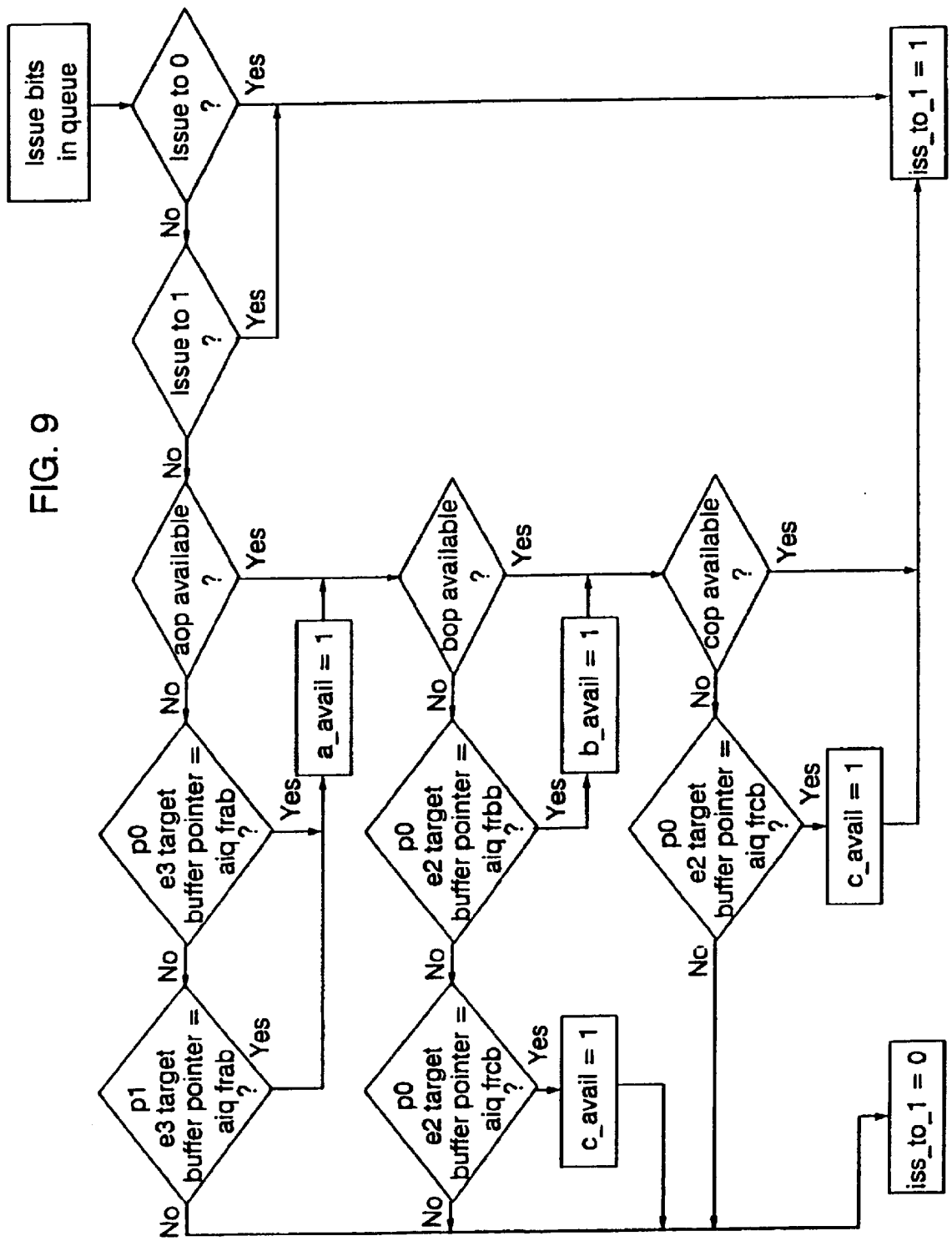
Figures 1, 10A:
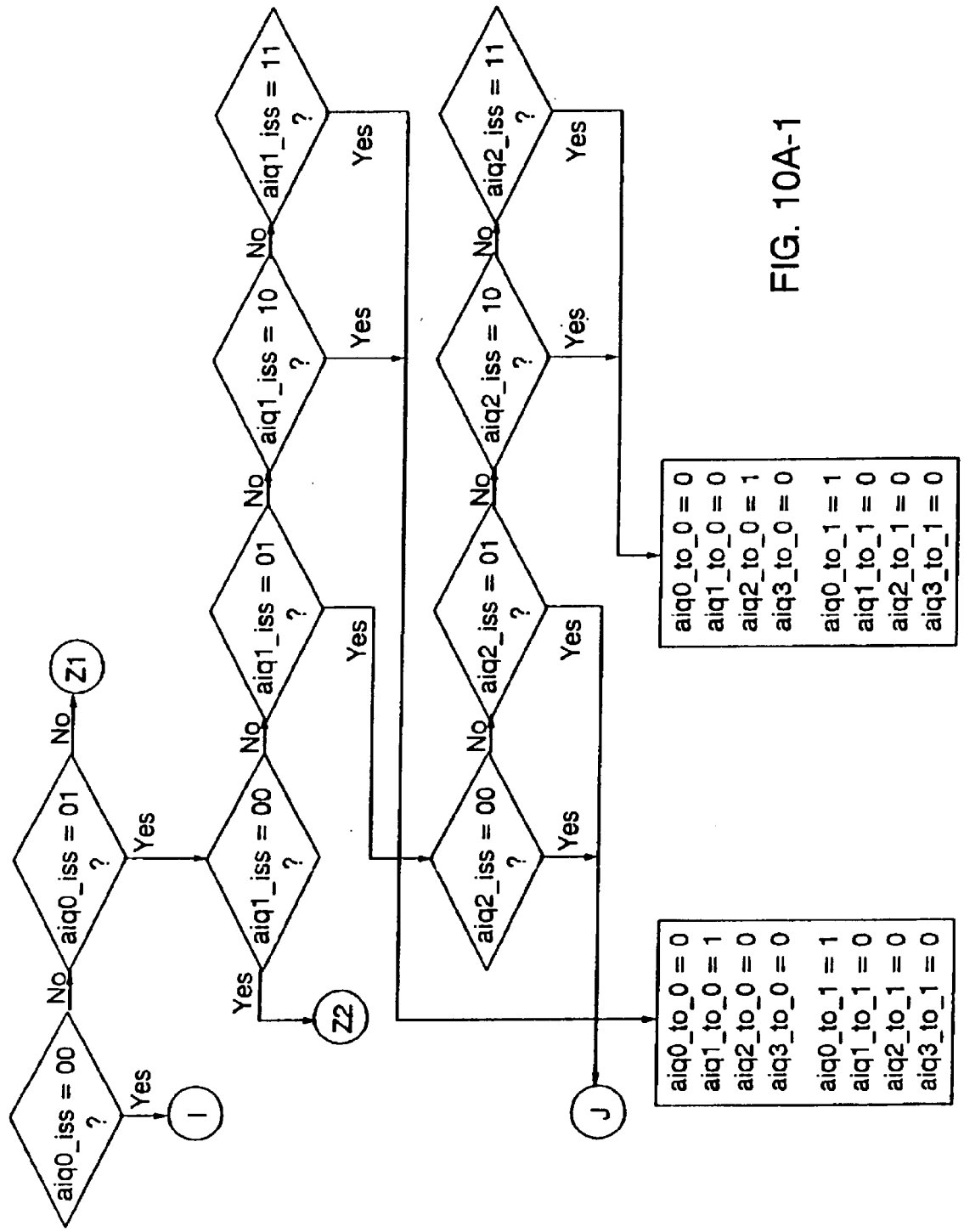
Figures 2, 10A:
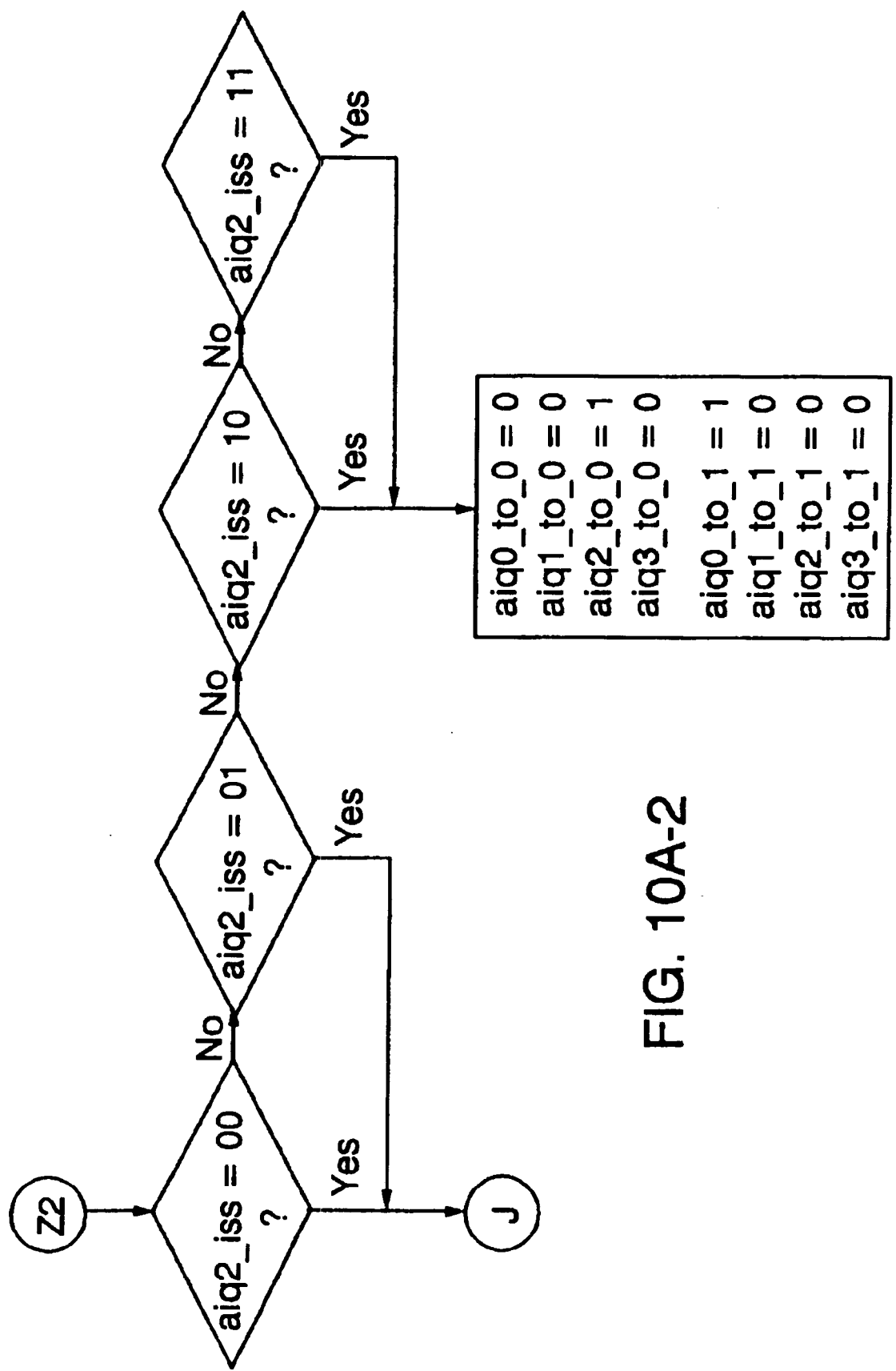
FIG. 2 illustrates, in block diagram form, a central processing unit in accordance with one embodiment of the present invention.
Figures 3, 10A:
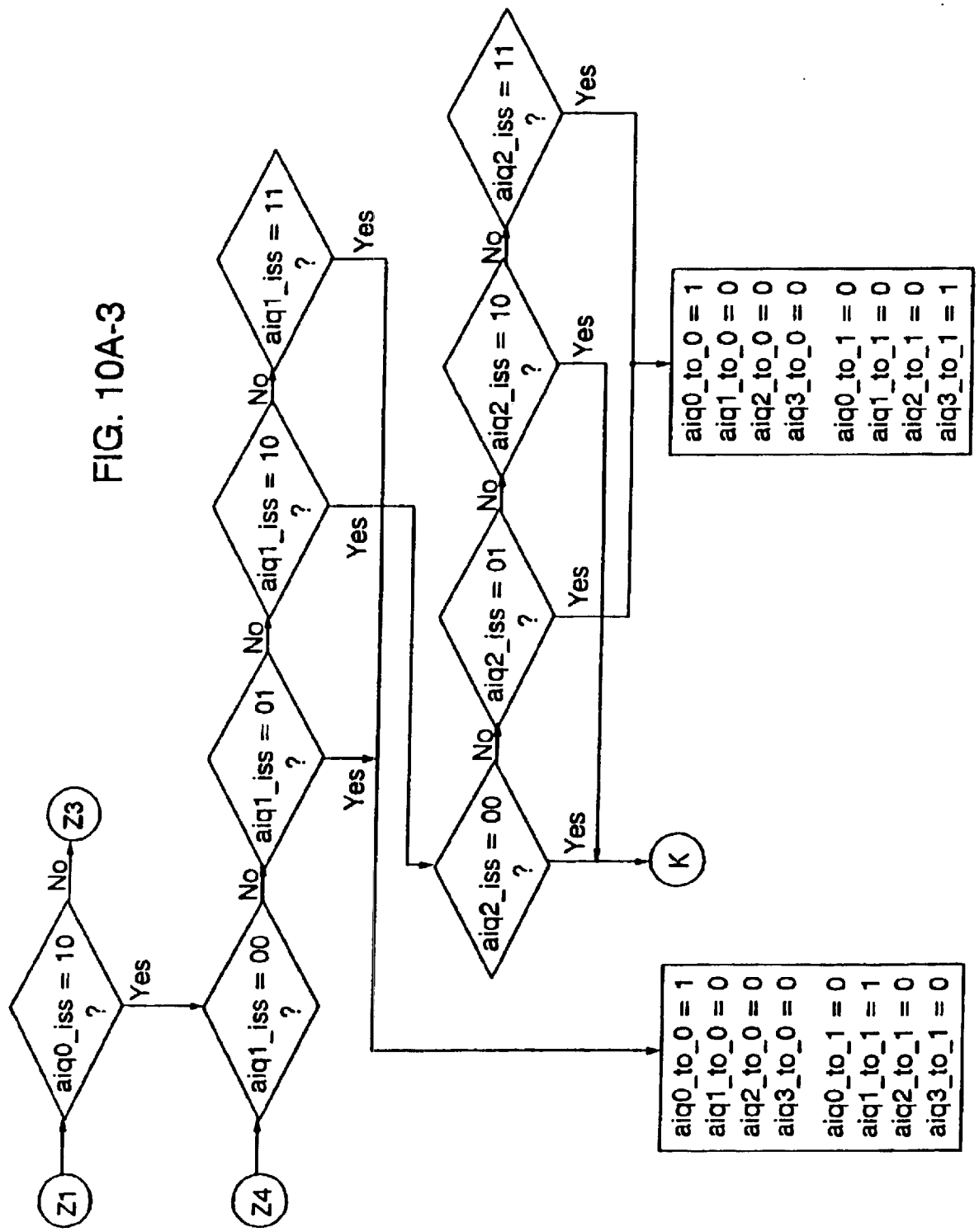
Figures 4, 10A:
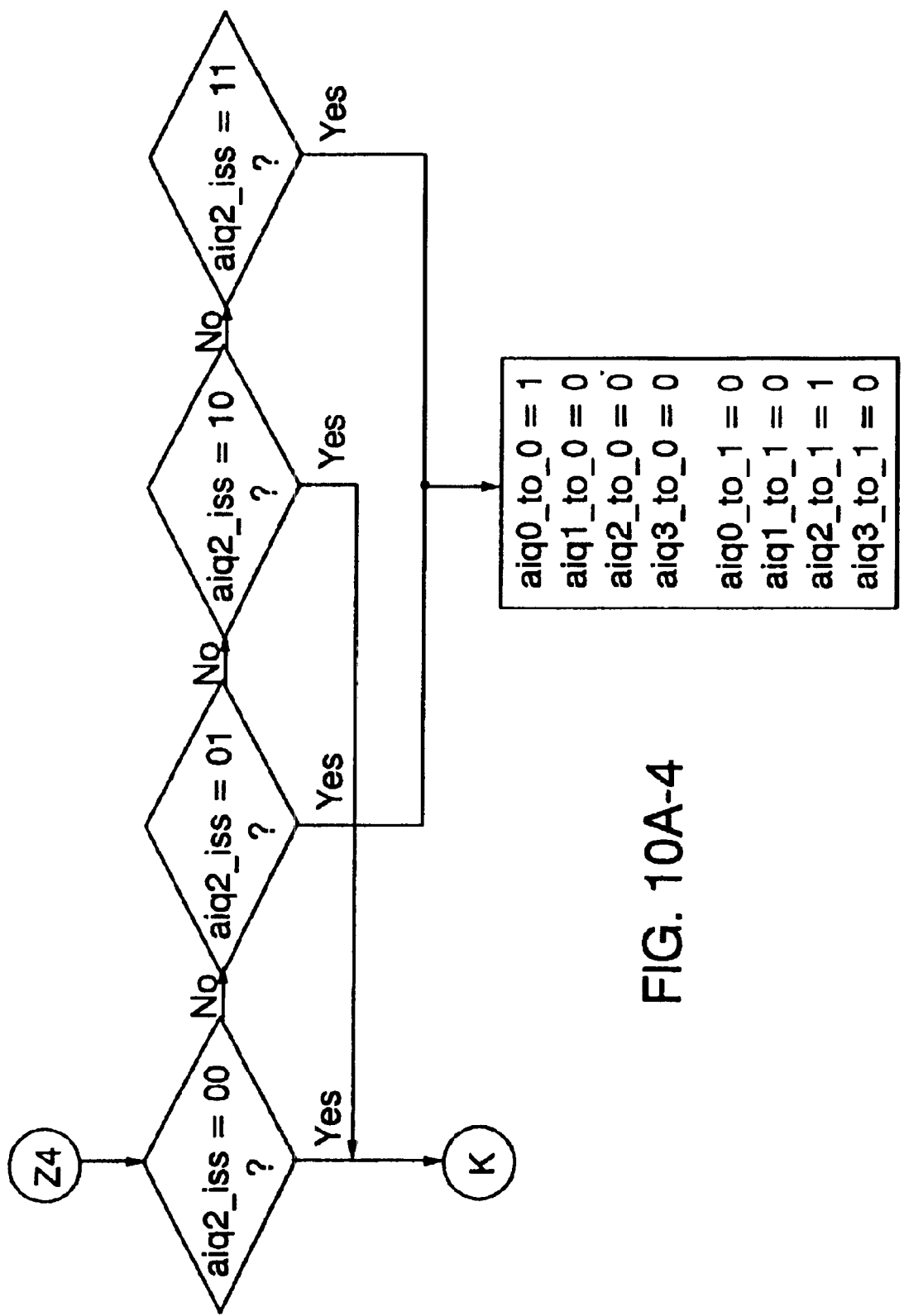
Figures 5, 10A:
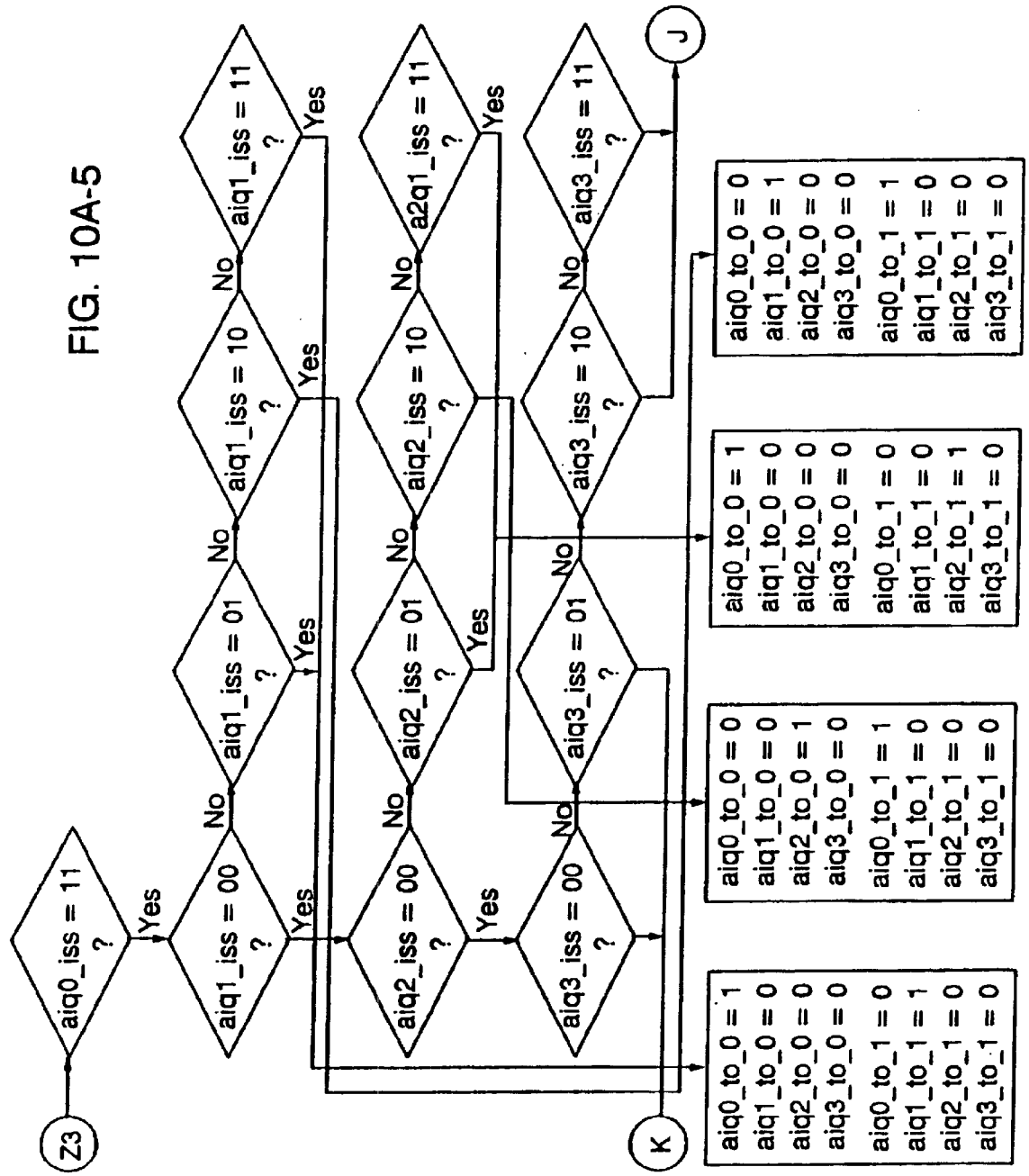
Figures 6, 10A:
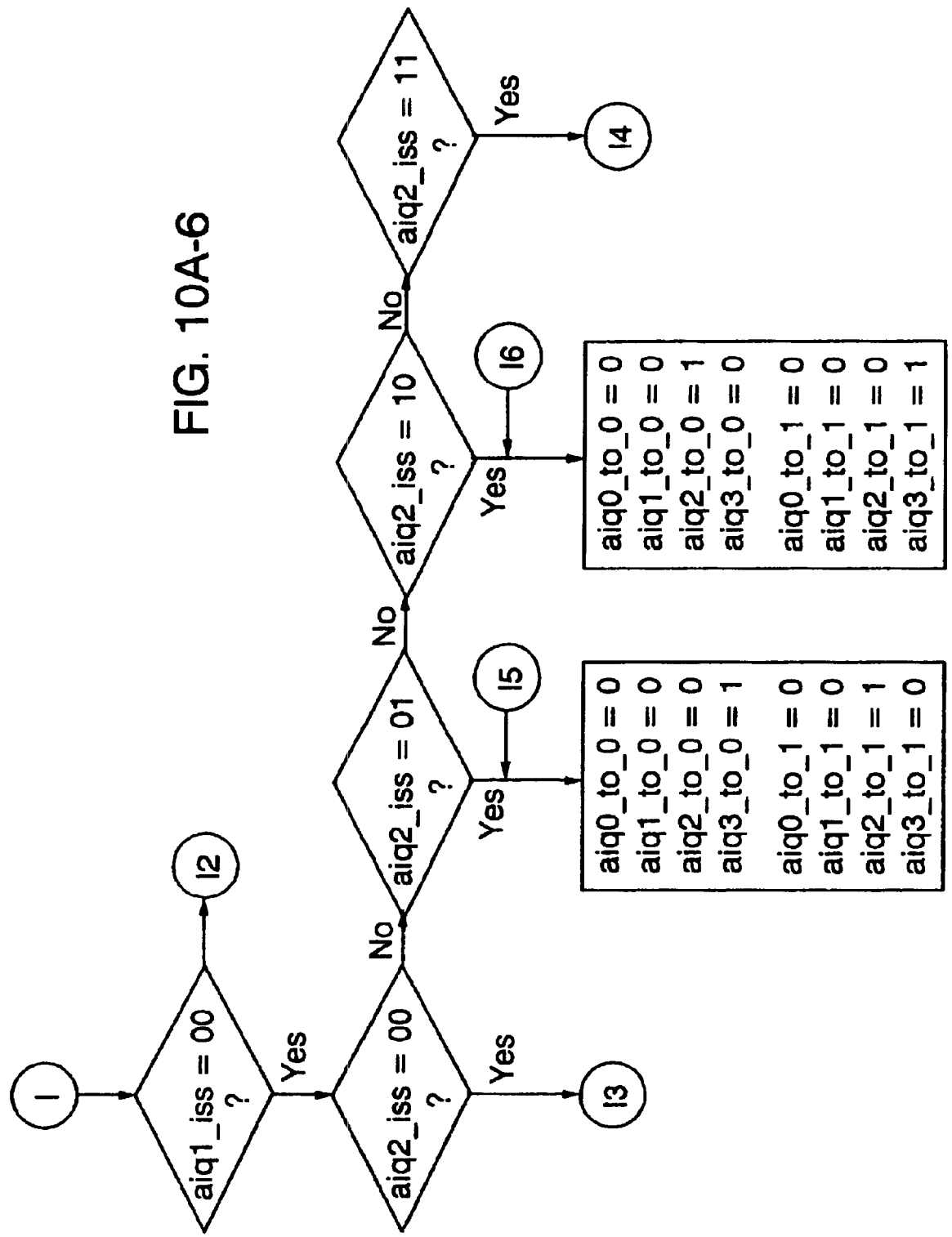
Figures 9, 10A:
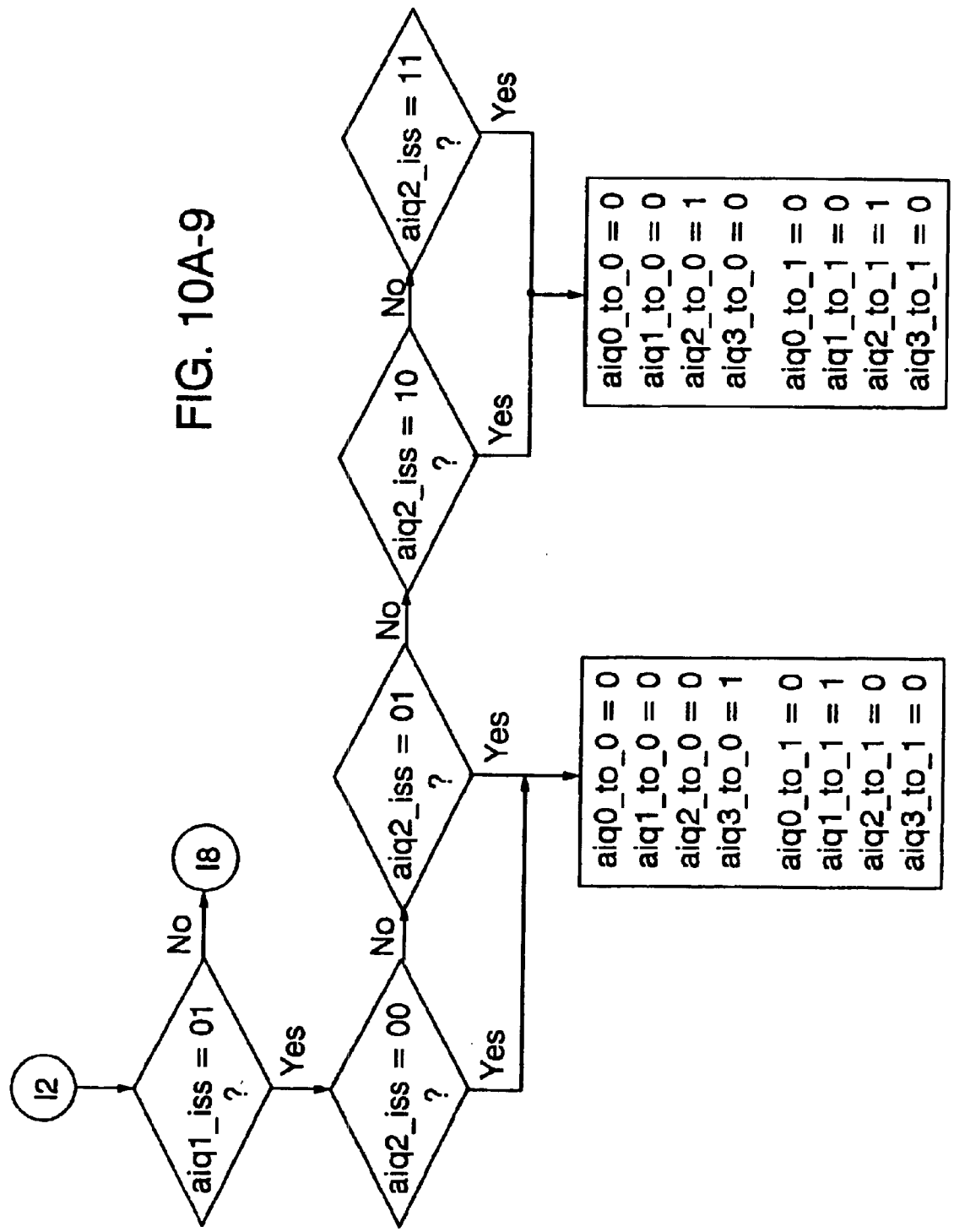
Figures 10, 10A:
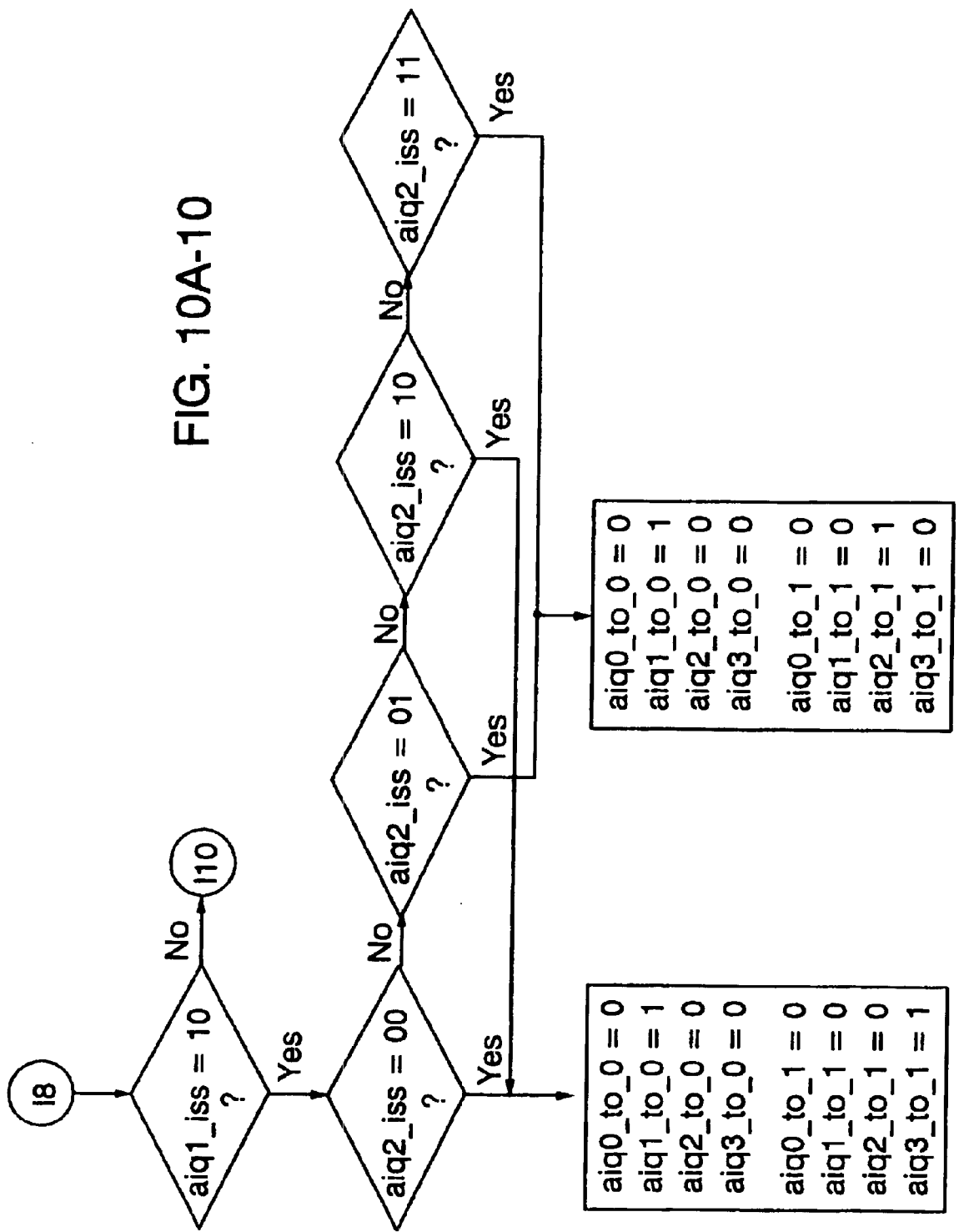
Figures 10, 10A, 11:
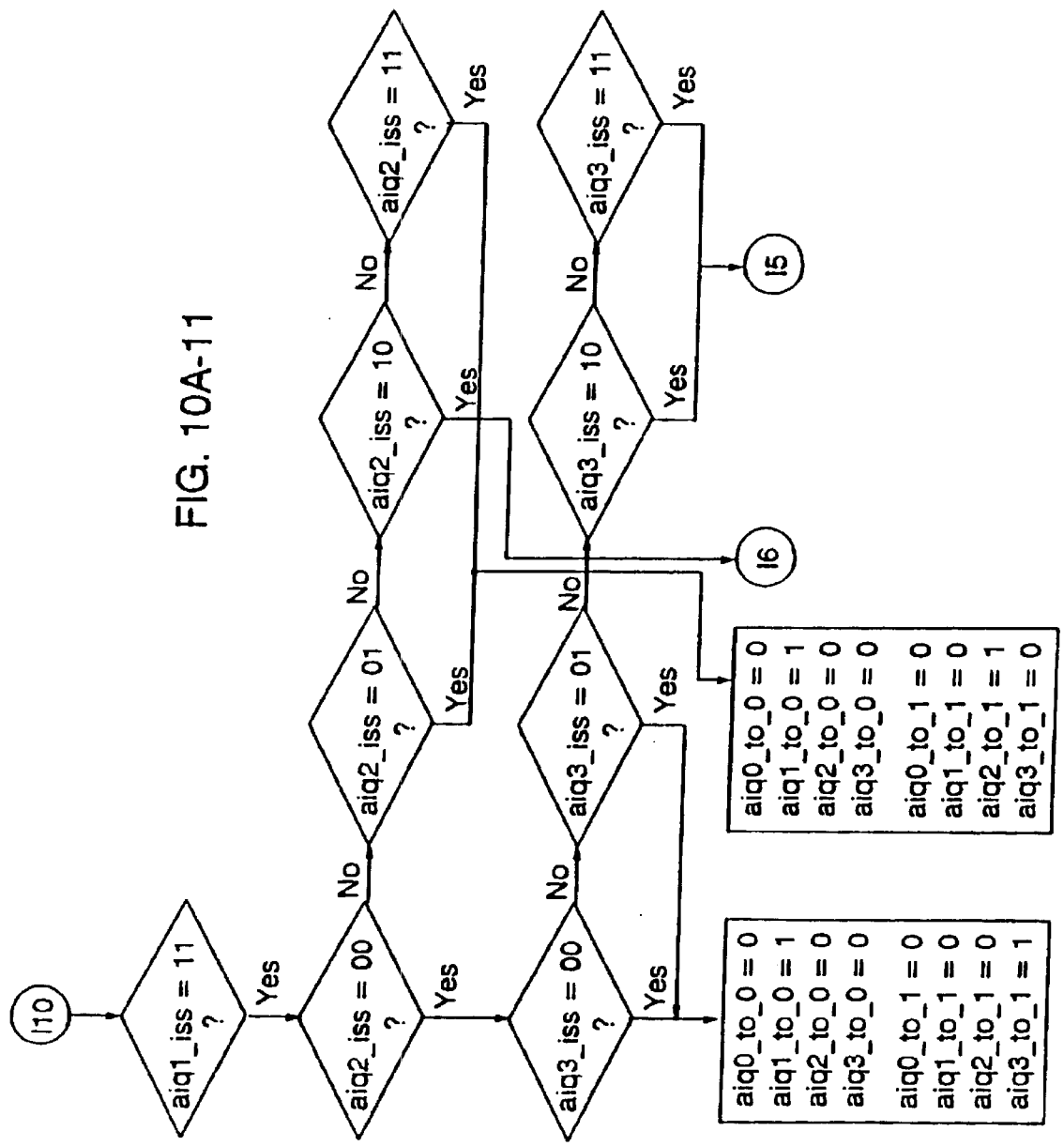

FIGS. 10-1 through 10-11 are provided to illustrate a methodology implemented by the Boolean function illustrated in Table 1 of the present patent application.

Conclusion

The implementation of the invention described herein is provided by way of example only. However, many other implementations may exist for executing the functions described herein. For example, the mechanism of the present invention disclosed herein has been described using an assumed central processing unit and floating point unit design. The detailed flow charts are representative of alternatives that may be included in a mechanism being disclosed in such an environment. However, the description within the stated environment was not intended to limit the mechanism of the present invention to the described characteristics. Therefore, the mechanism of the present invention may be adjusted to function within other CPU/FPU design constraints. Adjustment of the mechanism of the present invention to such other designs should be obvious to those skilled in the data processing art and, therefore, will not be described in detail herein, as to do so would be unduly burdensome and may serve to obscure the concepts of the present invention. Additionally, it should be noted that a different partitioning of the logic may be required to satisfy some cycle time requirements. For example, in the embodiment of the present invention illustrated herein, the logic shown in a dispatch section is partitioned to execute in a later timing cycle to meet cycle time constraints, since the dispatch valid signals reached the floating point unit late in the dispatch timing cycle. Such partitioning of a logic between timing cycles is a well-known tuning method to those experienced in the art of logic design. Therefore, it should be well-known to those with skill in the art that the chosen partition was not meant to limit the scope of this disclosure.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A data processing system, comprising:
   a first execution unit;
   a second execution unit;
   an input circuit for receiving a first plurality of instructions;
   detection means for asserting a first dependency indicated in response to detecting a dependency between a first one of the first plurality of instructions, and a second instruction, wherein the dependency occurs during an interval when the second instruction is executed by the first execution unit; and
   issue means, capable of issuing the first one of the plurality of instructions to either of the first and second execution units, for selectively issuing the first one of the plurality of instructions to one of the execution units in response to an indication by the first dependency indicator indicating that the dependency is being cleared.

2. The data processing system of claim 1, comprising:
   clearing means for resetting the first dependency indicator in response to the first dependency being cleared in a preselected timing cycle.

3. The data processing system of claim 2 wherein the first execution unit is a pipelined execution unit.

4. The data processing system of claim 3 wherein the clearing means resets the first dependency indicator in response to the first dependency being cleared in a preselected stage of a pipeline of the first execution unit.

5. The data processing system of claim 4 wherein a second one of the first plurality of instructions is selectively issued during an interval when the first one of the first plurality of instructions is executed in the preselected stage of the pipeline of the first execution unit.

6. The data processing system of claim 1, comprising:
   a forwarding logic circuit for selectively communicating a first data value, corresponding to the second instruction, to the first one of the first plurality of instructions.

7. The data processing system of claim 1 wherein a first data value is generated by the second instruction and accessed by the first one of the first plurality of instructions.

8. The data processing system of claim 1, comprising:
   an instruction issue state logic circuit coupled to the detection means, for enabling the first one of the first plurality of instructions to be issued to the first execution unit in response to the first dependency indicator.

9. The data processing system of claim 8, wherein the instruction issue state logic circuit enables the first one of the first plurality of instructions to be issued during an interval when the second instruction is currently executed by a preselected execution stage.

10. The data processing system of claim 9, wherein the first execution unit is a pipelined execution unit.

11. The data processing system of claim 10, wherein the preselected execution stage is a write-back execution stage.

12. A method, in a data processing system having a first execution unit and a second execution unit, comprising the steps of:
   receiving a first plurality of instructions;
   detecting a dependency between a first one of the first plurality of instructions and a second instruction; and
   selectively issuing the first one of the first plurality of instructions to one of the execution units in response to the detected dependency being cleared prior to an availability of a result from said second instruction.

13. The method of claim 12, comprising the steps of:
   asserting a dependency indicator in response to the detected dependency; and
   resetting the dependency indicator in response to the dependency being cleared, wherein the dependency is cleared during a preselected timing cycle.

14. The method of claim 13 wherein the first execution unit is a pipelined execution unit.

15. The method of claim 14, comprising the step of:
   resetting the dependency indicator in response to the first dependency being cleared in a preselected stage of a pipeline of the first execution unit.

16. The method of claim 14, comprising the step of:
   selectively issuing a second one of the first plurality of instructions during an interval when the first one of the first plurality of instructions is executing in the preselected stage of the pipeline of the first execution unit.

17. The method of claim 12, comprising the step of:
   selectively communicating a first data value, corresponding to the second instruction, to the first one of the first plurality of instructions using a forwarding logic circuit.

18. The method of claim 12, comprising the steps of:
   generating the first data value by the second instruction; and
   accessing the first data value by the first one of the first plurality of instructions.

19. The method of claim 12, comprising the step of:

enabling the first one of the first plurality of instructions to be issued to the first execution unit in response to the first dependency indicator.

20. The method of claim 19, comprising the step of:

enabling the first one of the first plurality of instructions to be issued, so that the issuing includes issuing during an interval when the second instruction is executed in a preselected execution stage.

21. The method of claim 20, wherein the first execution is a pipelined execution unit.

22. The method of claim 21, wherein the preselected execution stage is a write-back execution stage.

* * * * *

UNITED STATES PATENT AND TRADEMARK OFFICE
CERTIFICATE OF CORRECTION

PATENT NO. : 6,928,533 B1
DATED : August 9, 2005
INVENTOR(S) : Susan Elizabeth Eisen and James Edward Phillips It is certified that error appears in the above-identified patent and that said Letters Patent is hereby corrected as shown below:

Column 3,
Line 49, create new paragraph for -- FIG. 7-9 --.

Signed and Sealed this

Sixteenth Day of May, 2006

JON W. DUDAS
*Director of the United States Patent and Trademark Office*